United States Patent
Takahashi et al.

(10) Patent No.: US 6,894,120 B2
(45) Date of Patent: May 17, 2005

(54) ETHYLENE COPOLYMER COMPOSITION

(75) Inventors: Mamoru Takahashi, Waki-cho (JP); Akira Todo, Waki-cho (JP); Seiichi Ikeyama, Waki-cho (JP); Toshiyuki Tsutsui, Waki-cho (JP); Shinya Matsunaga, Waki-cho (JP); Norio Kaneshige, Waki-cho (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/819,284

(22) Filed: Apr. 7, 2004

(65) Prior Publication Data

US 2004/0210004 A1 Oct. 21, 2004

Related U.S. Application Data

(60) Continuation of application No. 10/106,447, filed on Mar. 27, 2002, now abandoned, which is a continuation of application No. 09/528,710, filed on Mar. 17, 2000, now abandoned, which is a continuation of application No. 08/844,839, filed on Apr. 22, 1997, now abandoned, which is a division of application No. 08/429,653, filed on Apr. 27, 1995, now abandoned, which is a division of application No. 08/077,352, filed on Jun. 16, 1993, now abandoned.

(30) Foreign Application Priority Data

| Jun. 17, 1992 | (JP) | ............................................. 4-157937 |
| Jun. 17, 1992 | (JP) | ............................................. 4-157938 |
| Sep. 8, 1992 | (JP) | ............................................. 4-239279 |
| Sep. 8, 1992 | (JP) | ............................................. 4-239280 |
| Mar. 26, 1993 | (JP) | ............................................. 5-68281 |
| Mar. 26, 1993 | (JP) | ............................................. 5-68282 |
| Mar. 26, 1993 | (JP) | ............................................. 5-68850 |
| Mar. 26, 1993 | (JP) | ............................................. 5-68851 |

(51) Int. Cl.$^7$ ............................................... C08L 23/00
(52) U.S. Cl. ................................... 525/240; 428/36.92
(58) Field of Search ....................... 525/240; 428/36.92

(56) References Cited

U.S. PATENT DOCUMENTS

| 4,824,912 A | * | 4/1989 | Su | ............................. 525/240 |
| 4,957,972 A | * | 9/1990 | Shirodkar | ................... 525/240 |
| 5,844,045 A | * | 12/1998 | Kolthammer et al. | ....... 525/240 |

FOREIGN PATENT DOCUMENTS

| EP | 292007 | * | 11/1988 |
| EP | 447035 | * | 9/1991 |
| JP | 59041342 | * | 3/1984 |
| JP | 59202244 | * | 11/1984 |
| WO | WO-9003414 | * | 4/1990 |

* cited by examiner

Primary Examiner—Bernard Lipman
(74) Attorney, Agent, or Firm—Sherman & Shalloway

(57) ABSTRACT

An ethylene copolymer composition comprising an ethylene/α-olefin copolymer, A-4, of ethylene with an α-olefin of 3 to 20 carbon atoms in an amount of 65–98% by weight, whose melt tension, MT, at 190° C. and MFR satisfy the relation MT>2.2×MFR$^{-0.84}$, and at least one crystalline polyolefin, B-2, in an amount of 1–40% by weight selected from the group consisting of, B-I, an ethylene homopolymer or a copolymer of ethylene with an α-olefin of 3 to 20 carbon atoms, prepared using a non-metallocene type catalyst, B-II, a propylene homopolymer or a copolymer of propylene with at least one olefin selected from ethylene and an α-olefin of 4 to 20 carbon atoms, and, B-III, a homopolymer of an α-olefin of 4 to 20 carbon atoms or a copolymer of α-olefins of 4 to 20 carbon atoms, and articles made from the composition.

4 Claims, No Drawings

US 6,894,120 B2

ETHYLENE COPOLYMER COMPOSITION

CROSS REFERENCE TO RELATED APPLICATION

This application is a continuation of application Ser. No. 10/106,447, filed Mar. 27, 2002, now abandoned, which is a continuation of application Ser. No. 09/528,710, filed Mar. 17, 2000, now abandoned, which is a continuation of application Ser. No. 08/844,839, filed Apr. 22, 1997, now abandoned, which is a divisional of Ser. No. 08/429,653 filed Apr. 27, 1995, now abandoned, which is a divisional of Ser. No. 08/077,352, filed Jun. 16, 1993, now abandoned, which also claims foreign priority from Japan 157937/1992 filed Jun. 17, 1992, Japan 157938/1992 filed Jun. 17, 1992, Japan 239279/1992 filed Sep. 8, 1992, Japan 239280/1992 filed Sep. 8, 1992, Japan 68281/1993 filed Mar. 26, 1993, Japan 68282/1993 filed Mar. 26, 1993, Japan 68850/19913 filed Mar. 26, 1993, Japan 68851/1993 filed Mar. 26, 1993.

FIELD OF THE INVENTION

The present invention relates to ethylene copolymer compositions, more particularly to ethylene copolymer compositions which show higher heat stability and moldability as compared with conventional ethylene copolymers or ethylene copolymer compositions and from which films of high transparency, high mechanical strength and high blocking resistance can be formed.

BACKGROUND OF THE INVENTION

Ethylene copolymers have heretofore been molded by various molding methods, and used in many fields. The requirement for the characteristics of the ethylene copolymers differs depending on the molding methods and uses. For example, when an inflation film is molded at a high speed, it is necessary to select an ethylene copolymer having a high melt tension compared with its molecular weight in order to stably conduct high speed molding without fluctuation or tearing of bubbles. An ethylene copolymer is required to have similar characteristics in order to prevent sag or tearing in blow molding, or to suppress width shortage to the minimum range in T-die molding.

Further, in extrusion molding, it is important to have small stress under high shearing during extrusion in order to improve quality of molded article and reduce electric power consumption at molding.

On the other hand, Japanese Patent L-O-P Nos. 90810/1981 and 106806/1985 propose a method for improving moldability by improving the melt tension and blow ratio (die/swell ratio) of ethylene polymers obtained by using Ziegler type catalysts, especially a titanium type catalyst.

The ethylene polymers obtained by using a titanium catalyst, however, especially the low density ethylene polymers generally have problems such as their broad composition distribution and stickiness of their molded articles such as films.

Of the ethylene polymers prepared by using the Ziegler type catalysts, those obtained by using chromium type catalysts are relatively excellent in melt tension but has a defect of poor heat stability. This is thought to be caused by that the chain terminals of the ethylene polymers prepared by using the chromium type catalysts tend to become unsaturated bonds.

It is known that the ethylene polymers obtained by using a metallocene catalyst from among the Ziegler type catalysts have merits such as a narrow composition distribution and a low stickiness of their molded articles such as films. However, it is described in, for example Japanese Patent L-O-P. No. 35007/1985, that an ethylene polymer obtained by using a zirconocene compound formed from a cyclopentadienyl derivative contains one terminal unsaturated bond per molecule, and hence this ethylene polymer is presumably poor in heat stability similarly to the above-mentioned ethylene polymer obtained by using the chromium type catalyst. Further, because of its narrow composition distribution, this ethylene polymer might show poor flowability during the extrusion molding.

Accordingly, the advent of ethylene polymers having a small stress under the high-shear region, a good heat stability, a high mechanical strength and a narrow composition distribution will industrially be of great value.

The present inventors have earnestly studied in the light of the circumstances as described above. As a result, they have found that the ethylene/α-olefin copolymer obtained by copolymerizing ethylene with an α-olefin of 3 to 20 carbon atoms in the presence of a specific catalyst for olefin polymerization has a density, a melt flow rate (MFR), a temperature (Tm) at which its endothermic curve measured by a differential scanning calorimeter (DSC) shows the maximum peak, a flow index (FI) and an amount of a decane-soluble portion in the specific ranges, and the melt tension (MT) at 190° C. and the melt flow rate (MFR) satisfy the relation $MT > 2.2 \times MFR^{-0.84}$. The present inventors have also found that such an ethylene/α-olefin copolymer [A-1] as mentioned above is excellent in melt tension and heat stability and has a narrow composition distribution. However, the ethylene/α-olefin copolymer [A-1] is not always well-balanced between the melt tension and the flowability, so that a problem sometimes occurs when the copolymer is subjected to extrusion molding to form a film.

The present inventors have further studied and found that the following ethylene copolymer compositions (1) to (4) are excellent in heat stability, melt tension and flowability under the high-shear region, and films obtained from these compositions are excellent in transparency, mechanical strength and blocking resistance.

(1) An ethylene copolymer composition comprising the aforesaid ethylene/α-olefin copolymer [A-1] and a specific low-density polyethylene [B-1] obtained by high-pressure radical polymerization.

(2) An ethylene copolymer composition comprising the aforesaid ethylene/α-olefin copolymer [A-1] and a specific crystalline polyolefin [B-2].

(3) An ethylene copolymer composition comprising the aforesaid ethylene/α-olefin copolymer [A-1] and a specific olefin type elastomer [B-3].

(4) An ethylene copolymer composition comprising an ethylene/α-olefin copolymer composition and a specific low-density polyethylene [B-1] obtained by high-pressure radical polymerization, said ethylene/α-olefin copolymer composition comprising an ethylene/α-olefin copolymer [A-2] having physical properties similar to those of the aforesaid ethylene/α-olefin copolymer [A-1] and an intrinsic viscosity [η] in the specific range and an ethylene/α-olefin copolymer [A-3] having physical properties similar to those of the aforesaid ethylene/α-olefin copolymer [A-1] and an intrinsic viscosity [η] in the specific range.

Further, the present inventors have found that ethylene/α-olefin copolymer [A-4] obtained by copolymerizing ethylene with an α-olefin of 3 to 20 carbon atoms in the presence of a specific olefin polymerization catalyst which is different from the aforementioned olefin polymerization catalyst has a density, a melt flow rate (MFR), a temperature (Tm) at which its endothermic curve measured by a differential scanning calorimeter (DSC) shows the maximum peak and an amount of its decane-soluble portion in the specific ranges, and the melt tension (MT) at 190° C. and the melt flow rate (MFR) satisfy the relation $MT \leq 2.2 \times MFR^{-0.84}$. The present inventors have also found that this ethylene/α-olefin copolymer [A-4] is excellent in heat stability and has a narrow composition distribution.

As the result of further studies, the present inventors have found that the following ethylene copolymer compositions (5) to (8) are excellent in heat stability and melt tension, and films obtained from these compositions are excellent in transparency, mechanical strength and blocking resistance.

(5) An ethylene copolymer composition comprising the above-mentioned ethylene/α-olefin copolymer [A-4] and a specific low-density polyethylene [B-4] obtained by high-pressure radical polymerization.

(6) An ethylene copolymer composition comprising the above-mentioned ethylene/α-olefin copolymer [A-4] and a specific crystalline polyolefin [B-2].

(7) An ethylene copolymer composition comprising the above-mentioned ethylene/α-olefin copolymer [A-4] and a specific olefin type elastomer [B-3].

(8) An ethylene copolymer composition comprising an ethylene/α-olefin copolymer composition and a specific low-density polyethylene [B-4] obtained by high-pressure radical polymerization, said ethylene/α-olefin copolymer composition comprising an ethylene/α-olefin copolymer [A-5] having physical properties similar to those of the above-mentioned ethylene/α-olefin copolymer [A-4] and an intrinsic viscosity [η] in the specific range and an ethylene/α-olefin copolymer [A-6] having physical properties similar to those of the above-mentioned ethylene/α-olefin copolymer [A-4] and an intrinsic viscosity [η] in the specific range.

Thus, the present inventors have accomplished the invention.

OBJECT OF THE INVENTION

It is an object of the present invention to provide ethylene copolymer compositions which are excellent in heat stability and melt tension and from which films of high transparency, high mechanical strength and high blocking resistance can be obtained.

SUMMARY OF THE INVENTION

The first ethylene copolymer composition according to the present invention is an ethylene copolymer composition comprising:

[A-1] an ethylene/α-olefin copolymer of ethylene with an α-olefin of 3 to 20 carbon atoms having such properties that
(i) the density (d) is in the range of 0.880 to 0.960 g/cm$^3$,
(ii) the melt flow rate (MFR) at 190° C. under a load of 2.16 kg is in the range of 0.01 to 200 g/10 min,
(iii) the temperature (Tm (° C.)) at which the endothermic curve of said copolymer measured by a differential scanning calorimeter (DSC) shows the maximum peak and the density (d) satisfy the relation $Tm < 400 \times d - 250$, (iv) the melt tension (MT (g)) at 190° C. and the melt flow rate (MFR) satisfy the relation $MT > 2.2 \times MFR^{-0.84}$, (v) the flow index (FI (1/sec)) defined by a shear rate which is given when a shear stress of molten copolymer at 190° C. reaches $2.4 \times 10^6$ dyne/cm$^2$ and the melt flow rate (MFR) satisfy the relation $FI > 75 \times MFR$, and (vi) the amount (W (% by weight)) of a decane-soluble portion at 23° C. and the density (d) satisfy the relation, in the case of MFR$\leq$10 g/10 min, $W < 80 \times \exp(-100(d-0.88)) + 0.1$ in the case of MFR$>$10 g/10 min, $W < 80 \times (MFR-9)^{0.26} \times \exp(-100(d-0.88)) + 0.1$;

and
[B-1] a high-pressure radical polymerization low-density polyethylene having such properties that
(i) the melt flow rate (MFR) is in the range of 0.1 to 50 g/10 min, and
(ii) the molecular weight distribution (Mw/Mn, Mw=weight-average molecular weight, Mn=number-average molecular weight) measured by GPC and the melt flow rate (MFR) satisfy the relation $Mw/Mn \geq 7.5 \times \log(MFR) - 1.2$;

a weight ratio ([A-1]:[B-1]) between said ethylene/α-olefin copolymer [A-1] and said high-pressure radical polymerization low-density polyethylene [B-1] being in the range of 99:1 to 60:40.

The second ethylene copolymer composition according the present invention is an ethylene copolymer composition comprising:
[A-1] an ethylene/α-olefin copolymer of ethylene with an α-olefin of 3 to 20 carbon atoms in an amount of 60 to 99% by weight, said copolymer having such properties that
(i) the density (d) is in the range of 0.880 to 0.960 g/cm$^3$,
(ii) the melt flow rate (MFR) at 190° C. under a load of 2.1–6 kg is in the range of 0.01 to 200 g/10 min,
(iii) the temperature (Tm (° C.)) at which the endothermic curve of said copolymer measured by a differential scanning calorimeter (DSC) shows the maximum peak and the density (d) satisfy the relation $Tm < 400 \times d - 250$, (iv) the melt tension (MT (g)) at 190° C. and the melt flow rate (MFR) satisfy the relation $MT > 2.2 \times MFR^{-0.84}$, (v) the flow index (FI (1/sec)) defined by a shear rate which is given when a shear stress of molten copolymer at 190° C. reaches $2.4 \times 10^6$ dyne/cm$^2$ and the melt flow rate (MFR) satisfy the relation $FI > 75 \times MFR$, and (vi) the amount (W (% by weight)) of a decane-soluble portion at 23° C. and the density (d) satisfy the relation, in the case of MFR$\leq$10 g/10 min, $W < 80 \times \exp(-100(d-0.88)) + 0.1$ in the case of MFR$>$10 g/10 min, $W < 80 \times (MFR-9)^{0.26} \times \exp(-100(d-0.88)) + 0.1$;

and

[B-2] at least one crystalline polyolefin in an amount of 1 to 40% by weight, said crystalline polyolefin being selected from the group consisting of:

(B-I) an ethylene homopolymer or a copolymer of ethylene with an α-olefin of 3 to 20 carbon atoms, prepared by using non-metallocene type catalyst, having a melt flow rate (MFR) of 0.01 to 100 g/10 min at 190° C. under a load of 2.16 kg and a density of not less than 0.900 g/cm$^3$, (B-II) a propylene homopolymer or a copolymer of propylene with at least one olefin selected from ethylene and an α-olefin of 4 to 20 carbon atoms, having a melt flow rate (MFR) of 0.1 to 100 g/10 min at 230° C. under a load of 2.16 kg and a density of not less than 0.900 g/cm$^3$, and (B-III) a homopolymer of an α-olefin of 4 to 20 carbon atoms or a copolymer of α-olefins of 4 to 20 carbon atoms, having a melt flow rate (MFR) of 0.1 to 100 g/10 min at 230° C. under a load of 2.16 kg and a density of not less than 0.900 g/cm$^3$.

The third ethylene copolymer composition according to the present invention is an ethylene copolymer composition comprising:

[A-1] an ethylene/α-olefin copolymer of ethylene with an α-olefin of 3 to 20 carbon atoms in an amount of 60 to 99% by weight, said copolymer having such properties that (i) the density (d) is in the range of 0.880 to 0.960 g/cm$^3$, (ii) the melt flow rate (MFR) at 190° C. under a load of 2.16 kg is in the range of 0.01 to 200 g/10 min, (iii) the temperature (Tm (° C.)) at which the endothermic curve of said copolymer measured by a differential scanning calorimeter (DSC) shows the maximum peak and the density (d) satisfy the relation $Tm<400\times d-250$, (iv) the melt tension (MT (g)) at 190° C. and the melt flow rate (MFR) satisfy the relation $MT>2.2\times MFR^{-0.84}$, (v) the flow index (FI (1/sec)) defined by a shear rate which is given when a shear stress of molten copolymer at 190° C. reaches $2.4\times10^6$ dyne/cm$^2$ and the melt flow rate (MFR) satisfy the relation $FI>75\times MFR$, and (vi) the amount (W (% by weight)) of a decane-soluble portion at 23° C. and the density (d) satisfy the relation, in the case of MFR≦10 g/10 min, $W<80\times\exp(-100(d-0.88))+0.1$;

in the case of MFR>10 g/10 min, $W<80\times(MFR-9)^{0.26}\times\exp(-100(d-0.88))+0.1$;

and

[B-3] an olefin type elastomer in an amount of 1 to 40% by weight, said elastomer having such properties that (i) the density (d) is not more than 0.900 g/cm$^3$, and (ii) the melt flow rate (MFR) at 190° C. under a load of 2.16 kg is in the range of 0.01 to 100 g/10 min; a density ratio ([B-3]/[A-1]) of the density of said olefin type elastomer [B-3] to the density of said ethylene/α-olefin copolymer [A-1] being less than 1.

The fourth ethylene copolymer composition according to the present invention is an ethylene copolymer composition comprising:

[Ia] an ethylene/α-olefin copolymer composition which comprises [A-2] an ethylene/α-olefin copolymer of ethylene with an α-olefin of 3 to 20 carbon atoms in an amount 5 to 95% by weight and [A-3] an ethylene/α-olefin copolymer of ethylene with an α-olefin of 3 to 20 carbon atoms in an amount of 5 to 95% by weight, said ethylene/α-olefin copolymer [A-2] having such properties that (i) the density (d) is in the range of 0.880 to 0.940 g/cm$^3$, (ii) the intrinsic viscosity [$\eta_{A-2}$] as measured in decalin at 135° C. is in the range of 1.0 to 10.0 dl/g, (iii) the temperature (Tm (° C.)) at which the endothermic curve of said copolymer measured by a differential scanning calorimeter (DSC) shows the maximum peak and the density (d) satisfy the relation $Tm<400\times d-250$, (iv) the melt tension (MT (g)) at 190° C. and the melt flow rate (MFR) satisfy the relation $MT>2.2\times MFR^{-0.84}$, (v) the flow index (FI (1/sec)) defined by a shear rate which is given when a shear stress of molten copolymer at 190° C. reaches $2.4\times10^6$ dyne/cm$^2$ and the melt flow rate (MFR) satisfy the relation $FI>75\times MFR$, and (vi) the amount (W (% by weight)) of a decane-soluble portion at room temperature and the density (d) satisfy the relation $W<80\times\exp(-100(d-0.88))+0.1$, said ethylene/α-olefin copolymer [A-3] having such properties that (i) the density (d) is in the range of 0.910 to 0.960 g/cm$^3$, (ii) the intrinsic viscosity [$\eta_{A-3}$] as measured in decalin at 135° C. is in the range of 0.5 to 2.0 dl/g, (iii) the temperature (Tm (° C.)) at which the endothermic curve of said copolymer measured by a differential scanning calorimeter (DSC) shows the maximum peak and the density (d) satisfy the relation $Tm<400\times d-250$, and (iv) the amount (W (% by weight)) of a decane-soluble portion at room temperature and the density (d) satisfy the relation, in the case of MFR≦10 g/10 min, $W<80\times\exp(-100(d-0.88))+0.1$ in the case of MFR>10 g/10 min, $W<80\times(MFR-9)^{0.26}\times\exp(-100(d-0.88))+0.1$, said ethylene/α-olefin copolymer composition [Ia] having such properties that (i) the density ratio ([A-2]/[A-3]) of the density of said ethylene/α-olefin copolymer [A-2] to the density of said ethylene/α-olefin copolymer [A-3] is less than 1, (ii) the intrinsic viscosity ratio ([$\eta_{A-2}$]/[A-3]) of the intrinsic viscosity of said ethylene/α-olefin copolymer [A-2] to the intrinsic viscosity of said ethylene/α-olefin copolymer [A-3] is not less than 1, (iii) the density of said composition is in the range of 0.890 to 0.955 g/cm$^3$, and (iv) the melt flow rate (MFR) of said composition at 190° C. under a load of 2.16 kg is in the range of of 0.1 to 100 g/10 min;
and

[II-a] [B-1] a high-pressure radical polymerization low-density polyethylene having such properties that (i) the melt flow rate (MFR) is in the range of 0.1 to 50 g/10 min, and (ii) the molecular weight distribution (Mw/Mn, Mw=weight-average molecular weight, Mn=number-average molecular weight) measured by GPC and the melt flow rate (MFR) satisfy the relation $$Mw/Mn \geq 7.5 \times \log(MFR) - 1.2;$$

a weight ratio ([Ia]:[IIa]) between said ethylene/α-olefin copolymer composition [Ia] and said high-pressure radical polymerization low-density polyethylene [IIa] being in the range of 99:1 to 60:40.

The first to fourth ethylene copolymer compositions according to the present invention are excellent in heat stability, melt tension and flowability under the high-shear region, and films formed from these compositions are excellent in transparency, mechanical strength and blocking resistance.

The fifth ethylene copolymer composition according to the present invention is an ethylene copolymer composition comprising:

[A-4] an ethylene/α-olefin copolymer of ethylene with an α-olefin of 3 to 20 carbon atoms having such properties that (i) the density (d) is in the range of 0.880 to 0.960 g/cm$^3$, (ii) the melt flow rate (MFR) at 190° C. under a load of 2.16 kg is in the range of 0.01 to 200 g/10 min, (iii) the temperature (Tm (° C.)) at which the endothermic curve of said copolymer measured by a differential scanning calorimeter (DSC) shows the maximum peak and the density (d) satisfy the relation $$Tm < 400 \times d - 250,$$

(iv) the melt tension (MT (g)) at 190° C. and the melt flow rate (MFR) satisfy the relation $$MT \leq 2.2 \times MFR^{-0.84}, \text{ and}$$

(v) the amount (W (% by weight)) of a decane-soluble portion at 23° C. and the density (d) satisfy the relation,
in the case of MFR ≤ 10 g/10 min, $$W < 80 \times \exp(-100(d-0.88)) + 0.1$$

in the case of MFR > 10 g/10 min, $$W < 80 \times (MFR-9)^{0.26} \times \exp(-100(d-0.88)) + 0.1;$$

and
[B-4] a high-pressure radical polymerization low-density polyethylene having such properties that (i) the melt flow rate (MFR) is in the range of 0.1 to 50 g/10 min, and (ii) the molecular weight distribution (Mw/Mn, Mw=weight-average molecular weight, Mn=number-average molecular weight) measured by GPC and the melt flow rate (MFR) satisfy the relation $$7.5 \times \log(MFR) - 1.2 \leq Mw/Mn \leq 7.5 \times \log(MFR) + 12.5;$$

a weight ratio ([A-4]:[B-4]) between said ethylene/α-olefin copolymer [A-4] and said high-pressure radical polymerization low-density polyethylene [B-4] being in the range of 99:1 to 60:40.

The sixth ethylene copolymer composition according to the present invention is an ethylene copolymer composition comprising:

[A-4] an ethylene/α-olefin copolymer of ethylene with an α-olefin of 3 to 20 carbon atoms in an amount of 60 to 99% by weight, said copolymer having such properties that (i) the density (d) is in the range of 0.880 to 0.960 g/cm$^3$, (ii) the melt flow rate (MFR) at 190° C. under a load of 2.16 kg is in the range of 0.01 to 200 g/10 min, (ii) the temperature (Tm (° C.)) at which the endothermic curve of said copolymer measured by a differential scanning calorimeter (DSC) shows the maximum peak and the density (d) satisfy the relation $$Tm < 400 \times d - 250,$$

(iv) the melt tension (MT (g)) at 190° C. and the melt flow rate (MFR) satisfy the relation $$MT \leq 2.2 \times MFR^{-0.84}, \text{ and}$$

(v) the amount (W (% by weight)) of a decane-soluble portion at 23° C. and the density (d) satisfy the relation,
in the case of MFR ≤ 10 g/10 min, $$W < 80 \times \exp(-100(d-0.88)) + 0.1$$

in the case of MFR > 10 g/10 min, $$W < 80 \times (MFR-9)^{0.26} \times \exp(-100(d-0.88)) + 0.1;$$

and
[B-2] at least one crystalline polyolefin in an amount of 1 to 40% by weight, said crystalline polyolefin being selected from the group consisting of:

(B-I) an ethylene homopolymer or a copolymer of ethylene with an α-olefin of 3 to 20 carbon atoms, prepared by using non-metallocene type catalyst, having a melt flow rate (MFR) of 0.01 to 100 g/10 min at 190° C. under a load of 2.16 kg and a density of not less than 0.900 g/cm$^3$, (B-II) a propylene homopolymer or a copolymer of propylene with at least one olefin selected from ethylene and an α-olefin of 4 to 20 carbon atoms, having a melt flow rate (MFR) of 0.1 to 100 g/10 min at 230° C. under a load of 2.16 kg and a density of not less than 0.900 g/cm$^3$, and (B-III) a homopolymer of an α-olefin of 4 to 20 carbon atoms or a copolymer of α-olefins of 4 to 20 carbon atoms, having a melt flow rate (MFR) of 0.1 to 100 g/10 min at 230° C. under a load of 2.16 kg and a density of not less than 0.900 g/cm$^3$.

The seventh ethylene copolymer composition according the present invention is an ethylene copolymer composition comprising:

[A-4] an ethylene/α-olefin copolymer of ethylene with an α-olefin of 3 to 20 carbon atoms in an amount of 60 to 99% by weight, said copolymer having such properties that (i) the density (d) is in the range of 0.880 to 0.960 g/cm$^3$, (ii) the melt flow rate (MFR) at 190° C. under a load of 2.16 kg is in the range of 0.01 to 200 g/10 min, (iii) the temperature (Tm (° C.)) at which the endothermic curve of said copolymer measured by a differential scanning calorimeter (DSC) shows the maximum peak and the density (d) satisfy the relation $$Tm < 400 \times d - 250,$$

(iv) the melt tension (MT (g)) at 190° C. and the melt flow rate (MFR) satisfy the relation $$MT \leq 2.2 \times MFR^{-0.84}, \text{ and}$$

(v) the amount (W (% by weight)) of a decane-soluble portion at 23° C. and the density (d) satisfy the relation,
in the case of MFR≦10 g/10 min, $$W<80\times\exp(-100(d-0.88))+0.1$$

in the case of MFR>10 g/10 min $$W<80\times(MFR-9)^{0.26}\times\exp(-100(-0.88))+0.1;$$

and
[B-3] an olefin type elastomer in an amount of 1 to 40% by weight, said elastomer having such properties that
(i) the density (d) is not more than 0.900 g/cm³, and
(ii) the melt flow rate (MFR) at 190° C. under a load of 2.16 kg is in the range of 0.01 to 100 g/10 min; a density ratio ([B-3]/[A-4]) of the density of said olefin type elastomer [B-3] to the density of said ethylene/α-olefin copolymer [A-4] being less than 1.

The eighth ethylene copolymer composition according the present invention is an ethylene copolymer composition comprising:
[Ib] an ethylene/α-olefin copolymer composition which comprises [A-5] an ethylene/α-olefin copolymer of ethylene with an α-olefin of 3 to 20 carbon atoms in an amount of 5 to 95% by weight and [A-6] an ethylene/α-olefin copolymer of ethylene with an α-olefin of 3 to 20 carbon atoms in an amount of 5to 95% by weight,
said ethylene/α-olefin copolymer [A-5] having such properties that
(i) the density (d) is in the range of 0.880 to 0.940 g/cm³,
(ii) the intrinsic viscosity [$\eta_{A-5}$] as measured in decalin at 135° C. is in the range of 1.0 to 10.0 dl/g
(iii) the temperature (Tm (° C.)) at which the endothermic curve of said copolymer measured by a differential scanning calorimeter (DSC) shows the maximum peak and the density (d) satisfy the relation $$Tm<400\times d-250,$$

(iv) the melt tension (MT (g)) at 190° C. and the melt flow rate (MFR) satisfy the relation $$MT\leq 2.2\times MFR^{-0.84}, \text{ and}$$

(v) the amount (W (% by weight)) of a decane-soluble portion at room temperature and the density (d) satisfy the relation $$W<80\times\exp(-100(d-0.88))+0.1,$$

said ethylene/α-olefin copolymer [A-6] having such properties that
(i) the density (d) is in the range of 0.910 to 0.960 g/cm³,
(ii) the intrinsic viscosity [$\eta_{A-6}$] as measured in decalin at 135° C. is in the range of 0.5 to 2.0 dl/g,
(iii) the temperature (Tm (° C.)) at which the endothermic curve of said copolymer measured by a differential scanning calorimeter (DSC) shows the maximum peak and the density (d) satisfy the relation $$Tm<400\times d-250, \text{ and}$$

(iv) the amount (W (% by weight)) of a decane-soluble portion at room temperature and the density (d) satisfy the relation,
in the case of MFR≦10 g/10 min, $$W<80\times\exp(-100(d-0.88))+0.1$$

in the case of MFR>10 g/10 min, $$W<80\times(MFR-9)^{0.26}\times\exp(-100(d-0.88))+0.1,$$

said ethylene/α-olefin copolymer composition [Ib ] having such properties that
(i) the density ratio ([A-5]/[A-6]) of the density of said ethylene/α-olefin copolymer [A-5] to the density of said ethylene/α-olefin copolymer [A-6] is less than 1,
(ii) the intrinsic viscosity ratio ([$\eta_{A-5}$]/[$\eta_{A-6}$]) of the intrinsic viscosity of said ethylene/α-olefin copolymer [A-5] to the intrinsic viscosity of said ethylene/α-olefin copolymer [A-6] is not less than 1,
(iii) the density of said composition is in the range of 0.890 to 0.955 g/cm³, and
(iv) the melt flow rate (MFR) of said composition at 190° C. under a load of 2.16 kg is in the range of 0.1 to 50 g/10 min;
and
[IIb] [B-4] a high-pressure radical polymerization low-density polyethylene having such properties that
(i) the melt flow rate (MFR) is in the range of 0.1 to 50 g/10 min, and
(ii) the molecular weight distribution (Mw/Mn, Mw=weight-average molecular weight, Mn=number-average molecular weight) measured by GPC and the melt flow rate (MFR) satisfy the relation $$7.5\times\log(MFR)-1.2\leq Mw/Mn\leq 7.5\times\log(MFR)+12.5;$$

a weight ratio ([Ib]:[IIb]) between said ethylene/α-olefin copolymer composition [Ib] and said high-pressure radical polymerization low-density polyethylene [IIb] being in the range of 99:1 to 60:40.

The fifth to eighth ethylene copolymer compositions according to the present invention are excellent in heat stability and melt tension, and films obtained from these compositions are excellent in transparency, mechanical strength and blocking resistance.

DETAILED DESCRIPTION OF THE INVENTION

The first to eighth ethylene copolymer compositions according to the present invention are described in detail hereinafter.

In this specification, the term "polymerization" is used to mean not only homopolymerization but also copolymerization, and the term "polymer" is used to mean not only a homopolymer but also a copolymer.

First Ethylene Copolymer Composition

The first ethylene copolymer composition according to the present invention is formed from an ethylene/α-olefin copolymer [A-1] and a high-pressure radical polymerization low-density polyethylene [B-1].

[Ethylene/α-olefin Copolymer [A-1]]

The ethylene/α-olefin copolymer [A-1] used in the invention is a random copolymer of ethylene with an α-olefin of 3 to 20 carbon atoms. Examples of the α-olefin of 3 to 20 carbon atoms employable for copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [A-1], it is desired that constituent units derived from ethylene are present in an amount of 55 to 99% by weight, preferably 65 to 98% by weight, more preferably 70 to 96% by weight, and constituent units derived from an α-olefin of 3 to 20 carbon atoms are present in an amount of 1 to 45% by weight, preferably 2 to 35% by weight, more preferably 4 to 30% by weight.

In the invention, the composition of an ethylene/α-olefin copolymer is determined by $^{13}$C-NMR spectrum analysis of a sample prepared by uniformly dissolving about 200 mg of the copolymer in 1 ml of hexachlorobutadiene in a sample tube usually having a diameter of 10 mmø under the conditions of a measuring temperature of 120° C., a measuring frequency of 25.05 MHz, a spectrum width of 1,500 Hz, a pulse repetition period of 4.2 sec and a pulse width of 6 μsec.

The ethylene/α-olefin copolymer [A-1] used in the invention has the following properties (i) to (vi).

(i) The density (d) is usually in the range of 0.880 to 0.960 g/cm$^3$, preferably 0.890 to 0.935 g/cm$^3$, more preferably 0.905 to 0.930 g/cm$^3$.

In the invention, the density (d) of an ethylene/α-olefin copolymer is determined by means of a density gradient tube using a strand, which has been obtained at the time of a melt flow rate (MFR) measurement described below and which is treated by heating at 120° C. for 1 hour and slowly cooling to room temperature over 1 hour.

(ii) The melt flow rate (MFR) is usually in the range of 0.01 to 200 g/10 min, preferably 0.05 to 50 g/10 min, more preferably 0.1 to 10 g/10 min.

In the invention, the melt flow rate (MFR) of an ethylene/α-olefin copolymer is determined in accordance with ASTM D1238-65T under the conditions of a temperature of 190° C. and a load of 2.16 kg.

(iii) The temperature (Tm (° C.)) at which the endothermic curve of the copolymer measured by a differential scanning calorimeter (DSC) shows the maximum peak and the density (d) satisfy the relation:

$Tm < 400 \times d - 250$, preferably $Tm < 450 \times d - 297$, more preferably $Tm < 500 \times d - 344$, particularly preferably $Tm < 550 \times d - 391$.

In the invention, the temperature (Tm (° C.)) at which the endothermic curve of an ethylene/α-olefin copolymer measured by a differential scanning calorimeter (DSC) shows the maximum peak is sought from an endothermic curve obtained by filling about 5 mg of a sample in an aluminum pan, heating to 200° C. at a rate of 10° C./min, holding the sample at 200° C. for 5 minutes, lowering the temperature to room temperature at a rate of 20° C./min, and then heating at a rate of 10° C./min. This measurement is carried out using a DSC-7 type apparatus produced by Perkin Elmer Co.

(iv) The melt tension (MT (g)) and the melt flow rate (MFR) satisfy the relation:

$MT > 2.2 \times MFR^{-0.84}$.

The ethylene/α-olefin copolymer [A-1] employable for the invention is excellent in melt tension (MT) and has good moldability.

In the invention, the melt tension (MT (g)) of an ethylene/α-olefin copolymer is determined by measuring a stress given when a molten copolymer was stretched at a constant rate. That is, a powdery polymer was melted in a conventional manner, and the molten polymer was pelletized to give a measuring sample. Then, the MT of the sample was measured under the conditions of a resin temperature of 190° C., an extrusion rate of 15 mm/min and a take-up rate of 10 to 20 m/min using a MT measuring apparatus (produced by Toyo Seiki Seisakusho K.K.) having a nozzle diameter of 2.09 mmø and a nozzle length of 8 mm. During the pelletization, to the ethylene/α-olefin copolymer [A-1] were added tri(2,4-di-t-butylphenyl)phosphate as a secondary antioxidant in an amount of 0.05% by weight, n-octadecyl-3-(4'-hydroxy-3',5'-di-t-butylphenyl)propionate as a heat stabilizer in an amount of 0.1% by weight and calcium stearate as a hydrochloric acid absorbent in an amount of 0.05% by weight.

(v) The flow index (FI (1/sec)) defined by a shear rate which is given when a shear stress of a molten copolymer at 190° C. reaches $2.4 \times 10^6$ dyne/cm$^2$ and the melt flow rate (MFR) satisfy the relation:

$FI > 75 \times MFR$, preferably $FI > 100 \times MFR$, more preferably $FI > 120 \times MFR$.

The ethylene/α-olefin copolymer [A-1] whose FI and MFR satisfy the above-mentioned relation shows a small processing torque because a low stress can be kept even at a high-shear rate, and has good moldability.

In the invention, the flow index (FI) of an ethylene/α-olefin copolymer is defined by a shear rate which is given when a shear stress reaches $2.4 \times 10^6$ dyne/cm$^2$ at 190° C. The flow index (FI) is determined by extruding a resin from a capillary while changing a shear rate and measuring the shear rate given when the shear stress reaches the above-mentioned value. In this measurement, the same sample as described in the above-mentioned MT measurement is used, and the FI is measured under the conditions of a resin temperature of 190° C. and a shear stress of about $5 \times 10^4$ to $3 \times 10^6$ dyne/cm$^2$ using a capillary type flow property tester produced by Toyo Seiki Seisakusho K.K.

In the measurement, a diameter of the nozzle (capillary) is changed as follows depending on the MFR (g/10 min) of the resin to be measured:

in the case of MFR>20: 0.5 mm
in the case of 20≧MFR>3: 1.0 mm
in the case of 3≧MFR>0.8: 2.0 mm, and
in the case of 0.8≧MFR: 3.0 mm.

(vi) The quantity fraction (W (% by weight)) of a n-decane-soluble component at 23° C. and the density (d) satisfy the relation:

in the case of MFR≦10 g/10 min, $W < 80 \times \exp(-100(d-0.88)) + 0.1$, preferably $W < 60 \times \exp(-100(d-0.88)) + 0.1$, more preferably $W < 40 \times \exp(-100(d-0.88)) + 0.1$, in the case of MFR>10 g/10 min, $W < 80 \times (MFR-9)^{0.26} \times \exp(-100(d-0.88)) + 0.1$.

In the invention, the measurement of the n-decane-soluble component quantity of an ethylene/α-olefin copolymer (polymer having a smaller soluble component quantity has a narrower composition distribution) is carried out by adding about 3 g of the copolymer to 450 ml of n-decane, dissolving the copolymer at 145° C., cooling the resulting solution to 23° C., removing a n-decane-insoluble portion by filtering, and recovering a n-decane-soluble portion from the filtrate.

It may be concluded that the ethylene/α-olefin copolymer [A-1] which satisfies the above mentioned relation between the temperature (Tm) at which the endothermic curve measured by a differential scanning calorimeter (DSC) shows the maximum peak and the density (d), and the relation between the quantity fraction (W) of a n-decane-soluble component and the density (d), has a narrow composition distribution.

Further, the number of unsaturated bond present in the molecule of the ethylene/α-olefin copolymer [A-1] desirably is not more than 0.5 per 1,000 carbon atoms and less than 1 per one molecule of the copolymer.

In the invention, the number of unsaturated bond of an ethylene/α-olefin copolymer is determined by means of $^{13}$C-NMR, that is, an area intensity of signals assigned to bond other than double bond, i.e., signals within the range of 10 to 50 ppm, and an area intensity of signals assigned to double bond, i.e., signals within the range of 105 to 150 ppm, are sought from the integral curve, and the number of the unsaturated bond is determined as a ratio thereof.

The ethylene/α-olefin copolymer [A-1] having the properties as mentioned above can be prepared by copolymerizing ethylene with an α-olefin of 3 to 20 carbon atoms in the presence of an olefin polymerization catalyst (1) or a prepolymerization catalyst (1) formed from (a-1) a transition metal compound catalyst component, (b) an organoaluminum oxy-compound catalyst component, (c) a carrier, and if necessary, (d) an organoaluminum compound catalyst component, all components being described later, in such a manner that the resulting copolymer would have a density of 0.880 to 0.960 g/cm$^3$.

First, the transition metal compound catalyst component (a-1) is explained below.

The transition metal compound catalyst component (a-1) (sometimes referred to as "component (a-1)" hereinafter) is a compound of a transition metal in Group IVB of the periodic table which has a bidentate ligand formed by bonding two groups selected from specific indenyl or substituted indenyl groups through a lower alkylene group, or a compound of a transition metal in Group IVB of the periodic table which has as a ligand a cyclopentadienyl group having 2–5 substituent groups selected From methyl groups and ethyl groups. Concretely, the component (a-1) is a transition metal compound represented by the following formula [I] or [II].

$$MKL^1_{x-2} \qquad [I]$$

In the formula [I], M is a transition metal atom selected from Group IVB of the periodic table, K and L$^1$ are each a ligand coordinating to the transition metal atom. The ligand K is a bidentate ligand formed by bonding the same or different indenyl groups, substituted indenyl groups or their partially hydrogenated products through a lower alkylene group, and the ligand L$^1$ is a hydrocarbon group of 1 to 12 carbon atoms, an alkoxy group, an aryloxy group, a halogen atom, a trialkylsilyl group or a hydrogen atom. X is a valance of the transition metal atom M.

$$ML^2_x \qquad [II]$$

In the formula [II], M is a transition metal atom selected from Group IVB of the periodic table, L$^2$ is a ligand coordinating to the transition metal atom, at least two of L$^2$ are substituted cyclopentadienyl groups having 2–5 substituent groups selected from methyl group and ethyl group, and L$^2$ other than the substituted cyclopentadienyl group is a hydrocarbon group of 1 to 12 carbon atoms, an alkoxy group, an aryloxy group, a halogen atom, a trialkylsilyl group or a hydrogen atom. X is a valance of the transition metal atom M.

In the above formula [I], M is a transition metal atom selected from Group IVB of the periodic table, and it is concretely zirconium, titanium or hafnium, preferably zirconium.

K is a ligand coordinating to the transition metal atom, and is a bidentate ligand formed by bonding the same or different indenyl groups, substituted indenyl groups or partially hydrogenated products of the indenyl or substituted indenyl groups through a lower alkylene group.

Concrete examples thereof include ethylenebisindenyl group, ethylenebis(4,5,6,7-tetrahydro-1-indenyl) group, ethylenebis(4-methyl-1-indenyl) group, ethylenebis(5-methyl-1-indenyl) group, ethylenebis(6-methyl-1-indenyl) group and ethylenebis(7-methyl-1-indenyl) group.

L$^1$ is a hydrocarbon group of 1 to 12 carbon atoms, an alkoxy group, an aryloxy group, a halogen atom, a trialkylsilyl group or a hydrogen atom.

Examples of the hydrocarbon group of 1 to 12 carbon atoms include alkyl group, cycloalkyl group, aryl group and aralkyl group. Concrete examples thereof include alkyl group such as methyl group, ethyl croup, n-propyl group, isopropyl group, n-butyl group, isobutyl group, sec-butyl group, t-butyl group, pentyl group, hexyl group, octyl group, 2-ethylhexyl group and decyl group; cycloalkyl group such as cyclopentyl group and cyclohexyl group; aryl group such as phenyl group and tolyl group; and aralkyl group such as benzyl group and neophyl group.

Examples of the alkoxy group include methoxy group, ethoxy group, n-propoxy group, isopropoxy group, n-butoxy group, isobutoxy group, sec-butoxy group, t-butoxy group, pentoxy group, hexoxy group and octoxy group.

Examples of the aryloxy group include phenoxy group and the like.

Examples of the halogen atom include fluorine, chlorine, bromine and iodine.

Examples of the trialkylsilyl group include trimethylsilyl group, triethylsilyl group and. triphenylsilyl group.

Listed below are examples of the transition metal compound represented by the formula [I].

Ethylenebis(indenyl)zirconium dichloride,
Ethylenebis(4-methyl-1-indenyl)zirconium dichloride,
Ethylenebis(4,5,6,7-tetrahydro-1-indenyl)zirconium dichloride,
Ethylenebis(5-methyl-1-indenyl)zirconium dichloride,
Ethylenebis(6-methyl-1-indenyl)zirconium dichloride,
Ethylenebis(7-methyl-1-indenyl)zirconium dichloride,
Ethylenebis(4-methyl-1-indenyl)zirconium dibromide,
Ethylenebis(4-methyl-1-indenyl)zirconium methoxychloride,
Ethylenebis(4-methyl-1-indenyl)zirconium ethoxychloride,
Ethylenebis(4-methyl-1-indenyl)zirconium butoxychloride,
Ethylenebis(4-methyl-1-indenyl)zirconium dimethoxide,
Ethylenebis(4-methyl-1-indenyl)zirconium methylchloride
Ethylenebis(4-methyl-1-indenyl)dimethylzirconium,
Ethylenebis(4-methyl-1-indenyl)zirconium benzylchloride,
Ethylenebis(4-methyl-1-indenyl)dibenzylzirconium,
Ethylenebis(4-methyl-1-indenyl)zirconium phenylchloride, and
Ethylenebis(4-methyl-1-indenyl)zirconium hydride chloride.

Also employable in the invention are transition metal compounds obtained by substituting titanium metal or hafnium metal for the zirconium metal in the above-exemplified zirconium compounds.

Of the above-exemplified transition metal compounds represented by the formula [I], particularly preferred are ethylenebis(indenyl)zirconium dichloride, ethylenebis(4-methyl-1-indenyl)zirconium dichloride and ethylenebis(4,5,6,7-tetrahydro-1-indenyl)zirconium dichloride.

In the above-mentioned formula [II], M is a transition metal selected from Group IVB of the periodic table, and concrete preferable examples of M include zirconium, titanium and hafnium. Of these, particularly preferred is zirconium.

$L^2$ is a ligand coordinated to the transition metal, and at least two of them are substituted cyclopentadienyl groups having 2–5 of substituents selected from methyl group and ethyl group. Each of ligand may be the same or different. The substituted cyclopentadienyl groups are the substituted cyclopentadienyl groups having 2 or more of substituents, preferably the substituted cyclopentadienyl groups having 2 or 3 of substituents, more preferably the substituted cyclopentadienyl groups having two substituents, particularly the 1,3-substituted cyclopentadienyl groups. Each of substituent may be the same or different.

In the above-mentioned formula [II], ligand $L^2$ other than the substituted cyclopentadienyl group is a hydrocarbon group of 1 to 12 carbon atoms, an alkoxy group, an aryloxy group, halogen, trialkylsilyl group or hydrogen as similar to the ligand $L^1$ in the above-mentioned formula [I].

The transition metal compound represented by the general formula [II] include, for example, Bis(dimethylcyclopentadienyl)zirconium dichloride,
Bis(diethylcyclopentadienyl)zirconium dichloride,
Bis(methylethylcyclopentadienyl)zirconium dichloride,
Bis(dimethylethylcyclopentatienyl)zirconium dichloride,
Bis(dimethylcyclopentadienyl)zirconium dibromide,
Bis(dimethylcyclopentadienyl)zirconium methoxychloride,
Bis(dimethylcyclopentadienyl)zirconium ethoxychloride,
Bis(dimethylcyclopentadienyl)zirconium butoxychloride,
Bis(dimethylcyclopentadienyl)zirconium diethoxide,
Bis(dimethylcyclopentadienyl)zirconium methylchloride,
Bis(dimethylcyclopentadienyl)zirconium dimethyl,
Bis(dimethylcyclopentadienyl)zirconium benzylchloride,
Bis(dimethylcyclopentadienyl)zirconium dibenzyl,
Bis(dimethylcyclopentadienyl)zirconium phenylchloride,
and Bis(dimethylcyclopentadienyl)zirconium hydridechloride.

In the above exemplified compounds, di-substituted cyclopentadienyl include 1,2- and 1,3-substituted, and tri-substituted include 1,2,3- and 1,2,4-substituted.

There may also be used transition metal compounds obtained by substituting titanium or hafnium for zirconium in the above-exemplified zirconium compounds.

In the above-mentioned transition metal compounds represented by the general formula [II], particularly preferred is
Bis(1,3-dimethylcyclopentadienyl)zirconium dichloride,
Bis(1,3-diethylcyclopentadienyl)zirconium dichloride, or
Bis(1-methyl-3-ethylcyclopentadienyl)zirconium dichloride.

Next, the organoaluminum oxy-compound (b) [hereinafter sometimes referred to as component (b)] is explained below.

The organoaluminum oxy-compound (b) may be a known benzene-soluble aluminoxane or the benzene-insoluble organoaluminum oxy-compound having been disclosed in Japanese Patent L-O-P No. 276807/1990.

The above-mentioned aluminoxane may be prepared, for example, by the following procedures:

(1) a procedure for recovering an aluminoxane as its hydrocarbon solution which comprises adding an organoaluminum compound such as trialkylaluminum to a suspension in a hydrocarbon medium of a compound containing adsorbed water, or a salt containing water of crystallization such as magnesium chloride hydrate, copper sulfate hydrate, aluminum sulfate hydrate, nickel sulfate hydrate and cerium chloride hydrate, and reacting the organoaluminum compound; and (2) a procedure for recovering an aluminoxane as its hydrocarbon solution which comprises reacting water, ice or steam directly with an organoaluminum compound such as trialkylaluminum in a solvent such as benzene, toluene, ethyl ether and tetrahydrofuran.

(3) a procedure for recovering an aluminoxane which comprises reacting an organotinoxide such as dimethyltinoxide and dibutyltinoxide with an organoaluminum compound such as trialkylaluminum in a solvent such as decane, benzene or toluene.

Moreover, the aluminoxane may contain a small amount of an organometal component. Furthermore, the solvent or unreacted organoaluminum compound may be removed from the above-mentioned recovered aluminoxane-containing solution, by distillation, and the aluminoxane may be redissolved in a solvent.

Concrete examples of the organoaluminum compound used for the preparation of the aluminoxane include trialkylaluminum such as trimethylaluminum, triethylaluminum, tripropylaluminum, triisopropylaluminum, tri-n-butylaluminum, triisobutylaluminum, tri-sec-butylaluminum, tri-tert-butylaluminum, tripentylaluminum, trihexylaluminum, trioctylaluminum and tridecylaluminum;

tricycloalkylaluminums such as tricyclohexylaluminum and tricyclooctylaluminum;

dialkylaluminum halides such as dimethylaluminum chloride, diethylaluminum chloride, diethylaluminum bromide and diisobutylalumunum chloride;

dialkylaluminum hydrides such as diethylaluminum hydride and diisobutylaluminum hydride;

dialkylaluminum alkoxides such as dimethylaluminum methoxide and diethylaluminum ethoxide; and dialkylaluminum aryloxides such as diethylaluminum phenoxide.

Of these compounds, trialkylaluminum is particularly preferable.

Furthermore, there may also be used as the organoaluminum compound isoprenylaluminum represented by the general formula

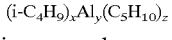

wherein x, y and z are each a positive number, and z≧2x.

The organoaluminum compounds mentioned above may be used either singly or in combination.

Solvents used for the solutions of the aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; and halogenated compounds derived from the above-mentioned aromatic hydrocarbons, aliphatic hydrocarbons and alicyclic hydrocarbons, especially chlorinated and brominated hydrocarbons.

In addition, there may also be used ethers such as ethyl ether and tetrahydrofuran. Of these solvents as exemplified above, aromatic hydrocarbons are particularly preferred.

The benzene-insoluble organoaluminum oxy-compounds used as component (b) contain an Al component soluble in benzene at 60° C. in an amount of not greater than 10%, preferably not greater than 5%, particularly preferable not greater than 2% in terms of Al atom, and they are insoluble or sparingly soluble in benzene.

Solubility in benzene of such organoaluminum oxy-compounds as mentioned above is obtained by suspending in 100 ml of benzene the organoaluminum oxy-compound in an amount corresponding to 100 mg atoms in terms of Al, mixing the resulting suspension at 60° C. for 6 hours with stirring, filtering the resulting mixture with a G-5 glass filter equipped with a jacket kept at 60° C., washing 4 times the solid portion separated on the filter with 50 ml of benzene at 60° C., and measuring the amount (x mmole) of Al atoms present in the whole filtrate.

Next, the carrier (c) is explained below. The carrier (c) [hereinafter sometimes referred to as component (c)] is a solid inorganic or organic compound in granules or fine particles having a particle size of 10 to 300 μm, preferably 20 to 200 μm. Of these carriers, porous oxides are preferable as inorganic carriers. Concrete examples of the oxide carriers include $SiO_2$, $Al_2O_3$, $MgO$, $ZrO_2$, $TiO_2$, $B_2O_3$, $CaO$, $ZnO$, $BaO$, $ThO_2$, or a mixture of these compounds such as $SiO_2$—$MgO$, $SiO_2$—$Al_2O_3$, $SiO_2$—$TiO_2$, $SiO_2$—$V_2O_5$, $SiO_2$—$Cr_2O_3$ and $SiO_2$—$TiO_2$—$MgO$. Of these carriers, preferred are those comprising at least one compound selected from the group consisting or $SiO_2$ and $Al_2O_3$ as a major component.

Furthermore, the above-mentioned inorganic oxide or oxides may also contain a small amount of a carbonate, a sulfate, a nitrate and an oxide such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $LiO_2$.

Though the porous inorganic carriers have different properties among them depending on the types and preparation methods thereof, the carriers preferably used in the invention have a specific surface area of 50 to 1000 m²/g, preferably 100 to 700 m²/g, a pore volume of desirably 0.3 to 2.5 cm³/g. The carriers are prepared if necessary by firing at a temperature of 100 to 1000° C., preferably 150 to 700° C.

Moreover, there can be mentioned organic compounds in solid granules or fine solid particles each having a particle size of 10 to 300 μm as carriers which can be used as the component (c). Examples of these organic compounds include (co)polymers containing as the main component constituent units derived from an α-olefin of 2 to 14 carbon atoms, such as ethylene, propylene, 1-butene and 4-methyl-1-pentene, or polymers or copolymers containing as the main component constituent units derived From vinylcyclohexane or styrene.

Next, the optionally used organoaluminum compound catalyst component (d) is explained below.

Examples of the organoaluminum compound (d) [hereinafter sometimes referred to as component (d)] include an organoaluminum compound represented by the following formula [III].

$$R^1{}_n AlX_{3-n} \qquad [III]$$

wherein $R^1$ is a hydrocarbon group of 1 to 12 carbon atoms, X is halogen or hydrogen, and n is 1 to 3.

In the above formula [III], $R^1$ is a hydrocarbon group of 1 to 12 carbon atoms, for example, an alkyl group, a cycloalkyl group or an aryl group. Concrete examples of $R^1$ include methyl, ethyl, n-propyl, isopropyl, isobutyl, pentyl, hexyl, octyl, cyclopentyl, cyclohexyl, phenyl and tolyl.

Concrete examples of such organoaluminum compounds (d) include trialkylaluminum such as trimethylaluminum, triethylaluminum, triisopropylaluminum, triisobutylaluminum, trioctylaluminum and tri-2-ethylhexylaluminum;

alkenylaluminum such as isoprenylaluminum;

dialkylaluminum halides such as dimethylaluminum chloride, diethylaluminum chloride, diisopropylaluminum chloride, diisobutylaluminum chloride and dimethylaluminum bromide;

alkylaluminum sesquihalides such as methylaluminum sesquichloride, ethylaluminum sesquichloride, isopropylaluminum sesquichloride, butylaluminum sesquichloride and ethylaluminum sesquibromide;

alkylaluminum dihalides such as methylaluminum dichloride, ethylaluminum dichloride, isopropylaluminum dichloride and ethylaluminum dibromide; and alkylaluminum hydrides such as diethylaluminum hydride and diisobutylaluminum hydride.

Furthermore, there may also be used other organoaluminum compounds represented by the following formula [IV] as the organoaluminum compound catalyst component (d);

$$R^1{}_n AlY_{3-n} \qquad [IV]$$

wherein $R^1$ is as defined previously, Y is —$OR^2$, —$OSiR^3{}_3$, —$OAlR^4{}_2$, —$NR^5{}_2$, —$SiR^6{}_3$ or —$N(R^7)AlR^8{}_2$, n is 1 to 2, $R^2$, $R^3$, $R^4$ and $R^8$ are each methyl, ethyl, isopropyl, isobutyl, cyclohexyl or phenyl, $R^5$ is hydrogen, methyl, ethyl, isopropyl, phenyl or trimethylsilyl, $R^6$ and $R^7$ are each methyl or ethyl.

The organoaluminum compounds as mentioned above include, in concrete, such compounds as enumerated below.

(1) Compounds of the formula $R^1{}_n Al(OR^2)_{3-n}$ such as dimethylaluminum methoxide, diethylaluminum ethoxide and diisobutylaluminum methoxide.

(2) Compounds of the formula $R^1{}_n Al(OSiR^3{}_3)_{3-n}$ such as $Et_2Al(OSiMe_3)$, $(iso\text{-}Bu)_2Al(OSiMe_3)$ and $(iso\text{-}Bu)_2Al(OSiEt_3)$.

(3) Compounds of the formula $R^1{}_n Al(OAlR^4{}_2)_{3-n}$ such as $Et_2AlOAlEt_2$ and $(iso\text{-}Bu)_2AlOAl(iso\text{-}Bu)_2$.

(4) Compounds of the formula $R^1{}_n Al(NR^5{}_2)_{3-n}$ such as $Me_2AlNEt_2$, $Et_2AlNHMe$, $Me_2AlNHEt$, $Et_2AlN(SiMe_3)_2$, $(iso\text{-}Bu)_2AlN(SiMe_3)_2$.

(5) Compounds of the formula $R^1{}_n Al(SiR^6{}_3)_{3-n}$ such as $(iso\text{-}Bu)_2AlSiMe_3$.

(6) Compounds of the formula $$R^1{}_n Al(NAlR^8{}_2)_{3-n}$$
$$\quad\quad\quad |$$
$$\quad\quad\quad R^7$$

such as $$Et_2AlNAlEt_2 \quad \text{and} \quad (iso\text{-}Bu)_2AlNAl(iso\text{-}Bu)_2.$$
$$\quad\;\; | \qquad\qquad\qquad\qquad\quad |$$
$$\quad\;\; Me \qquad\qquad\qquad\qquad\; Et$$

Of the organoaluminum compounds as exemplified above, preferred are those having the formulas $$R^1{}_3Al, R^1{}_n Al(OR^2)_{3-n} \text{ and } R^1{}_n Al(OAlR^4{}_2)_{3-n},$$

and particularly preferred are those having the above-mentioned formulas in which $R^1$ is isoalkyl and n is 2.

The ethylene/α-olefin copolymer [A-1] used in the present invention can be prepared by the olefin polymerization catalyst (1) formed by contacting the above-mentioned components (a-1), (b), (c) and if necessary, component (d). Though the mixing of these components (a-1), (b), (c) and (d) may be conducted in arbitrarily selected order, the mixing and contacting is preferably conducted in the order of:

mixing and contacting the components (b) and (c), followed by mixing and contacting the component (a-1), and if necessary, mixing and contacting the component (d).

The mixing of the above-mentioned components (a-1), (b), (c) and (d) can be carried out in an inert hydrocarbon.

As the inert hydrocarbon solvent for preparing the catalyst, there may be mentioned an aliphatic hydrocarbon, such as propane, butane, pentane, hexane, heptane, octane, decane, dodecane and kerosene;

an alicyclic hydrocarbon, such as cyclopentane, cyclohexane and methylcyclopentane;

an aromatic hydrocarbon, such as benzene, toluene and xylene;

a halogenated hydrocarbon, such as ethylene chloride, chlorobenzene and dichloromethane; and a mixture thereof.

In contacting and mixing of the components (a-1), (b), (c) and if necessary, component (d), the component (a-1) is used usually in an amount of $5\times10^{-6}$ to $5\times10^{-4}$ mol, preferably $1\times10^{-5}$ to $2\times10^{-4}$ mol based on 1 g of the component (c), and the concentration thereof is $1\times10^{-4}$ to $2\times10^{-2}$ mol/l, preferably $2\times10^{-4}$ to $1\times10^{-2}$ mol/l. The atomic ratio (Al/transition metal) of the aluminum in the component (b) to the transition metal in the component (a-1) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5.

The components (a-1), (b) and (c), and if necessary, the component (d) are mixed and contacted at a temperature of usually $-50$ to $150°$ C., preferably $-20$ to $120°$ C., with a contact time of 1 minute to 50 hours, preferably 10 minutes to 25 hours.

In the catalyst (1) for olefin polymerization obtained as described above, it is desirable that the transition metal derived from component (a-1) is supported in an amount of $5\times10^{-6}$ to $5\times10^{-4}$ g atom, preferably $1\times10^{-5}$ to $2\times10^{-4}$ g atom, and aluminum derived from components (b) and (d) is supported in an amount of $10^{-3}$ to $5\times10^{-2}$ g atom, preferably $2\times10^{-3}$ to $2\times10^{-2}$ g atom, all the amounts being based on 1 g of the component (c).

Further, the catalyst for preparing the ethylene/α-olefin copolymer [A-1] used in the present invention may be a prepolymerized catalyst (1) obtained by prepolymerization of olefin in the presence of the above-mentioned components (a-1), (b) and (c), and if necessary, (d).

The prepolymerized catalyst (1) can be prepared by mixing the component (a-1), the component (b), the component (c), and if necessary, the component (d), introducing olefin to the resulting mixture in the inert hydrocarbon solvent, and carrying out prepolymerization.

The olefins which can be prepolymerized include ethylene and α-olefins each having 3 to 20 carbon atoms, for example, propylene, 1-butene, 1-pentene, 4-methyl-1-pentene, 1-hexene, 1-octene, 1-decene, 1-dodecene and 1-tetradecene. Of these, particularly preferred is ethylene or the combination of ethylene and α-olefin used in the polymerization.

During the prepolymerization, the component (a-1) is used usually in a concentration of is $1\times10^{-6}$ to $2\times10^{-2}$ mol/l, preferably $5\times10^{-5}$ to $1\times10^{-2}$ mol/l and amount thereof is usually $5\times10^{-6}$ to $5\times10^{-4}$ mol, preferably $1\times10^{-5}$ to $2\times10^{-4}$ mol based on 1 g of the component (c). The atomic ratio (Al/transition metal) of the aluminum in the component (b) to the transition metal in the component (a-1) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5. The prepolymerization is carried out at a temperature of $-20$ to $80°$ C., preferably 0 to $60°$ C., with a time of 0.5 to 100 hours, preferably 1 to 50 hours.

The prepolymerized catalyst (1) can be prepared as described below. First, the carrier (component (c)) is suspended in the inert hydrocarbon. To the suspension, the organoaluminum oxy-compound catalyst component (component (b)) is introduced, and reacted for predetermined period. Successively, supernatant is removed, and the resulting solid component is re-suspended in the inert hydrocarbon. Into the system, the transition metal compound catalyst component (component (a-1)) is added and reacted for predetermined period. Then, supernatant is removed to obtain a solid catalyst component. Continuously, the solid catalyst component obtained above is added into inert hydrocarbon containing the organoaluminum compound catalyst component (component (d)), and olefin is introduced therein to obtain the prepolymerized catalyst (1).

An amount of prepolymerized polyolefin produced in the prepolymerization is, desirably based on 1 g of the carrier (c), of 0.1 to 500 g, preferably 0.2 to 300 g, more preferably 0.5 to 200 g. In the prepolymerized catalyst (1), component (a-1) is desirably supported in an amount in terms of transition metal atom, based on 1 g of the carrier (c), of about $5\times10^{-6}$ to $5\times10^{-4}$ g atom, preferably $1\times10^{-5}$ to $2\times10^{-4}$ g atom. Further, a molecular ratio (Al/M) of aluminum atom (Al) derived from components (b) and (d) to transition metal atom (M) derived from component (a-1) is usually 5 to 200, preferably 10 to 150.

The prepolymerization may be carried out either batchwise or continuously, and under reduced pressure, normal pressure or applied pressure. During the prepolymerization, hydrogen may be allowed to be present to obtain a prepolymer desirably having an intrinsic viscosity [η] of 0.2 to 7 dl/g, preferably 0.5 to 5 dl/g as measured in decalin at least $135°$ C.

The ethylene/α-olefin copolymers [A-1] used in the present invention are obtained by copolymerizing ethylene with an α-olefin having 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene in the presence of the olefin polymerization catalyst (1) or the prepolymerized catalyst (1).

Copolymerization of ethylene and α-olefin is carried out in a gas phase or liquid phase, for example, in slurry. In the slurry polymerization, an inactive hydrocarbon or the olefin itself may be used as a solvent.

Concrete examples of the inactive hydrocarbon solvent include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and gas oil. Of these inactive hydrocarbons, preferred are aliphatic hydrocarbons, alicyclic hydrocarbons and petroleum fractions.

When the copolymerization is carried out by the slurry method or the gas phase method, the olefin polymerization catalyst (1) or the prepolymerized catalyst (1) is used at such amount that the concentration of the transition metal compound becomes usually $10^{-8}$ to $10^{-3}$ g atom/liter, preferably $10^{-7}$ to $10^{-4}$ g atom/liter in terms of the transition metal in the polymerization reaction system.

Furthermore, in the polymerization, an organoaluminum oxy-compound similar to the catalyst component (b) and/or an organoaluminum compound (d) may be added. In this case, the atomic ratio (Al/M) of the aluminum atom (Al) derived from the organoaluminum oxy-compound and the organoaluminum compound to the transition metal atom (M) derived from the transition metal compound catalyst component (a-1) is 5 to 300, preferably 10 to 200, more preferably 15 to 150.

When the ethylene/α-olefin copolymer [A-1] is prepared by the slurry polymerization, the polymerization temperature is usually −50 to 100° C., preferably 0 to 90° C. When the ethylene/α-olefin copolymer [A-1] is prepared by the gas phase polymerization, the polymerization temperature is usually 0 to 120° C., preferably 20 to 100° C.

The polymerization is carried out usually at a normal pressure to 100 kg/cm², preferably under a pressure condition of 2 to 50 kg/cm². The polymerization can be carried out either batchwise, semicontinuously or continuously.

Furthermore, the polymerization may also be carried out in not less than 2 steps having reaction conditions different from each other.

[High-pressure Radical Polymerization Low-density Polyethylene [B-1]]

The high-pressure radical polymerization low-density polyethylene [B-1] used in the invention is a branched polyethylene having a number of long chain branches prepared by so-called high-pressure radical polymerization, and has a melt flow rate (MFR), as determined in accordance with ASTM D1238-65T under the conditions of a temperature of 190° C. and a load of 2.16 kg, of 0.1 to 50 g/10 min, preferably 0.2 to 10 g/10 min, more preferably 0.2 to 8 g/10 min.

In the high-pressure radical polymerization low-density polyethylene [B-1] used in the invention, the index of the molecular weight distribution (Mw/Mn, Mw=weight-average molecular weight, Mn=number-average molecular weight) measured by means of gel permeation chromatography (GPC) and the melt flow rate (MFR) satisfy the relation:

$Mw/Mn \geq 7.5 \times \log(MFR) - 1.2$, preferably $Mw/Mn \geq 7.5 \times \log(MFR) - 0.5$, more preferably $Mw/Mn \geq 7.5 \times \log(MFR)$.

In the invention, the molecular weight distribution (Mw/Mn) of a high-pressure radical polymerization low-density polyethylene is determined as follows using GPC-150C produced by Milipore Co.

That is, in a column of TSK-GNH-HT having a diameter of 72 mm and a length of 600 mm, a sample (concentration: 0.1% by weight, amount: 500 microliters) is moved under the conditions of a moving rate of 1.0 ml/min and a column temperature of 140° C. using o-dichlorobenzene (available from Wako Junyaku Kogyo K.K.) as a mobile phase and 0.025% by weight of BHT (available from Takeda Chemical Industries, Ltd.) as an antioxidant. As a detector, a differential refractometer is used. The standard polystyrenes of $Mw<1000$ and $Mw>4\times10^6$ are available from Toso Co., Ltd., and those of $1,000<Mw<4\times10^6$ are available from Pressure Chemical Co.

The high-pressure radical polymerization low-density polyethylene [B-1] used in the invention desirably has a density (d) of 0.910 to 0.930 g/cm³.

In the invention, the density of a low-density polyethylene is determined by means of a density gradient tube using a strand which has been obtained in the above-mentioned melt flow rate (MFR) measurement and which is treated by heating at 120° C. for 1 hour and slowly cooling to room temperature over 1 hour.

Further, in the high-pressure radical polymerization low-density polyethylene [B-1] used in the invention, a swell ratio indicating a degree of the long chain branch, namely, a ratio (Ds/D) of a diameter (Ds) of a strand to an inner diameter (D) of a nozzle, is desirably not less than 1.3. The strand used herein is a strand extruded from a nozzle having an inner diameter (D) of 2.0 mm and a length of 15 mm at an extrusion rate of 10 mm/min and a temperature of 190° C. using a capillary type flow property tester.

The high-pressure radical polymerization low-density polyethylene [B-1] as mentioned above may be a copolymer obtained by copolymerizing ethylene with a polymerizable monomer such as other α-olefin, vinyl acetate or acrylic ester, provided that the object of the invention is not marred.

[Ethylene Copolymer Composition]

The first ethylene copolymer composition according to the invention comprises the aforementioned ethylene/α-olefin copolymer [A-1] and the high-pressure radical polymerization low-density polyethylene [B-1], and a weight ratio ([A-1]:[B-1]) between the ethylene/α-olefin copolymer [A-1] and the high-pressure radical polymerization low-density polyethylene [B-1] is usually in the range of 99:1 to 60:40, preferably 98:2 to 70:30, more preferably 98:2 to 80:20.

When the amount of the high-pressure radical polymerization low-density polyethylene [B-1] is less than the lower limit of the above range, the resulting composition is sometimes improved insufficiently in the transparency and the melt tension, and when the amount thereof is larger than the upper limit of the above range, the resulting composition is sometimes markedly deteriorated in the tensile strength and the stress crack resistance.

The first ethylene copolymer composition according to the invention may contain various additives if desired, for example, weathering stabilizer, heat stabilizer, antistatic agent, anti-slip agent, anti-blocking agent, antifogging agent, lubricant, pigment, dye, nucleating agent, plasticizer, anti-aging agent, hydrochloric acid absorbent and antioxidant, provided that the object of the invention is not marred.

The first ethylene copolymer composition according to the invention can be prepared by known processes, for example, processes described below.

(1) A process of mechanically blending the ethylene/α-olefin copolymer [A-1], the high-pressure radical polymerization low-density polyethylene [B-1], and if necessary, other optional components by the use of an extruder, a kneader or the like.

(2) A process comprising dissolving the ethylene/α-olefin copolymer [A-1], the high-pressure radical polymerization low-density polyethylene [B-1], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer [A-1], the high-pressure radical polymerization low-density polyethylene [B-1], and if necessary, other optional components in an appropriate good solvent to prepare solutions, then mixing the solutions, and removing the solvent from the resulting mixture.

(4) A process of combining the above processes (1) to (3).

The first ethylene copolymer composition according to the present invention is subjected to ordinary air-cooling inflation molding, two-stage air-cooling inflation molding, high-speed inflation molding, T-die film molding, water-cooling inflation molding or the like, to obtain a film. The film thus obtained is excellent in transparency and mechanical strength, and has properties inherently belonging to general LLDPE, such as heat-sealing properties, hot-tack properties, heat resistance and blocking resistance. Further, the film is free from surface stickiness because the ethylene/α-olefin copolymer [A-1] has a prominently narrow composition distribution. Moreover, because of low stress within the high-shear region, the ethylene copolymer composition can be extruded at a high speed, and consumption of electric power is small, resulting in economical advantage.

Films obtained by processing the first ethylene copolymer composition of the invention are suitable for, for example, standard bags, heavy bags, wrapping films, materials for laminates, sugar bags, packaging bags for oily goods, packaging bags for moist goods, various packaging films such as those for foods, bags for liquid transportation and agricultural materials. The films may also be used as multi-layer films by laminating the films on various substrates such as a nylon substrate and a polyester substrate. Further, the films may be used for liquid transportation bags obtained by blow molding, bottles obtained by blow molding, tubes and pipes obtained by extrusion molding, pull-off caps, injection molded products such as daily use miscellaneous goods, fibers, and large-sized molded articles obtained by rotational molding.

Second Ethylene Copolymer Composition

The second ethylene copolymer composition according to the present invention comprises an ethylene/α-olefin copolymer [A-1] and a crystalline polyolefin [B-2].

[Ethylene/α-olefin Copolymer [A-1]]

The ethylene/α-olefin copolymer [A-1] employable for the second ethylene copolymer composition is the same as the ethylene/α-olefin copolymer used for the first ethylene copolymer composition described above.

[Crystalline Polyolefin [B-2]]

The crystalline polyolefin [B-2] used in the invention is at least one crystalline polyolefin selected from the following crystalline polyolefins (B-I) to (B-III).

Crystalline Polyolefin (B-I)

The crystalline polyolefin (B-I) used in the invention is an ethylene homopolymer having a crystallinity measured by X-ray diffractometry of not less than 65%, or a copolymer of ethylene with an α-olefin of 3 to 20 carbon atoms having the crystallinity of not less than 40%. The crystalline polyolefin (B-I) has a melt flow rate (MFR), as determined in accordance with ASTM D1238-65T under the conditions of a temperature of 190° C. and a load of 2.16 kg, of 0.01 to 100 g/10 min, preferably 0.05 to 50 g/10 min, and has a density of not less than 0.900 g/cm$^3$, preferably not less than 0.950 g/cm$^3$, more preferably 0.960 to 0.970 g/cm$^3$.

The crystalline polyolefin (B-I) is prepared by using non-metallocene type catalyst, preferably non-metallocene type Ziegler catalyst.

Examples of the α-olefin of 3 to 20 carbon atoms include propylene, 1-butene, 1-pentene, 1-hexene, 4-methyl-1-pentene, 1-octene, 1-decene and mixtures thereof. Of these, an α-olefin of 3 to 10 carbon atoms is preferably employed. A molar ratio of ethylene to α-olefin (ethylene/α-olefin) in the copolymer varies depending on the kind of the α-olefin used, but generally is in the range of 100/0 to 99/1, preferably 100/0 to 99.5/0.5.

The crystalline polyolefin (B-I) used in the invention may contain constituent units other than the constituent units derived from α-olefin, such as those derived from diene compounds, provided that the properties of the crystalline polyolefin (B-1) are not marred.

Examples of the constituent units other than the constituent units derived from α-olefin include constituent units derived from chain non-conjugated dienes such as 1,4-hexadiene, 1,6-octadiene, 2-methyl-1,5-hexadiene, 6-methyl-1,5-heptadiene and 7-methyl-1,6-octadiene;

constituent units derived from cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; and constituent units derived from diene compounds such as 2,3-diisopropylidene-5-norbornene, 2-ethylidene-3-isopropylidene-5-norbornene and 2-propenyl-2,2-norbornadiene.

The diene components may be used alone or in combination. The content of the diene component is usually in the range of 0 to 1% by mol, preferably 0 to 0.5% by mol.

The crystalline polyolefin (B-I) can be prepared by a known process.

Crystalline Polyolefin (B-II)

The crystalline polyolefin (B-II) used in the invention is a propylene homopolymer having a crystallinity measured by X-ray diffractometry of not less than 50%, or a copolymer of propylene with at least one olefin selected from ethylene and an α-olefin of 4 to 20 carbon atoms having the crystallinity of not less than 30%. The crystalline polyolefin (B-II) has a melt flow rate (MFR), as determined in accordance with ASTM D1238-65T under the conditions of a temperature of 230° C. and a load of 2.16 kg, of 0.1 to 100 g/10 min, preferably 0.5 to 50 g/10 min, and has a density of not less than 0.900 g/cm$^3$, preferably 0.900 to 0.920 g/cm$^3$.

Examples of the α-olefin of 4 to 20 carbon atoms include 1-butene, 1-pentene, 1-hexene, 4-methyl-1-pentene, 1-octene, 1-decene and mixtures thereof. Of these, an α-olefin of 4 to 10 carbon atoms is preferably employed.

In the copolymer of propylene with at least one of ethylene and α-olefin of 4 to 20 carbon atoms, a molar ratio of propylene to ethylene and α-olefin of 4 to 20 carbon atoms (propylene/α-olefin, α-olefin includes ethylene) varies depending on the kind of the α-olefin used, but generally is in the range of 100/0 to 90/10, preferably 100/0 to 95/5.

The crystalline polyolefin (B-II) used in the invention may contain constituent units derived from the diene compounds employable for the aforesaid crystalline polyolefin (B-I), provided that the properties of the crystalline polyolefin (B-II) are not marred. The content of the diene component is usually in the range of 0 to 1% by mol, preferably 0 to 0.5% by mol.

The crystalline polyolefin (B-II) can be prepared by a known process.

Crystalline Polyolefin (B-III)

The crystalline polyolefin (B-III) used in the invention is a homopolymer of an α-olefin of 4 to 20 carbon atoms having a crystallinity measured by X-ray diffractometry of not less than 30%, or a copolymer of α-olefins of 4 to 20 carbon atoms having the crystallinity of not less than 30%. The crystalline polyolefin (B-III) has a melt flow rate (MFR), as determined in accordance with ASTM D1238-65T under the conditions of a temperature of 230° C. and a load of 2.16 kg, of 0.1 to 100 g/10 min, preferably 0.5 to 50 g/10 min, and has a density of not less then 0.900 g/cm$^3$, preferably 0.900 to 0.920 g/cm$^3$.

Examples of the α-olefin of 4 to 20 carbon atoms include 1-butene, 1-pentene, 1-hexene, 4-methyl-1-pentene, 1-octene and 1-decene. Of these, an α-olefin of 4 to 10 carbon atoms is preferably employed.

In the copolymer comprising at least two kinds of α-olefins of 4 to 20 carbon atoms, a molar ratio ((a)/(b)) of one α-olefin (a) selected from α-olefins of 4 to 20 carbon atoms to the other α-olefin (b) selected from α-olefins of 4 to 20 carbon atoms varies depending on the kind of the α-olefins used, but generally is in the range of 100/0 to 90/10, preferably 100/0 to 95/5.

The crystalline polyolefin (B-III) used in the invention may contain constituent units derived from the diene compounds employable for the aforesaid crystalline polyolefin (B-I), provided that the properties of the crystalline polyolefin (B-III) are not marred. The content of the diene component is usually in the range of 0 to 1% by mol, preferably 0 to 0.5% by mol.

The crystalline polyolefin (B-III) can be prepared by a known process.

[Ethylene Copolymer Composition]

The second ethylene copolymer composition according to the invention comprises the aforementioned ethylene/α-olefin copolymer [A-1] and the crystalline polyolefin [B-2], and a weight ratio ([A-1]:[B-2]) between the ethylene/α-olefin copolymer [A-1] and the crystalline polyolefin [B-2] is usually in the range of 99:1 to 60:40, preferably 98:2 to 70:30, more preferably 95:5 to 80:20.

The second ethylene copolymer composition according to the invention may contain various additives if desired, for example, weathering stabilizer, heat stabilizer, antistatic agent, anti-slip agent, anti-blocking agent, antifogging agent, lubricant, pigment, dye, nucleating agent, plasticizer, anti-aging agent, hydrochloric acid absorbent and antioxidant, provided that the object of the invention is not marred.

The second ethylene copolymer composition according to the invention can be prepared by known processes, for example, processes described below.

(1) A process of mechanically blending the ethylene/α-olefin copolymer [A-1], the crystalline polyolefin [B-2], and if necessary, other optional components by the use of an extruder, a kneader or the like.

(2) A process comprising dissolving the ethylene/α-olefin copolymer [A-1], the crystalline polyolefin [B-2], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer [A-1], the crystalline polyolefin [B-2], and if necessary, other optional components in an appropriate good solvent to prepare solutions, then mixing the solutions, and removing the solvent from the resulting mixture.

(4) A process of combining the above processes (1) to (3).

The second ethylene copolymer composition according to the present invention is subjected to ordinary air-cooling inflation molding, two-stage air-cooling inflation molding, high-speed inflation molding, T-die film molding, water-cooling inflation molding or the like, to obtain a film. The film thus obtained is well-balanced between the transparency and the rigidity, and has properties inherently belonging to general LLDPE, such as heat-sealing properties, hot-tack properties and heat resistance. Further, the film is free from surface stickiness because the ethylene/α-olefin copolymer [A-1] has a prominently narrow composition distribution. Moreover, because of low stress within the high-shear region, the ethylene copolymer composition can be extruded at a high speed, and consumption of electric power is small, resulting in economical advantage.

Films obtained by processing the second ethylene copolymer composition of the invention are suitable for, for example, standard bags, heavy bags, wrapping films, materials for laminates, sugar bags, packaging bags for oily goods, packaging bags for moist goods, various packaging films such as those for foods, bags for liquid transportation and agricultural materials. The films may also be used as multi-layer films by laminating the films on various substrates such as a nylon substrate and a polyester substrate. Further, the films may be used for liquid transportation bags obtained by blow molding, bottles obtained by blow molding, tubes and pipes obtained by extrusion molding, pull-off caps, injection molded products such as daily use miscellaneous goods, fibers, and large-sized molded articles obtained by rotational molding. Particularly, the films are most suitable for liquid transportation bags.

Third Ethylene Copolymer Composition

The third ethylene copolymer composition according to the present invention comprises an ethylene/α-olefin copolymer [A-1] and an olefin type elastomer [B-3].

[Ethylene/α-olefin Copolymer [A-1]]

The ethylene/α-olefin copolymer [A-1] employable for the third ethylene copolymer composition is the same as the ethylene/α-olefin copolymer used for the first ethylene copolymer composition described before.

[Olefin Type Elastomer [B-3]]

The olefin type elastomer [B-3] used in the invention is a polymer of ethylene or an α-olefin of 3 to 20 carbon atoms, or a copolymer of two or more kinds of olefins selected from ethylene and α-olefins of 3 to 20 carbon atoms. The olefin type elastomer [B-3] has a density of not more than 0.900 g/cm$^3$, preferably 0.860 to 0.900 g/cm$^3$, and has a melt flow rate (MFR), as determined in accordance with ASTM D1238-65T under the conditions of a temperature of 190° C. and a load of 2.16 kg, of 0.01 to 100 g/10 min, preferably 0.05 to 50 g/10 min. The olefin type elastomer [B-3] desirably has a crystallinity measured by X-ray diffractometry of less than 30%, or desirably is amorphous.

Examples of the α-olefin of 3 to 20 carbon atoms include propylene, 1-butene, 1-pentene, 1-hexene, 4-methyl-1-pentene, 1-octene, 1-decene and mixtures thereof. Of these, an α-olefin having 3 to 10 carbon atoms is preferably employed.

The olefin type elastomer [B-3] used in the invention may contain constituent units other than the constituent units derived from α-olefin, such as those derived from diene compounds, provided that the properties of the olefin type elastomer are not marred.

Examples of the constituent units which may be contained in the olefin type elastomer used in the invention include constituent units derived from chain non-conjugated dienes such as 1,4-hexadiene, 1,6-octadiene, 2-methyl-1,5-hexadiene, 6-methyl-1,5-heptadiene and 7-methyl-1,6-octadiene;

constituent units derived from cyclic non-conjugated dienes such as cyclohexadiene, dicyclopentadiene, methyltetrahydroindene, 5-vinylnorbornene, 5-ethylidene-2-norbornene 5-methylene-2-norbornene, 5-isopropylidene-2-norbornene and 6-chloromethyl-5-isopropenyl-2-norbornene; and constituent units derived from diene compounds such as 2,3-diisopropylidene-5-norbornene, 2-ethylidene-3-isopropylidene-5-norbornene and 2-propenyl-2,2-norbornadiene.

The diene components may be used alone or in combination. The content of the diene component is usually not more than 10% by mol, preferably in the range of 0 to 5% by mol.

A concrete example of the olefin type elastomer [B-3] is a copolymer comprising constituent units derived from ethylene in an amount of 0 to 95% by mol, preferably 30 to 92% by mol, more preferably 50 to 90% by mol, constituent units derived from an α-olefin of 3 to 20 carbon atoms in an amount of 1 to 100% by mol, preferably 4 to 70% by mol, more preferably 8 to 50% by mol, and constituent units derived from a diene component in an amount of 0 to 10% by mol, preferably 0 to 5% by mol, more preferably 0 to 3% by mol.

The olefin type elastomer [B-3] can be prepared by a known process using a catalyst of Ti type, V type, Zr type, etc.

[Ethylene Copolymer Composition]

The third ethylene copolymer composition according to the present invention comprises the aforementioned ethylene/α-olefin copolymer [A-1] and the olefin type elastomer [B-3], and a weight ratio ([A-1]:[B-3]) between the ethylene/α-olefin copolymer [A-1] and the olefin type elastomer [B-3] is usually in the range of 99:1 to 60:40, preferably 95:5 to 70:30, more preferably 98:2 to 80:20. Further, the ethylene/α-olefin copolymer [A-1] and the olefin type elastomer [B-3] are appropriately selected so that a density ratio ([B-3]/[A-1]) of the olefin type elastomer [B-3] to the ethylene/α-olefin copolymer [A-1] is less than 1, preferably in the range of 0.905 to 0.980.

The third ethylene copolymer composition according to the invention may contain various additives if desired, for example, weathering stabilizer, heat stabilizer, antistatic agent, anti-slip agent, anti-blocking agent, antifogging agent, lubricant, pigment, dye, nucleating agent, plasticizer, anti-aging agent, hydrochloric acid absorbent and antioxidant, provided that the object of the invention is not marred.

The third ethylene copolymer composition according to the invention can be prepared by known processes, for example, processes described below.

(1) A process of mechanically blending the ethylene/α-olefin copolymer [A-1], the olefin type elastomer [B-3], and if necessary, other optional components by the use of an extruder, a kneader or the like.

(2) A process comprising dissolving the ethylene/α-olefin copolymer [A-1], the olefin type elastomer [B-3], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer [A-1], the olefin type elastomer [B-3], and if necessary, other optional components in an appropriate good solvent to prepare solutions, then mixing the solutions, and removing the solvent from the resulting mixture.

(4) A process of combining the above processes (1) to (3).

The third ethylene copolymer composition according to the present invention is subjected to ordinary air-cooling inflation molding, two-stage air-cooling inflation molding, high-speed inflation molding, T-die film molding, water-cooling inflation molding or the like, to obtain a film. The film thus obtained is well-balanced between the transparency and the rigidity, and has properties inherently belonging to general LLDPE, such as heat-sealing properties, hot-tack properties and heat resistance. Further, the film is free from surface stickiness because the ethylene/α-olefin copolymer [A-1] has a prominently narrow composition distribution. Moreover, because of low stress within the high-shear region, the ethylene copolymer composition can be extruded at a high speed, and consumption of electric power is small, resulting in economical advantage.

Films obtained by processing the third ethylene copolymer composition of the invention are suitable for, for example, standard bags, heavy bags, wrapping films, materials for laminates, sugar bags, packaging bags for oily goods, packaging bags for moist goods, various packaging films such as those for foods, bags for liquid transportation and agricultural materials. The films may also be used as multi-layer films by laminating the films on various substrates such as a nylon substrate and a polyester substrate. Further, the films may be used for liquid transportation bags obtained by blow molding, bottles obtained by blow molding, tubes and pipes obtained by extrusion molding, pull-off caps, injection molded products such as daily use miscellaneous goods, fibers, and large-sized molded articles obtained by rotational molding. Particularly, the films are most suitable as wrapping films.

Fourth Ethylene Copolymer Composition

The fourth ethylene copolymer composition according to the present invention comprises an ethylene/α-olefin copolymer composition [Ia] which comprises an ethylene/α-olefin copolymer [A-2] and an ethylene/α-olefin copolymer [A-3], and a high pressure radical polymerization low-density polyethylene [IIa].

[Ethylene/α-olefin Copolymer [A-2]]

The ethylene/α-olefin copolymer [A-2] for forming the fourth ethylene copolymer composition of the invention is a random copolymer of ethylene with an α-olefin of 3 to 20 carbon atoms. Examples of the α-olefin of 3 to 20 carbon atoms employable for copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [A-2], it is desired that constituent units derived from ethylene are present in an amount of 55 to 99% by weight, preferably 65 to 98% by weight, more preferably 70 to 96% by weight, and constituent units derived from α-olefin of 3 to 20 carbon atoms are present in an amount of 1 to 45% by weight, preferably 2 to 35% by weight, more preferably 4 to 30% by weight.

The ethylene/α-olefin copolymer [A-2] has the following properties (i) to (vi).

(i) The density (d) is usually in the range of 0.880 to 0.940 g/cm$^3$, preferably 0.890 to 0.935 g/cm$^3$, more preferably 0.900 to 0.930 g/cm$^3$.

(ii) The intrinsic viscosity [$\eta_{A-2}$] as measured in decalin at 135° C. is in the range of 1.0 to 10.0 dl/g, preferably 1.25 to 8 dl/g, more preferably 1.27 to 6 dl/g.

(iii) The temperature (Tm (° C.)) at which the endothermic curve of the copolymer measured by a differential scanning calorimeter (DSC) shows the maximum peak and the density (d) satisfy the relation:

$Tm<400\times d-250,$ preferably $Tm<450\times d-297,$ more preferably $Tm<500\times d-344,$ particularly preferably $Tm<550\times d-391.$ (iv) The melt tension (MT (g)) at 190° C. and the melt flow rate (MFR) satisfy the relation:

$MT>2.2\times MFR^{-0.84}.$

The ethylene/α-olefin copolymer [A-2] as mentioned above which is used for the invention has high melt tension (MT) and good moldability.

(v) The flow index (FI (1/sec)) defined by a shear rate which is given when a shear stress of molten copolymer at 190° C. reaches $2.4\times10^6$ dyne/cm$^2$ and the melt flow rate (MFR) satisfy the relation:

$FI>75\times MFR,$ preferably $FI>100\times MFR,$ more preferably $FI>120\times MFR.$ The ethylene/α-olefin copolymer [A-2] whose FI and MFR satisfy the above-mentioned relation shows a small processing torque because a low stress can be kept even at a high-shear rate, and has good moldability.

(vi) The fraction of a n-decane-soluble component at room temperature (W % by weight) and the density (d) satisfy the relation:

$W<80\times\exp(-100(d-0.88))+0.1,$ preferably $W<60\times\exp(-100(d-0.88))+0.1,$ more preferably $W<40\times\exp(-100(d-0.88))+0.1.$ It may be concluded from the relation between the temperature (Tm) at which the endothermic curve measured by a differential scanning calorimeter (DSC) shows the maximum peak and the density (d), and the relation between the fraction (W) of a n-decane-soluble component and the density (d), that the ethylene/α-olefin copolymer [A-2] has a narrow composition distribution.

Further, the number of unsaturated bond present in the molecule of the ethylene/α-olefin copolymer [A-2] desirably is not more than 0.5 per 1,000 carbon atoms and less than 1 per one molecule of the copolymer.

The ethylene/α-olefin copolymer [A-2] having the properties as mentioned above can be prepared by copolymerizing ethylene with an α-olefin of 3 to 20 carbon atoms in the presence of the aforementioned olefin polymerization catalyst (1) or prepolymerized catalyst (1) under the same conditions as those for preparing the ethylene/α-olefin copolymer [A-1] in such a manner that the resulting copolymer would have a density of 0.880 to 0.940 g/cm$^3$.

When a slurry polymerization process is used for preparing the ethylene/α-olefin copolymer [A-2], the polymerization temperature is usually in the range of −50 to 90° C., preferably 0 to 80° C., and when a gas phase polymerization process is used therefor, the polymerization temperature is usually in the range of 0 to 90° C., preferably 20 to 80° C.

[Ethylene/α-olefin Copolymer [A-3]]

The ethylene/α-olefin copolymer [A-3] for forming the fourth ethylene copolymer composition of the invention is a random copolymer of ethylene and an α-olefin of 3 to 20 carbon atoms. Examples of the α-olefin of 3 to 20 carbon atoms employable for copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [A-3], it is desired that constituent units derived from ethylene are present in an amount of 55 to 99% by weight, preferably 65 to 98% by weight, more preferably 70 to 96% by weight, and constituent units derived from α-olefin of 3 to 20 carbon atoms are present in an amount of 1 to 45% by weight, preferably 2 to 35% by weight, more preferably 4 to 30% by weight.

The ethylene/α-olefin copolymer [A-3] has the following properties (i) to (iv).

(i) The density (d) is usually in the range of 0.910 to 0.960 g/cm$^3$, preferably 0.915 to 0.955 g/cm$^3$, more preferably 0.920 to 0.950 g/cm$^3$.

(ii) The intrinsic viscosity [$\eta_{A-3}$] as measured in decalin at 135° C. is in the range of 0.5 to 2.0 dl/g, preferably 0.55 to 1.9 dl/g, more preferably 0.6 to 1.8 dl/g.

(iii) The temperature (Tm (° C.)) at which the endothermic curve of the copolymer measured by a differential scanning calorimeter (DSC) shows the maximum peak and the density (d) satisfy the relation:

$Tm<400\times d-250,$ preferably $Tm<450\times d-297,$ more preferably $Tm<500\times d-344,$ particularly preferably $Tm<550\times d-391.$ (iv) The fraction of a n-decane-soluble component at room temperature (W % by weight) and the density (d) satisfy the relation:

in the case of MFR≦10 g/10 min, $W<80\times\exp(-100(d-0.88))+0.1,$ preferably $W<60\times\exp(-100(d-0.88))+0.1,$ more preferably $W<40\times\exp(-100(d-0.88))+0.1,$ in the case of MFR>10 g/10 min, $W<80\times(MFR-9)^{0.26}\times\exp(-100(d-0.88))+0.1.$ It may be concluded from the relation between the temperature (Tm) at which the endothermic curve measured by a differential scanning calorimeter (DSC) shows the maximum peak and the density (d), and the relation between the fraction (W) of a n-decane-soluble component and the density (d), that the ethylene/α-olefin copolymer [A-3] has a narrow composition distribution.

Further, the number of unsaturated bond present in the molecule of the ethylene/α-olefin copolymer [A-3] desirably is not more than 0.5 per 1,000 carbon atoms and less than 1 per one molecule of the copolymer.

The ethylene/α-olefin copolymer [A-3] having the properties as mentioned above can be prepared by copolymerizing ethylene and an α-olefin of 3 to 20 carbon atoms in the presence of an olefin polymerization catalyst (2) or a prepolymerized catalyst (2) formed from (a-2) a transition metal compound catalyst component, (b) an organoaluminum oxy-compound catalyst component, (c) a carrier, and if necessary, (d) an organoaluminum compound catalyst component, all components being described later, in such a manner that the resulting copolymer would have a density of 0.910 to 0.960 g/cm$^3$.

First, the transition metal compound catalyst component (a-2) is explained below.

The transition metal compound catalyst component (a-2) (sometimes referred to as "component (a-2)" hereinafter) is a compound of a transition metal in Group IV of the periodic table which contains a ligand having a cyclopentadienyl skeleton. There is no specific limitation on the component (a-2), as far as it is a compound of a transition metal in Group IV of the periodic table which contains a ligand having a cyclopentadienyl skeleton. However, the component (a-2) preferably is a transition metal compound represented by the following formula [V].

$$ML_x \qquad [V]$$

wherein M is a transition metal atom selected from Group IVB of the periodic table, L is a ligand coordinating to the transition metal, at least one of L is a ligand having a cyclopentadienyl skeleton, L other than the ligand having a cyclopentadienyl skeleton is a hydrocarbon group of 1 to 12 carbon atoms, an alkoxy group, an aryloxy group, a trialkylsilyl group, a $SO_3R$ group (R is a hydrocarbon group of 1 to 8 carbon atoms which may have a substituent group such as halogen), a halogen atom or a hydrogen atom, and X is a valance of the transition metal.

The transition metal compound represented by the above formula [V] includes the transition metal compound represented by the formula [I] and the transition metal compound represented by the formula [II] which are cited before as the transition metal catalyst component (a-1).

In the above-mentioned formula [V], M is a transition metal selected from Group IVB of the periodic table, and concrete preferable examples of M include zirconium, titanium and hafnium. Of these, particularly preferred is zirconium.

The ligands having a cyclopentadienyl skeleton include, for example, cyclopentadienyl; an alkyl-substituted cyclopentadienyl group such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylcyclopentadienyl; indenyl, 4,5,6,7-tetrahydroindenyl and fluorenyl. These groups may be substituted with halogen atom or trialkylsilyl group, and the like.

Of these ligands coordinated to the transition metal, particularly preferred is the alkyl-substituted cyclopentadienyl group.

When the compound represented by the above formula [V] contains two or more of the groups having a cyclopentadienyl skeleton, two of them each having a cyclopentadienyl skeleton can be bonded together through an alkylene group (e.g., ethylene and propylene), a substituted alkylene group such as isopropylidene and diphenylmethylene, a silylene group, or a substituted silylene group such as dimethylsilylene, diphenylsilylene and methylphenylsilylene.

Concrete examples of the ligand L other than those having a cyclopentadienyl skeleton are as follows:

The hydrocarbon group having 1 to 12 carbon atoms includes, for example, an alkyl group, a cycloalkyl group, an aryl group and an aralkyl group, and concrete examples of these groups are as follows;

an alkyl group such as methyl, ethyl, propyl, isopropyl and butyl;

a cycloalkyl group such as cyclopentyl and cyclohexyl;

an aryl group such as phenyl and tolyl;

an aralkyl group such as benzyl and neophyl;

an alkoxy group such as methoxy, ethoxy and butoxy;

an aryloxy group such as phenoxy; and halogen such as fluorine, chlorine, bromine and iodine.

The ligand represented by $SO_3R$ includes, for example, p-toluenesulfonate, methanesulfonate and trifluoromethanesulfonate.

Such a metallocene compound containing ligands each having a cyclopentadienyl skeleton (e.g. having a transition metal with a valence of 4) may be represented more concretely by the formula [V']

$$R^2kR^3lR^4mR^5nM \qquad [V']$$

wherein M is a transition metal as mentioned above, $R^2$ is a group having a cyclopentadienyl skeleton (ligand), $R^3$, $R^4$ and $R^5$ are each a group having a cyclopentadienyl skeleton, an alkyl group, a cycloalkyl group, an aryl group, an aralkyl group, an alkoxy group, an aryloxy group, trialkylsilyl group, $SO_3R$ group, halogen or hydrogen, k is an integer of not less than 1, and k+l+m+n=4.

As the component (a-2), preferred is the metallocene compound represented by the above formula [V'] in which at least two of $R^2$, $R^3$, $R^4$ and $R^5$, that is, $R^2$ and $R^3$ are each a group having a cyclopentadienyl skeleton (ligand). Said groups having a cyclopentadienyl skeleton may be bonded together through a group such as an alkylene group (e.g., ethylene and propylene), a substituted alkylene group such as isopropylidene and diphenylmethylene, a silylene group, and a substituted silylene group such as dimethylsilylene, diphenylsilylene and methylphenylsilylene. Further, $R^4$ and $R^5$ are each a group having a cyclopentadienyl skeleton, an alkyl group, a cycloalkyl group, an aryl group, an aralkyl group, an alkoxy group, an aryloxy group, trialkylsilyl group, $SO_3R$ group, halogen or hydrogen.

Listed below are concrete examples of the transition metal compound having zirconium as M.

Bis (indenyl)zirconium dichloride,
Bis(indenyl)zirconium dibromide,
Bis(indenyl)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis (indenyl)zirconium dibromide,
Ethylenebis(indenyl)dimethylzirconium,
Ethylenebis(indenyl)diphenylzirconium,
Ethylenebis(indenyl)methylzirconium monochloride,
Ethylenebis(indenyl)zirconium bis(methanesulfonate),
Ethylenebis(indenyl)zirconium bis(p-toluenesulfonate),
Ethylenebis(indenyl)zirconium bis (trifluoromethanesulfonate),
Ethylenebis(4,5,6,7-tetrahydroindenyl)zirconium dichloride,
Isopropylidene(cyclopentadienylfluorenyl)zirconium dichloride,
Isopropylidene(cyclopentadienyl-methyl cyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl) zirconium dichloride,
Dimethylsilylenebis(trimethylcyclopentadienyl) zirconium dichloride,
Dimethylsilylenebis(indenyl)zirconium dichloride,
Dimethylsilylenebis(indenyl)zirconium bis (trifluoromethanesulfonate),
Dimethylsilylenebis(4,5,6,7-tetrahydroindenyl)zirconium dichloride, Dimethylsilylenebis(cyclopentadienyl-fluorenyl) zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)dibenzylzirconium,
Bis(cyclopentadienyl)zirconium methoxychloride,
Bis(cyclopentadienyl)zirconium ethoxychloride,
Bis(cyclopentadienyl)zirconium bis(methanesulfonate),
Bis(cyclopentadienyl)zirconium bis(p-toluenesulfonate),
Bis(cyclopentadienyl)zirconium bis(trifluoromethanesulfonate),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis(dimethylcyclopentadienyl)zirconium bis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride, and
Bis(trimethylsilylcyclopentadienyl)zirconium dichloride.

In the above exemplified compounds, di-substituted cyclopentadienyl include 1,2- and 1,3-substituted, and tri-substituted include 1,2,3- and 1,2,4-substituted. Further, the alkyl group such as propyl or butyl includes n-, i-, sec- and tert-isomers.

There may also be used transition metal compounds obtained by substituting titanium or hafnium for zirconium in the above-exemplified zirconium compounds.

The above listed compounds, the transition metal compounds represented by the above formula [I] and the transition metal compounds represented by the above formula [II] are used as transition metal catalyst component (a-2).

Preferred are the above mentioned transition metal compounds represented by the formula [I] or [II]. Of these, particularly preferred is
Ethylenebis(indenyl)zirconium dichloride,
Ethylenebis(4-methyl-1-indenyl)zirconium dichloride,
Ethylenebis(4,5,6,7-tetrahydro-1-indenyl)zirconium dichloride,
Bis(1,3-dimethylcyclopentadienyl)zirconium dichloride,
Bis(1,3-diethylcyclopentadienyl)zirconium dichloride, or
Bis(1-methyl-3-ethylcyclopentadienyl)zirconium dichloride.

Further, the transition metal catalyst component (a-1) used in the preparation of the ethylene/α-olefin copolymer [A-2] and the transition metal catalyst component (a-2) used in the preparation of the ethylene/α-olefin copolymer [A-3] are preferably the same compounds.

The organoaluminum oxy-compound catalyst component (b) [component (b)] which forms the olefin polymerization catalyst (2) is the same as the organoluminum oxy-compound which forms the above mentioned olefin polymerization catalyst (1).

The carrier (c) [component (c)] which forms the olefin polymerization catalyst (2) is the same as the carrier which forms the above mentioned olefin polymerization catalyst (1).

The optionally used organoaluminum compound catalyst component (d) [component (d)] is the same as the organoaluminum compound which forms the above mentioned olefin polymerization catalyst (1).

The ethylene/α-olefin copolymer [A-3] used in the present invention can be prepared by the olefin polymerization catalyst (2) formed by contacting the above-mentioned components (a-2), (b), (c) and if necessary, component (d). Though the mixing of these components (a-2), (b), (c) and (d) may be conducted in arbitrarily selected order, the mixing and contacting is preferably conducted in the order of:

mixing and contacting the components (b) and (c), followed by mixing and contacting the component (a-2), and if necessary, mixing and contacting the component (d).

The mixing of the above-mentioned components (a-2), (b), (c) and (d) can be carried out in an inert hydrocarbon.

As the inert hydrocarbon solvent, there may be mentioned an aliphatic hydrocarbon, such as propane, butane, pentane, hexane, heptane, octane, decane, dodecane and kerosene;

an alicyclic hydrocarbon, such as cyclopentane, cyclohexane and methylcyclopentane;

an aromatic hydrocarbon, such as benzene, toluene and xylene;

a halogenated hydrocarbon, such as ethylene chloride, chlorobenzene and dichloromethane; and a mixture thereof.

In the contacting and mixing of the components (a-2), (b), (c) and if neccessary (d), the component (a-2) is used usually in an amount of $5 \times 10^{-6}$ to $5 \times 10^{-4}$ mol, preferably $1 \times 10^{-5}$ to $2 \times 10^{-4}$ mol based on 1 g of the component (c), and the concentration thereof is $1 \times 10^{-4}$ to $2 \times 10^{-2}$ mol/l, preferably $2 \times 10^{-4}$ to $1 \times 10^{-2}$ mol/l. The atomic ratio (Al/transition metal) of the aluminum in the component (b) to the transition metal in the component (a-2) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5.

The components (a-2), (b) and (c), and if necessary, the component (d) are mixed and contacted at a temperature of usually −50 to 150° C., preferably −20 to 120° C., with a contact time of 1 minute to 50 hours, preferably 10 minutes to 25 hours.

In the catalyst (2) for olefin polymerization obtained as described above, it is desirable that the transition metal derived from component (a-2) is supported in an amount of $5 \times 10^{-6}$ to $5 \times 10^{-4}$ g atom, preferably $1 \times 10^{-5}$ to $2 \times 10^{-4}$ g atom, and aluminum derived from components (b) and (d) is supported in an amount of $10^{-3}$ to $5 \times 10^{-2}$ g atom, preferably $2 \times 10^{-3}$ to $2 \times 10^{-2}$ g atom, all the amounts being based on 1 g of the component (c).

Further, the catalyst for preparing the ethylene/α-olefin copolymer [A-3] used in the present invention may be a prepolymerized catalyst (2) obtained by prepolymerization of olefin in the presence of the above-mentioned components (a-2), (b) and (c), and if necessary, (d).

The prepolymerized catalyst (2) can be prepared by mixing the component (a-2), the component (b), the component (c), and if necessary, the component (d), introducing olefin to the resulting mixture in the inert hydrocarbon solvent, and carrying out prepolymerization.

The olefins which can be prepolymerized include ethylene and α-olefins each having 3 to 20 carbon atoms, for example, propylene, 1-butene, 1-pentene, 4-methyl-1-pentene, 1-hexene, 1-octene, 1-decene, 1-dodecene and 1-tetradecene. Of these, particularly preferred is ethylene or the combination of ethylene and α-olefin used in the polymerization.

During the prepolymerization, the component (a-2) is used usually in a concentration of is $1 \times 10^{-6}$ to $2 \times 10^{-2}$ mol/l, preferably $5 \times 10^{-5}$ to $1 \times 10^{-2}$ mol/l and amount thereof is usually $5 \times 10^{-6}$ to $5 \times 10^{-4}$ mol, preferably $1 \times 10^{-5}$ to $2 \times 10^{-4}$ mol based on 1 g of the component (c). The atomic ratio (Al/transition metal) of the aluminum in the component (b) to the transition metal in the component (a-2) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5. The prepolymerization is carried out at a temperature of −20 to 80° C., preferably 0 to 60° C., with a time of 0.5 to 100 hours, preferably 1 to 50 hours.

The prepolymerized catalyst (2) can be prepared as described below. First, the carrier (component (c)) is suspended in the inert hydrocarbon. To the suspension, the organoaluminum oxy-compound catalyst component (component (b)) is introduced, and reacted for predetermined period. Successively, supernatant is removed, and the resulting solid component is re-suspended in the inert hydrocarbon. Into the system, the transition metal compound catalyst component (component (a-2)) is added and reacted for predetermined period. Then, supernatant is removed to obtain a solid catalyst component. Continuously, the solid catalyst component obtained above is added into inert hydrocarbon containing the organoaluminum compound catalyst component (component (d)), and olefin is introduced therein to obtain the prepolymerized catalyst (2).

An amount of prepolymerized polyolefin produced in the prepolymerization is, desirably based on 1 g of the carrier (c), of 0.1 to 500 g, preferably 0.2 to 300 g, more preferably 0.5 to 200 g. In the prepolymerized catalyst (2), component (a-2) is desirably supported in an amount in terms of transition metal atom, based on 1 g of the carrier (c), of about $5 \times 10^{-6}$ to $5 \times 10^{-4}$ g atom, preferably $1 \times 10^{-5}$ to $2 \times 10^{-4}$ g atom. Further, a molecular ratio (Al/M) of aluminum atom (Al) derived from components (b) and (d) to transition metal atom (M) derived from component (a-2) is usually 5 to 200, preferably 10 to 150.

The prepolymerization may be carried out either batchwise or continuously, and under reduced pressure, normal pressure or applied pressure. During the prepolymerization, hydrogen may be allowed to be present to obtain a prepolymer desirably having an intrinsic viscosity [η] of 0.2 to 7 dl/g, preferably 0.5 to 5 dl/g as measured in decalin at least 135° C.

The ethylene/α-olefin copolymers [A-3] used in the present invention are obtained by copolymerizing ethylene with an α-olefin having 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene in the presence of the olefin polymerization catalyst (2) or the prepolymerized catalyst (2).

Copolymerization of ethylene and α-olefin is carried out in a gas phase or liquid phase, for example, in slurry. In the slurry polymerization, an inactive hydrocarbon or the olefin itself may be used as a solvent.

Concrete examples of the inactive hydrocarbon solvent include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and gas oil. Of these inactive hydrocarbons, preferred are aliphatic hydrocarbons, alicyclic hydrocarbons and petroleum fractions.

When the copolymerization is carried out by the slurry method or the gas phase method, the olefin polymerization catalyst (2) or the prepolymerized catalyst (2) is used at such amount that the concentration of the transition metal compound becomes usually $10^{-8}$ to $10^{-3}$ g atom/liter, preferably $10^{-7}$ to $10^{-4}$ g atom/liter in terms of the transition metal in the polymerization reaction system.

Furthermore, in the polymerization, an organoaluminum oxy-compound similar to the catalyst component (b) and/or an organoaluminum compound (d) may be added. In this case, the atomic ratio (Al/M) of the aluminum atom (Al) derived from the organoaluminum oxy-compound and the organoaluminum compound to the transition metal atom (M) derived from the transition metal compound catalyst component (a-2) is 5 to 300, preferably 10 to 200, more preferably 15 to 150.

When the ethylene/α-olefin copolymer [A-3] is prepared by the slurry polymerization, the polymerization temperature is usually −30 to 100° C., preferably 20 to 90° C. When the ethylene/α-olefin copolymer [A-3] is prepared by the gas phase polymerization, the polymerization temperature is usually 20 to 120° C., preferably 40 to 100° C.

The polymerization is carried out usually at a normal pressure to 100 kg/cm², preferably under a pressure condition of 2 to 50 kg/cm². The polymerization can be carried out either batchwise, semicontinuously or continuously.

[Ethylene/α-olefin Copolymer Composition [Ia]]

The ethylene/α-olefin copolymer composition [Ia] comprises the ethylene/α-olefin copolymer [A-2] and the ethylene/α-olefin copolymer [A-3]. In this composition [Ia], the ethylene/α-olefin copolymer [A-2] is contained in an amount of 5 to 95% by weight, preferably 10 to 90% by weight, and the ethylene/α-olefin copolymer [A-3] is contained in an amount of 5 to 95% by weight, preferably 10 to 90% by weight.

The ethylene/α-olefin copolymer [A-2] and the ethylene/α-olefin copolymer [A-2] are appropriately combined so that a density ratio ([A-2]/[A-3]) of the ethylene/α-olefin copolymer [A-2] to the ethylene/α-olefin copolymer [A-3] is less than 1, preferably in the range of 0.930 to 0.999. Further, they are also appropriately combined so that a ratio ([$\eta_{A-2}$]/[$\eta_{A-3}$]) of the intrinsic viscosity [$\eta_{A-2}$] of the ethylene/α-olefin copolymer [A-2] to the intrinsic viscosity [$\eta_{A-3}$] of the ethylene/α-olefin copolymer [A-3] is not less than 1, preferably in the range of 1.05 to 10, more preferably 1.1 to 5.

The ethylene/α-olefin copolymer composition has a density of usually 0.890 to 0.955 g/cm³, preferably 0.905 to 0.950 g/cm³, and has a melt flow rate (MFR), as determined in accordance with ASTM D1238-65T under the conditions of a temperature of 190° C. and a load of 2.16 kg, of 0.1 to 100 g/10 min, preferably 0.2 to 50 g/10 min.

The ethylene/α-olefin copolymer composition [Ia] can be prepared by known processes, for example, processes described below.

(1) A process of mechanically blending the ethylene/α-olefin copolymer [A-2], the ethylene/α-olefin copolymer [A-3], and if necessary, other optional components by the use of an extruder, a kneader or the like.

(2) A process comprising dissolving the ethylene/α-olefin copolymer [A-2], the ethylene/α-olefin copolymer [A-3], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer [A-2], the ethylene/α-olefin copolymer [A-3], and if necessary, other optional components in an appropriate good solvent to prepare solutions, then mixing the solutions, and removing the solvent from the resulting mixture.

(4) A process in any combination of the above processes (1) to (3).

Further, the ethylene/α-olefin copolymer composition [Ia] may be prepared by forming the ethylene/α-olefin copolymer [A-2] and the ethylene/α-olefin copolymer [A-3] in two or more copolymerization stages having reaction conditions different from each other, or may be prepared by separately forming the ethylene/α-olefin copolymer [A-2] and the ethylene/α-olefin copolymer [A-3] by the use of plural polymerizers.

[High-pressure Radical Polymerization Low-density Polyethylene [IIa]]

As the high-pressure radical polymerization low-density polyethylene [IIa] employable for the fourth ethylene copolymer composition may be the same as the high-pressure radical polymerization low-density polyethylene [B-1] used for the first ethylene copolymer composition.

Ethylene Copolymer Composition

The fourth ethylene copolymer composition according to the present invention comprises the ethylene/α-olefin copolymer composition [Ia] and the high-pressure radical polymerization low-density polyethylene [IIa]. It is desirable that a weight ratio ([Ia]:[IIa]) between the ethylene/α-olefin copolymer composition [Ia] and the high-pressure radical polymerization low-density polyethylene [IIa] is usually in the range of 99:1 to 60:40, preferably 98:2 to 70:30, more preferably 98:2 to 80:20.

When the amount of the high-pressure radical polymerization low-density polyethylene is less than the lower limit of the above range, the resulting composition may be improved insufficiently in the transparency and the melt tension. On the other hand, when the amount thereof is larger than the upper limit of the above range, the resulting composition may considerably be deteriorated in the tensile strength and the stress crack resistance.

The fourth ethylene copolymer composition according to the invention may contain various additives if desired, for example, weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, provided that the object of the invention is not marred.

The fourth ethylene copolymer composition according to the invention can be prepared by known processes, for example, processes described below.

(1) A process of mechanically blending the ethylene/α-olefin copolymer composition [Ia], the high-pressure radical polymerization low-density polyethylene [IIa], and if necessary, other optional components by the use of an extruder, a kneader or the like.

(2) A process comprising dissolving the ethylene/α-olefin copolymer composition [Ia], the high-pressure radical polymerization low-density polyethylene [IIa], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer composition [Ia], the high-pressure radical polymerization low-density polyethylene [IIa], and if necessary, other optional components in an appropriate good solvent to prepare solutions, then mixing the solutions, and removing the solvent from the resulting mixture.

(4) A process in any combination of the above processes (1) to (3).

The fourth ethylene copolymer composition according to the present invention may be processed by a conventional molding method, for example, air-cooling inflation molding, two-stage air-cooling inflation molding, high-speed inflation molding, T-die film molding, water-cooling inflation molding or the like, to obtain a film. The film thus obtained has excellent transparency, mechanical strength and blocking resistance, and retains properties inherent in general LLDPE, such as heat-sealing properties, hot-tack properties and heat resistance. Further, the film is free from surface stickiness because each of the ethylene/α-olefin copolymer [A-2] and the ethylene/α-olefin copolymer [A-3] has a prominently narrow composition distribution. Moreover, because of low stress within the high-shear region, the ethylene copolymer composition can be extruded at a high speed, and thus consumption of electric power is small, resulting in economical advantage.

Films obtained from the fourth ethylene copolymer composition of the invention are suitable for, for example, standard bags, heavy duty bags, wrapping films, materials for laminates, sugar bags, packaging bags for oily goods, packaging bags for moist goods, various packaging films such as those for foods, bags for liquid transportation and agricultural materials. The films may also be used as multi-layer films by laminating the films on various substrates such as a nylon substrate and a polyester substrate. Further, the films may be used for liquid transportation bags obtained by blow molding, bottles obtained by blow molding, tubes and pipes obtained by extrusion molding, pull-off caps, injection molded products such as daily use miscellaneous goods, fibers, and large-sized molded articles obtained by rotational molding.

Fifth Ethylene Copolymer Composition

The fifth ethylene copolymer composition according to the present invention comprises an ethylene/α-olefin copolymer [A-4] and a high-pressure radical polymerization low-density polyethylene [B-4].

Ethylene/α-olefin copolymer [A-1]

The ethylene/α-olefin copolymer [A-4] used in the invention is a random copolymer of ethylene with an α-olefin of 3 to 20 carbon atoms. Examples of the α-olefin of 3 to 20 carbon atoms employable for copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [A-4], it is desired that constituent units derived from ethylene are present in an amount of 55 to 99% by weight, preferably 65 to 98% by weight, more preferably 70 to 96% by weight, and constituent units derived from an α-olefin of 3 to 20 carbon atoms are present in an amount of 1 to 45% by weight, preferably 2 to 35% by weight, more preferably 4 to 30% by weight.

It is desired that the ethylene/α-olefin copolymer [A-4] used in the invention has the following properties (i) to (v).

(i) The density (d) is usually in the range of 0.880 to 0.960 g/cm³, preferably 0.890 to 0.935 g/cm³, more preferably 0.905 to 0.930 g/cm³.

(ii) The melt flow rate (MFR) is usually in the range of 0.0.1 to 200 g/10 min, preferably 0.05 to 50 g/10 min, more preferably 0.1 to 10 g/10 min.

(iii) The temperature (Tm (° C.)) at which the endothermic curve of the copolymer measured by a differential scanning calorimeter (DSC) shows the maximum peak and the density (d) satisfy the relation:

$Tm < 400 \times d - 250$, preferably $Tm < 450 \times d - 297$, more preferably $Tm < 500 \times d - 344$, particularly preferably $Tm < 550 \times d - 391$.

(iv) The melt tension (MT(g)) and the melt flow rate (MFR) satisfy the relation:

$MT \leq 2.2 \times \times MFR^{-0.84}$.

(v) The fraction of a n-decane-soluble component at 23° C. (W % by weight) and the density (d) satisfy the relation: in the case of MFR≦10 g/10 min, $W < 80 \times \exp(-100(d-0.88)) + 0.1$, preferably $W < 60 \times \exp(-100(d-0.88)) + 0.1$, more preferably $W < 40 \times \exp(-100(d-0.88)) + 0.1$, in the case of MFR>10 g/10 min, $W < 80 \times (MFR-9)^{0.26} \times \exp(-100(d-0.88)) + 0.1$.

It may be concluded from the relation between the temperature (Tm) at which the endothermic curve measured by a differential scanning calorimeter (DSC) shows the maximum peak and the density (d), and the relation between the fraction (W) of a n-decane-soluble component and the density (d), that the ethylene/α-olefin copolymer [A-4] has a narrow composition distribution.

Further, the number of unsaturated bond present in the molecule of the ethylene/α-olefin copolymer [A-4] is desirably not more than 0.5 per 1,000 carbon atoms and less than 1.0 per one molecule of the copolymer.

In the ethylene/α-olefin copolymer [A-4], the B value represented by the following formula:

$$B = \frac{PoE}{2Po \cdot PE}$$

(wherein PE is a molar fraction of the ethylene component contained in the copolymer, Po is a molar fraction of the α-olefin component contained in the copolymer, and PoE is a molar fraction of the α-olefin/ethylene chain in all of the dyad chains), desirably is a number satisfying the following condition:

$1.00 \leq B$, preferably $1.01 \leq B \leq 1.50$, more preferably $1.01 \leq B \leq 1.30$.

The B value indicates a distribution of each monomer component in the copolymer chain, and can be calculated from the values for PE, Po and PoE defined above determined in accordance with the reports by, for example, G. J. Ray (Macromolecules, 10, 773, 1977), J. C. Randall (Macromolecules, 15, 353, 1982), J. Polymer Science, Polymer Physics Ed., 11, 275, 1973), and K. Kimura (Polymer, 25, 441, 1984). A copolymer with a larger B value is a copolymer having a narrower composition distribution in which block-like chains of the copolymer chains are reduced and ethylene and α-olefin are uniformly distributed.

The B value indicating the composition distribution was calculated from the values for PE, Po and PoE which were obtained from a $^{13}$C-NMR spectrum measured on a sample-having been obtained by uniformly dissolving about 200 mg of a copolymer in 1 ml of hexachlorobutadiene under the conditions of usually a temperature of 120° C., a frequency of 25.05 MHz, a spectrum width of 1,500 Hz, a filter width of 1,500 Hz, a pulse repetition period of 4.2 sec, a pulse width of 7 μsec and integration times of 2,000 to 5,000.

The ethylene/α-olefin copolymer [A-4] having the properties as mentioned above can be prepared by copolymerizing ethylene and an α-olefin of 3 to 20 carbon atoms in the presence of an olefin polymerization catalyst formed from (a-3) a transition metal compound catalyst component and (b) an organoaluminum oxy-compound catalyst component, both being described later, in such a manner that the resulting copolymer would have a density of 0.880 to 0.960 g/cm³. In particular, the copolymer can be prepared by copolymerizing ethylene and an α-olefin of 3 to 20 carbon atoms in the presence of an olefin polymerization catalyst (3) formed from (a-3) a transition metal compound catalyst component, (b) an organoaluminum oxy-compound catalyst component, (c) a carrier, and if necessary, (d) an organoaluminum compound catalyst component, all components being described later, or a prepolymerized catalyst (3) in such a manner that the resulting copolymer would have a density of 0.880 to 0.960 g/cm³.

First, the transition metal compound catalyst component (a-3) is explained below.

The transition metal compound catalyst component (a-3) (sometimes referred to as "component (a-3)" hereinafter) is a transition metal compound represented by the following formula [VI]

$ML_x$           [VI]

wherein M is a transition metal atom selected from Group IVB of the periodic table, L is a ligand coordinating to the transition metal atom M, at least two of L are cyclopentadienyl groups, methylcyclopentadienyl groups, ethylcyclopentadientyl groups or substituted cyclopentadienyl groups having at least one substituent selected from hydrocarbon groups of 3 to 10 carbon atoms, L other than the (substituted) cyclopentadienyl group is a hydrocarbon group of 1 to 12 carbon atoms, an alkoxy group, an aryloxy group, a halogen atom, a trialkylsilyl group or a hydrogen atom, and x is a valence of the transition metal M.

In the above-mentioned formula [VI], M is a transition metal selected from Group IVB of the periodic table, and concrete preferable examples of M include zirconium, titanium and hafnium. Of these, particularly preferred is zirconium.

The substituted cyclopentadienyl group may have two or more of substituents, and each substituent may be the same or different. When the substituted cyclopentadienyl has two or more of substituents, at least one substituent is a hydrocarbon group of 3 to 10 carbon atoms, and other substituents are methyl, ethyl or a hydrocarbon group of 3 to 10 carbon atoms. Further, each substituent coordinated to the M may be the same or different.

The hydrocarbon group having 3 to 10 carbon atoms includes, for example, an alkyl group, a cycloalkyl group, an aryl group and an aralkyl group, and concrete examples of these groups are an alkyl group such as n-propyl, isopropyl, n-butyl, isobutyl, sec-butyl, t-butyl, pentyl, hexyl, octyl, 2-ethylhexyl, decyl;

a cycloalkyl group such as cyclopentyl and cyclohexyl;

an aryl group such as phenyl and tolyl; and an aralkyl group such as benzyl and neophyl.

Of these, preferred is an alkyl group, and particularly preferred is n-propyl and n-butyl.

In the present invention, the (substituted) cyclopentadienyl group coordinated to the transition metal atom is preferably a substituted cyclopentadienyl group, more preferably a cyclopentadienyl group substituted with alkyl having 3 or more of carbon atoms, especially a di-substituted cyclopentadienyl group, particularly 1,3-substituted cyclopentadienyl group.

In the above formula [VI], the ligand L coordinated to the transition metal atom M other than the (substituted) cyclopentadienyl group includes a hydrocarbon group of 1 to 12 carbon atoms, an alkoxy group, an aryloxy group, halogen, trialkylsilyl group or hydrogen.

The hydrocarbon group having 1 to 12 carbon atoms includes, for example, an alkyl group, a cycloalkyl group, an aryl group and an aralkyl group, and concrete examples of these groups are as follows;

an alkyl group such as methyl, ethyl, n-propyl, isopropyl, n-butyl, isobutyl, sec-butyl, t-butyl, pentyl, hexyl, octyl, 2-ethylhexyl and decyl;

a cycloalkyl group such as cyclopentyl and cyclohexyl;

an aryl group such as phenyl and tolyl;

an aralkyl group such as benzyl and neophyl;

an alkoxy group such as methoxy, ethoxy, n-propoxy, isopropoxy, n-butoxy, isobutoxy, sec-butoxy, t-butoxy, pentoxy, hexoxy and octoxy;

an aryloxy group such as phenoxy; and halogen such as fluorine, chlorine, bromine and iodine;

a trialkylsilyl group such as trimethylsilyl, triethylsilyl and triphenylsilyl.

Listed below are concrete examples of the transition metal compound represented by the formula [VI].

Bis(cyclopentadienyl)zirconium dichloride,
Bis(methylcyclopentadienyl)zirconium dichloride,
Bis(ethylcyclopentadienyl)zirconium dichloride,
Bis(n-propylcyclopentadienyl)zirconium dichloride,
Bis(n-butylcyclopentadienyl)zirconium dichloride,
Bis(n-hexylcyclopentadienyl)zirconium dichloride,
Bis(methyl-n-propylcyclopentadienyl)zirconium dichloride,
Bis(methyl-n-butylcyclopentadienyl)zirconium dichloride,
Bis (dimethyl-n-butylcyclopentadienyl)zirconium dichloride,
Bis(n-butylcyclopentadienyl)zirconium dibromide,
Bis(n-butylcyclopentadienyl)zirconium methoxychloride,
Bis(n-butylcyclopentadienyl)zirconium ethoxychloride,
Bis(n-butylcyclopentadienyl)zirconium butoxychloride,
Bis(n-butylcyclopentadienyl)zirconium diethoxide,
Bis(n-butylcyclopentadienyl)zirconium methylchloride,
Bis(n-butylcyclopentadienyl)zirconium dimethyl,
Bis(n-butylcyclopentadienyl)zirconium benzylchloride,
Bis(n-butylcyclopentadienyl)zirconium dibenzyl,
Bis(n-butylcyclopentadienyl)zirconium phenylchloride, and
Bis(n-butylcyclopentadienyl)zirconium hydridechloride.

In the above exemplified compounds, di-substituted cyclopentadienyl include 1,2- and 1,3-substituted, and tri-substituted include 1,2,3- and 1,2,4-substituted.

There may also be used transition metal compounds obtained by substituting titanium or hafnium for zirconium in the above-exemplified zirconium compounds.

Of these transition metal compounds represented by the formula [VI], particularly preferred is Bis(n-propylcyclopentadienyl)zirconium dichloride,
Bis(n-butylcyclopentadienyl)zirconium dichloride,
Bis(1-methyl-3-n-propylcyclopentadienyl)zirconium dichloride, or
Bis(1-methyl-3-n-butylcyclopentadienyl)zirconium dichloride.

The organoaluminum oxy-compound catalyst component (b) [component (b)] which forms the olefin polymerization catalyst (3) is the same as the organoluminum oxy-compound which forms the above mentioned olefin polymerization catalyst (1).

The carrier (c) [component (c)] which forms the olefin polymerization catalyst (3) is the same as the carrier which forms the above mentioned olefin polymerization catalyst (1).

The optionally used organoaluminum compound catalyst component (d) [component (d)] is the same as the organoaluminum compound which forms the above mentioned olefin polymerization catalyst (1).

The ethylene/α-olefin copolymer [A-4] used in the present invention can be prepared by the olefin polymerization catalyst (3) formed by contacting the above-mentioned components (a-3), (b), (c) and if necessary, component (d). Though the mixing of these components (a-3), (b), (c) and (d) may be conducted in arbitrarily selected order, the mixing and contacting is preferably conducted in the order of:

mixing and contacting the components (b) and (c), followed by mixing and contacting the component (a-3), and if necessary, mixing and contacting the component (d).

The mixing of the above-mentioned components (a-3), (b), (c) and (d) can be carried out in an inert hydrocarbon.

As the inert hydrocarbon solvent, there may be mentioned an aliphatic hydrocarbon, such as propane, butane, pentane, hexane, heptane, octane, decane, dodecane and kerosene;

an alicyclic hydrocarbon, such as cyclopentane, cyclohexane and methylcyclopentane;

an aromatic hydrocarbon, such as benzene, toluene and xylene;

a halogenated hydrocarbon, such as ethylene chloride, chlorobenzene and dichloromethane; and a mixture thereof.

In the contacting and mixing of the components (a-3), (b), (c) and if necessary (d), the component (a-3) is used usually in an amount of $5 \times 10^{-6}$ to $5 \times 10^{-4}$ mol, preferably $1 \times 10^{-5}$ to $2 \times 10^{-4}$ mol based on 1 g of the component (c), and the concentration thereof is $1 \times 10^{-4}$ to $2 \times 10^{-2}$ mol/l, preferably $2 \times 10^{-4}$ to $1 \times 10^{-2}$ mol/l. The atomic ratio (Al/transition metal) of the aluminum in the component (b) to the transition metal in the component (a-3) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5.

The components (a-3), (b) and (c), and if necessary, the component (d) are mixed and contacted at a temperature of usually −50 to 150° C., preferably −20 to 120° C., with a contact time of 1 minute to 50 hours, preferably 10 minutes to 25 hours.

In the catalyst (3) for olefin polymerization obtained as described above, it is desirable that the transition metal derived from component (a-3) is supported in an amount of $5 \times 10^{-6}$ to $5 \times 10^{-4}$ g atom, preferably $1 \times 10^{-5}$ to $2 \times 10^{-4}$ g atom, and aluminum derived from components (b) and (d) is supported in an amount of $10^{-3}$ to $5 \times 10^{-2}$ g atom, preferably $2 \times 10^{-3}$ to $2 \times 10^{-2}$ g atom, all the amounts being based on 1 g of the component (c)

Further, the catalyst for preparing the ethylene/α-olefin copolymer [A-4] used in the present invention may be a prepolymerized catalyst (3) obtained by prepolymerization of olefin in the presence of the above-mentioned components (a-3), (b) and (c), and if necessary, (d).

The prepolymerized catalyst (3) can be prepared by mixing the component (a-3), the component (b), the component (c), and if necessary, the component (d), introducing olefin to the resulting mixture in the inert hydrocarbon solvent, and carrying out prepolymerization.

The olefins which can be prepolymerized include ethylene and α-olefins each having 3 to 20 carbon atoms, for example, propylene, 1-butene, 1-pentene, 4-methyl-1-pentene, 1-hexene, 1-octene, 1-decene, 1-dodecene and 1-tetradecene. Of these, particularly preferred is ethylene or the combination of ethylene and α-olefin used in the polymerization.

During the prepolymerization, the component (a-3) is used usually in a concentration of is $1 \times 10^{-6}$ to $2 \times 10^{-2}$ mol/l, preferably $5 \times 10^{-5}$ to $1 \times 10^{-2}$ mol/l and amount thereof is usually $5 \times 10^{-6}$ to $5 \times 10^{-4}$ mol, preferably $1 \times 10^{-5}$ to $2 \times 10^{-4}$ mol based on 1 g of the component (c). The atomic ratio (Al/transition metal) of the aluminum in the component (b) to the transition metal in the component (a-3) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5. The prepolymerization is carried out at a temperature of −20 to 80° C., preferably 0 to 60° C., with a time of 0.5 to 100 hours, preferably 1 to 50 hours.

The prepolymerized catalyst (3) can be prepared as described below. First, the carrier (component (c)) is suspended in the inert hydrocarbon. To the suspension, the organoaluminum oxy-compound catalyst component (component (b)) is introduced, and reacted for predetermined period. Successively, supernatant is removed, and the resulting solid component is re-suspended in the inert hydrocarbon. Into the system, the transition metal compound catalyst component (component (a-3)) is added and reacted for predetermined period. Then, supernatant is removed to obtain a solid catalyst component. Continuously, the solid catalyst component obtained above is added into inert hydrocarbon containing the organoaluminum compound catalyst component (component (d)), and olefin is introduced therein to obtain the prepolymerized catalyst (3).

An amount of prepolymerized polyolefin produced in the prepolymerization is, desirably based on 1 g of the carrier (c), of 0.1 to 500 g, preferably 0.2 to 300 g, more preferably 0.5 to 200 g. In the prepolymerized catalyst (3), component (a-3) is desirably supported in an amount in terms of transition metal atom, based on 1 g of the carrier (c), of about $5 \times 10^{-6}$ to $5 \times 10^{-4}$ g atom, preferably $1 \times 10^{-5}$ to $2 \times 10^{-4}$ g atom. Further, a molecular ratio (Al/M) of aluminum atom (Al) derived from components (b) and (d) to transition metal atom (M) derived from component (a-3) is usually 5 to 200, preferably 10 to 150.

The prepolymerization may be carried out either batchwise or continuously, and under reduced pressure, normal pressure or applied pressure. During the prepolymerization, hydrogen may be allowed to be present to obtain a prepolymer desirably having an intrinsic viscosity [η] of 0.2 to 7 dl/g, preferably 0.5 to 5 dl/g as measured in decalin at least 135° C.

The ethylene/α-olefin copolymers [A-4] used in the present invention are obtained by copolymerizing ethylene with an α-olefin having 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene in the presence of the olefin polymerization catalyst (3) or the prepolymerized catalyst (3).

Copolymerization of ethylene and α-olefin is carried out in a gas phase or liquid phase, for example, in slurry. In the slurry polymerization, an inactive hydrocarbon or the olefin itself may be used as a solvent.

Concrete examples of the inactive hydrocarbon solvent include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and gas oil. Of these inactive hydrocarbons, preferred are aliphatic hydrocarbons, alicyclic hydrocarbons and petroleum fractions.

When the copolymerization is carried out by the slurry method or the gas phase method, the olefin polymerization catalyst (3) or the prepolymerized catalyst (3) is used at such amount that the concentration of the transition metal compound becomes usually $10^{-8}$ to $10^{-3}$ g atom/liter, preferably $10^{-7}$ to $10^{-4}$ g atom/liter in terms of the transition metal in the polymerization reaction system.

Furthermore, in the polymerization, an organoaluminum oxy-compound similar to the catalyst component (b) and/or an organoaluminum compound (d) may be added. In this case, the atomic ratio (Al/M) of the aluminum atom (Al) derived from the organoaluminum oxy-compound and the organoaluminum compound to the transition metal atom (M) derived from the transition metal compound catalyst component (a-3) is 5 to 300, preferably 10 to 200, more preferably 15 to 150.

When the ethylene/α-olefin copolymer [A-4] is prepared by the slurry polymerization, the polymerization temperature is usually −50 to 100° C., preferably 0 to 90° C. When the ethylene/α-olefin copolymer [A-4] is prepared by the gas phase polymerization, the polymerization temperature is usually 0 to 120° C., preferably 20 to 100° C.

The polymerization is carried out usually at a normal pressure to 100 kg/cm$^2$, preferably under a pressure condition of 2 to 50 kg/cm$^2$. The polymerization can be carried out either batchwise, semicontinuously or continuously.

Further, the polymerization may also be carried out in not less than 2 steps having reaction conditions different from each other.

[High-pressure Radical Polymerization Low-density Polyethylene [B-4]]

The high-pressure radical polymerization low-density polyethylene [B-4] used in the invention is a branched polyethylene having a number of long chain branches prepared by so-called high-pressure radical polymerization, and has a melt flow rate (MFR), as determined in accordance with ASTM D1238-65T under the conditions of a temperature of 190° C. and a load of 2.16 kg, of 0.1 to 50 g/10 min, preferably 0.2 to 10 g/10 min, more preferably 0.2 to 8 g/10 min.

In the high-pressure radical polymerization low-density polyethylene [B-4] used in the invention, the index of the molecular weight distribution (Mw/Mn, Mw=weight-average molecular weight, Mn=number-average molecular weight) measured by means of gel permeation chromatography (GPC) and the melt flow rate (MFR) satisfy the relation:

$$7.5 \times \log(MFR) - 1.2 \leq Mw/Mn \leq 7.5 \times \log(MFR) + 12.5,$$

preferably $$7.5 \times \log(MFR) - 0.5 \leq Mw/Mn \leq 7.5 \times \log(MFR) + 12.0,$$

more preferably $$7.5 \times \log(MFR) \leq Mw/Mn \leq 7.5 \times \log(MFR) + 12.0.$$

The high-pressure radical polymerization low-density polyethylene [B-4] used in the invention desirably has a density (d) of 0.910 to 0.930 g/cm³.

Further, in the high-pressure radical polymerization low-density polyethylene [B-4] used in the invention, a swell ratio indicating a degree of the long chain branch, namely, a ratio (Ds/D) of a diameter (Ds) of a strand to an inner diameter (D) of a nozzle, is desirably not less than 1.3. The strand used herein is a strand extruded from a nozzle having an inner diameter (D) of 2.0 mm and a length of 15 mm at an extrusion rate of 10 mm/min and a temperature of 190° C. using a capillary type flow property tester.

The high-pressure radical polymerization low-density polyethylene [B-4] as mentioned above may be a copolymer obtained by copolymerizing ethylene with a polymerizable monomer such as other α-olefin, vinyl acetate or acrylic ester, provided that the object of the present invention is not marred.

[Ethylene Copolymer Composition]

The fifth ethylene copolymer composition according to the invention comprises the aforementioned ethylene/α-olefin copolymer [A-4] and the high-pressure radical polymerization low-density polyethylene [B-4], and a weight ratio ([A-4]:[B-4]) between the ethylene/α-olefin copolymer [A-4] and the high-pressure radical polymerization low-density polyethylene [B-4] is usually in the range of 99:1 to 60:40, preferably 98:2 to 70:30, more preferably 98:2 to 80:20.

When the amount of the high-pressure radical polymerization low-density polyethylene [B-4] is less than the lower limit of the above range, the resulting composition is sometimes improved insufficiently in the transparency and the melt tension, and when the amount thereof is larger than the upper limit of the above range, the resulting composition is sometimes markedly deteriorated in the tensile strength and the stress crack resistance.

The fifth ethylene copolymer composition according to the invention may contain various additives if desired, for example, weathering stabilizer, heat stabilizer, antistatic agent, anti-slip agent, anti-blocking agent, antifogging agent, lubricant, pigment, dye, nucleating agent, plasticizer, anti-aging agent, hydrochloric acid absorbent and antioxidant, provided that the object of the invention is not marred.

The fifth ethylene copolymer composition according to the invention can be prepared by known processes, for example, processes described below.

(1) A process of mechanically blending the ethylene/α-olefin copolymer [A-4], the high-pressure radical polymerization low-density polyethylene [B-4], and if necessary, other optional components by the use of an extruder, a kneader or the like.

(2) A process comprising dissolving the ethylene/α-olefin copolymer [A-4], the high-pressure radical polymerization low-density polyethylene [B-4], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer [A-4], the high-pressure radical polymerization low-density polyethylene [B-4], and if necessary, other optional components in an appropriate good solvent to prepare solutions, then mixing the solutions, and removing the solvent from the resulting mixture.

(4) A process of combining the above processes (1) to (3).

The fifth ethylene copolymer composition according to the present invention is subjected to ordinary air-cooling inflation molding, two-stage air-cooling inflation molding, high-speed inflation molding, T-die film molding, water-cooling inflation molding or the like, to obtain a film. The film thus obtained is excellent in transparency and mechanical strength, and has properties inherently belonging to general LLDPE, such as heat-sealing properties, hot-tack properties, heat resistance and blocking resistance. Further, the film is free from surface stickiness because the ethylene/α-olefin copolymer [A-4] has a prominently narrow composition distribution. Moreover, because of low stress within the high-shear region, the ethylene copolymer composition can be extruded at a high speed, and consumption of electric power is small, resulting in economical advantage.

Films obtained by processing the fifth ethylene copolymer composition of the present invention are suitable for, for example, standard bags, heavy bags, wrapping films, materials for laminates, sugar bags, packaging bags for oily goods, packaging bags for moist goods, various packaging films such as those for foods, bags for liquid transportation and agricultural materials. The films may also be used as multi-layer films by laminating the films on various substrates such as a nylon substrate and a polyester substrate. Further, the films may be used for liquid transportation bags obtained by blow molding, bottles obtained by blow molding, tubes and pipes obtained by extrusion molding, pull-off caps, injection molded products such as daily use miscellaneous goods, fibers and large-sized molded articles obtained by rotational molding.

Sixth Ethylene Copolymer Composition

The sixth ethylene copolymer composition according to the present invention comprises an ethylene/α-olefin copolymer [A-4] and a crystalline polyolefin [B-2].

[Ethylene/α-olefin Copolymer [A-4]]

The ethylene/α-olefin copolymer [A-4] employable for the sixth ethylene copolymer composition is the same as the ethylene/α-olefin copolymer used for the fifth ethylene copolymer composition described above.

[Crystalline Polyolefin [B-2]]

The crystalline polyolefin [B-2] employable for the sixth ethylene copolymer composition is the same as the crystalline polyolefins (B-I) to (B-III) used for the second ethylene copolymer composition described before.

[Ethylene Copolymer Composition]

The sixth ethylene copolymer composition according to the invention comprises the ethylene/α-olefin copolymer [A-4] and the crystalline polyolefin [B-2], and a weight ratio ([A-4]:[B-2]) between the ethylene/α-olefin copolymer [A-4] and the crystalline polyolefin [B-2] is usually in the range of 99:1 to 60:40, preferably 98:2 to 70:30, more preferably 98:2 to 80:20.

The sixth ethylene copolymer composition according to the invention may contain various additives if desired, for example, weathering stabilizer, heat stabilizer, antistatic agent, anti-slip agent, anti-blocking agent, antifogging agent, lubricant, pigment, dye, nucleating agent, plasticizer, anti-aging agent, hydrochloric acid absorbent and antioxidant, provided that the object of the invention is not marred.

The sixth ethylene copolymer composition according to the invention can be prepared by known processes, for example, processes described below.

(1) A process of mechanically blending the ethylene/α-olefin copolymer [A-4], the crystalline polyolefin [B-2], and if necessary, other optional components by the use of an extruder, a kneader or the like.

(2) A process comprising dissolving the ethylene/α-olefin copolymer [A-4], the crystalline polyolefin [B-2], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer [A-4], the crystalline polyolefin [B-2], and if necessary, other optional components in an appropriate good solvent to prepare solutions, then mixing the solutions, and removing the solvent from the resulting mixture.

(4) A process of combining-the above processes (1) to (3).

The sixth ethylene copolymer composition according to the present invention is subjected to ordinary air-cooling inflation molding, two-stage air-cooling inflation molding, high-speed inflation molding, T-die film molding, water-cooling inflation molding or the like, to obtain a film. The film thus obtained is well-balanced between the transparency and the rigidity, and has properties inherently belonging to general LLDPE, such as heat-sealing properties, hot-tack properties and heat resistance. Further, the film is free from surface stickiness because the ethylene/α-olefin copolymer [A-4] has a prominently narrow composition distribution.

Films obtained by processing the sixth ethylene copolymer composition of the invention are suitable for, for example, standard bags, heavy bags, wrapping films, materials for laminates, sugar bags, packaging bags for oily goods, packaging bags for moist goods, various packaging films such as those for foods, bags for liquid transportation and agricultural materials. The films may also be used as multi-layer films by laminating the films on various substrates such as a nylon substrate and a polyester substrate. Further, the films may be used for liquid transportation bags obtained by blow molding, bottles obtained by blow molding, tubes and pipes obtained by extrusion molding, pull-off caps, injection molded products such as daily use miscellaneous goods, fibers, and large-sized molded articles obtained by rotational molding. Particularly, the films are most suitable for liquid transportation bags.

Seventh Ethylene Copolymer Composition

The seventh ethylene copolymer composition according to the present invention comprises an ethylene/α-olefin copolymer [A-4] and an olefin type elastomer [B-3].

[Ethylene/α-olefin Copolymer [A-4]]

The ethylene/α-olefin copolymer [A-4] employable for the seventh ethylene copolymer composition is the same as the ethylene/α-olefin copolymer used for the fifth ethylene copolymer composition described before.

[Olefin Type Elastomer [B-3]]

The olefin type elastomer [B-3] employable for the seventh ethylene copolymer composition is the same as the olefin type elastomer used for the third ethylene copolymer composition described before.

[Ethylene Copolymer Composition]

The seventh ethylene copolymer composition according to the invention comprises the ethylene/α-olefin copolymer [A-4] and the olefin type elastomer [B-3], and a weight ratio ([A-4]:[B-3]) between the ethylene/α-olefin copolymer [A-4] and the olefin type elastomer [B-3] is usually in the range of 99:1 to 60:40, preferably 95:5 to 70:30, more preferably 98:2 to 80:20. The ethylene/α-olefin copolymer [A-4] and the olefin type elastomer [B-3] are appropriately selected so that a density ratio ([B-3]/[A-4]) of the olefin type elastomer [B-3] to the ethylene/α-olefin copolymer [A-4] is less than 1, preferably in the range of 0.905 to 0.980.

The seventh ethylene copolymer composition according to the invention may contain various additives if desired, for example, weathering stabilizer, heat stabilizer, antistatic agent, anti-slip agent, anti-blocking agent, antifogging agent, lubricant, pigment, dye, nucleating agent, plasticizer, anti-aging agent, hydrochloric acid absorbent and antioxidant, provided that the object of the invention is not marred.

The seventh ethylene copolymer composition according to the invention can be prepared by known processes, for example, processes described below.

(1) A process of mechanically blending the ethylene/α-olefin copolymer [A-4], the olefin type elastomer [B-3], and if necessary, other optional components by the use of an extruder, a kneader or the like.

(2) A process comprising dissolving the ethylene/α-olefin copolymer [A-4], the olefin type elastomer [B-3], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer [A-4], the olefin type elastomer [B-3], and if necessary, other optional components in an appropriate good solvent to prepare solutions, then mixing the solutions, and removing the solvent from the resulting mixture.

(4) A process of combining the above processes (1) to (3).

The seventh ethylene copolymer composition according to the present invention is subjected to ordinary air-cooling inflation molding, two-stage air-cooling inflation molding, high-speed inflation molding, T-die film molding, water-cooling inflation molding or the like, to obtain a film. The film thus obtained is well-balanced between the transparency and the rigidity, and has properties inherently belonging to general LLDPE, such as heat-sealing properties, hot-tack properties and heat resistance. Further, the film is free from surface stickiness because the ethylene/α-olefin copolymer [A-4] has a prominently narrow composition distribution.

Films obtained by processing the seventh ethylene copolymer composition of the invention are suitable for, for example, standard bags, heavy bags, wrapping films, materials for laminates, sugar bags, packaging-bags for oily goods, packaging bags for moist goods, various packaging films such as those for foods, bags for liquid transportation and agricultural materials. The films may also be used as multi-layer films by laminating the films on various substrates such as a nylon substrate and a polyester substrate. Further, the films may be used for liquid transportation bags obtained by blow molding, bottles obtained by blow molding, tubes and pipes obtained by extrusion molding, pull-off caps, injection molded products such as daily use miscellaneous goods, fibers, and large-sized molded articles obtained by rotational molding. Particularly, the films are most suitable as wrapping films.

Eighth Ethylene Copolymer Composition

The eighth ethylene copolymer composition according to the present invention comprises an ethylene/α-olefin copolymer composition [Ib] which comprises an ethylene/α-olefin copolymer [A-5] and an ethylene/α-olefin copolymer [A-6], and a high-pressure radical polymerization low-density polyethylene [IIb].

[Ethylene/α-olefin Copolymer [A-5]]

The ethylene/α-olefin copolymer [A-5] for forming the eighth ethylene copolymer composition of the invention is a random copolymer of ethylene with an α-olefin of 3 to 20 carbon atoms. Examples of the α-olefin of 3 to 20 carbon atoms employable for copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [A-5], it is desired that constituent units derived from ethylene are present in an amount of 55 to 99% by weight, preferably 65 to 98% by weight, more preferably 70 to 96% by weight, and constituent units derived from α-olefin of 3 to 20 carbon atoms are present in an amount of 1 to 45% by weight, preferably 2 to 35% by weight, more preferably. 4 to 30% by weight.

The ethylene/α-olefin copolymer [A-5] has the following properties (i) to (v).

(i) The density (d) is usually in the range of 0.880 to 0.940 g/cm$^3$, preferably 0.890 to 0.935 g/cm$^3$, more preferably 0.900 to 0.930 g/cm$^3$.

(ii) The intrinsic viscosity [$\eta_{A-5}$] as measured in decalin at 135° C. is in the range of 1.0 to 10.0 dl/g, preferably 1.25 to 8 dl/g, more preferably 1.27 to 6 dl/g.

(iii) The temperature (Tm (° C.)) at which the endothermic curve of the copolymer measured by a differential scanning calorimeter (DSC) shows the maximum peak and the density (d) satisfy the relation:

$Tm < 400 \times d - 250$, preferably $Tm < 450 \times d - 297$, more preferably $Tm < 500 \times d - 344$, particularly preferably $Tm < 550 \times d - 391$.

(iv) The melt tension (MT(g)) and the melt flow rate (MFR) satisfy the relation:

$MT \leq 2.2 \times MFR^{-0.84}$.

(v) The fraction of a n-decane-soluble component (W % by weight) at room temperature and the density (d) satisfy the relation:

$W < 80 \times \exp(-100(d-0.88)) + 0.1$, preferably $W < 60 \times \exp(-100(d-0.88)) + 0.1$, more preferably $W < 40 \times \exp(-100(d-0.88)) + 0.1$.

It may be concluded from the relation between the temperature (Tm) at which the endothermic curve measured by a differential scanning calorimeter (DSC) shows the maximum peak and the density (d), and the relation between the fraction (W) of a n-decane-soluble component and the density (d), that the ethylene/α-olefin copolymer [A-5] has a narrow composition distribution.

Further, the number of unsaturated bond present in the molecule of the ethylene/α-olefin copolymer [A-5] desirably is not more than 0.5 per 1,000 carbon atoms and less than 1 per one molecule of the copolymer.

The ethylene/α-olefin copolymer [A-5] having the properties as mentioned above can be prepared by copolymerizing ethylene with an α-olefin of 3 to 20 carbon atoms in the presence of the aforementioned olefin polymerization catalyst (3) or prepolymerized catalyst (3) under the same conditions as those for preparing the ethylene/α-olefin copolymer [A-5] in such a manner that the resulting copolymer would have a density of 0.880 to 0.940 g/cm$^3$.

When a slurry polymerization process is used for preparing the ethylene/α-olefin copolymer [A-5], the polymerization temperature is usually in the range of –50 to 90° C., preferably 0 to 80° C., and when a gas phase polymerization process is used therefor, the polymerization temperature is usually in the range of 0 to 90° C., preferably 20 to 80° C.

[Ethylene/α-olefin Copolymer [A-6]]

The ethylene/α-olefin copolymer [A-6] for forming the eighth ethylene copolymer composition of the invention is a random copolymer of ethylene with an α-olefin of 3 to 20 carbon atoms. Examples of the α-olefin of 3 to 20 carbon atoms employable for copolymerization with ethylene include propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene.

In the ethylene/α-olefin copolymer [A-6], it is desired that constituent units derived from ethylene are present in an amount of 55 to 99% by weight, preferably 65 to 98% by weight, more preferably 70 to 96% by weight, and constituent units derived from α-olefin of 3 to 20 carbon atoms are present in an amount of 1 to 45% by weight, preferably 2 to 35% by weight, more preferably 4 to 30% by weight.

The ethylene/α-olefin copolymer [A-6] has the following properties (i) to (v).

(i) The density (d) is usually in the range of 0.910 to 0.960 g/cm$^3$, preferably 0.915 to 0.955 g/cm$^3$, more preferably 0.920 to 0.950 g/cm$^3$.

(ii) The intrinsic viscosity [$\eta_{A-6}$] as measured in decalin at 135° C. is in the range of 0.5 to 2.0 dl/g, preferably 0.55 to 1.9 dl/g, more preferably 0.6 to 1.8 dl/g.

(iii) The temperature (Tm (° C.)) at which the endothermic curve of the copolymer measured by a differential scanning calorimeter (DSC) shows the maximum peak and the density (d) satisfy the relation:

$Tm < 400 \times d - 250$, preferably $Tm < 450 \times d - 297$, more preferably $Tm < 500 \times d - 344$, particularly preferably $Tm < 550 \times d - 391$.

(iv) The melt tension (MT(g)) and the melt flow rate (MFR) satisfy the relation:

$MT \leq 2.2 \times MFR^{-0.84}$.

(v) The quantity fraction (W (% by weight)) of a n-decane-soluble component at room temperature and the density (d) satisfy the relation:

in the case of MFR≦10 g/10 min, $W < 80 \times \exp(-100(d-0.88))+0.1$, preferably $W < 60 \times \exp(-100(d-0.88))+0.1$, more preferably $W < 40 \times \exp(-100(d-0.88))+0.1$, in the case of MFR>10 g/10 min, $W < 80 \times (MFR-9)^{0.26} \times \exp(-100(d-0.88))+0.1$.

It may be concluded from the relation between the temperature (Tm) at which the endothermic curve measured by a differential scanning calorimeter (DSC) shows the maximum peak and the density (d), and the relation between the fraction (W) of a n-decane-soluble component and the density (d), that the ethylene/α-olefin copolymer [A-6] has a narrow composition distribution.

Further, the number of unsaturated bond present in the molecule of the ethylene/α-olefin copolymer [A-6] desirably is not more than 0.5 per 1,000 carbon atoms and less than 1 per one molecule of the copolymer.

The ethylene/α-olefin copolymer [A-6] having the properties as mentioned above can be prepared by copolymerizing ethylene with an α-olefin of 3 to 20 carbon atoms in the presence of an olefin polymerization catalyst (4) or a prepolymerized catalyst (4) formed from (a-4) a transition metal compound catalyst component, (b) an organoaluminum oxy-compound catalyst component, (c) a carrier, and if necessary, (d) an organoaluminum compound catalyst component, all components being described later, in such a manner that the resulting copolymer would have a density of 0.910 to 0.960 g/cm³.

First, the transition metal compound catalyst component (a-4) is explained below.

The transition metal compound catalyst component (a-4) (sometimes referred to as "component (a-4)" hereinafter) is a compound of a transition metal in Group IV of the periodic table which contains a ligand having a cyclopentadienyl skeleton. There is no specific limitation on the component (a-4), as far as it is a compound of a transition metal in Group IV of the periodic table which contains a ligand having a cyclopentadienyl skeleton. However, the component (a-4) preferably is a transition metal compound represented by the following formula [VII].

$ML_x$           [VII]

wherein M is a transition metal atom selected from Group IVB of the periodic table, L is a ligand coordinating to the transition metal, at least one of L is a ligand having a cyclopentadienyl skeleton, L other than the ligand having a cyclopentadienyl skeleton is a hydrocarbon group of 1 to 12 carbon atoms, an alkoxy group, an aryloxy group, a trialkylsilyl group, a SO₃R group (R is a hydrocarbon group of 1 to 8 carbon atoms which may have a substituent group such as halogen), a halogen atom or a hydrogen atom, and X is a valance of the transition metal.

The transition metal compound represented by the above formula [VII] includes the transition metal compound represented by the formula [VI] which is cited before as the transition metal catalyst component (a-3).

In the above-mentioned formula [VII], M is a transition metal selected from Group IVB of the periodic table, and concrete preferable examples of M include zirconium, titanium and hafnium. Of these, particularly preferred is zirconium.

The ligands having a cyclopentadienyl skeleton include, for example, cyclopentadienyl; an alkyl-substituted cyclopentadienyl group such as methylcyclopentadienyl, dimethylcyclopentadienyl, trimethylcyclopentadienyl, tetramethylcyclopentadienyl, pentamethylcyclopentadienyl, ethylcyclopentadienyl, methylethylcyclopentadienyl, propylcyclopentadienyl, methylpropylcyclopentadienyl, butylcyclopentadienyl, methylbutylcyclopentadienyl and hexylcyclopentadienyl; indenyl, 4,5,6,7-tetrahydroindenyl and fluorenyl. These groups may be substituted with halogen atom or trialkylsilyl group, and the like.

Of these ligands coordinated to the transition metal, particularly preferred is the alkyl-substituted cyclopentadienyl group.

When the compound represented by the above formula [VII] contains two or more of the groups having a cyclopentadienyl skeleton, two of them each having a cyclopentadienyl skeleton can be bonded together through an alkylene group (e.g., ethylene and propylene), a substituted alkylene group such as isopropylidene and diphenylmethylene, a silylene group, or a substituted silylene group such as dimethylsilylene, diphenylsilylene and methylphenylsilylene.

Concrete examples of the ligand L other than those having a cyclopentadienyl skeleton are as follows:

The hydrocarbon group having 1 to 12 carbon atoms includes, for example, an alkyl group, a cycloalkyl group, an aryl group and an aralkyl group, and concrete examples of these groups are as follows;

an alkyl group such as methyl, ethyl, propyl, isopropyl and butyl;

a cycloalkyl group such as cyclopentyl and cyclohexyl;

an aryl group such as phenyl and tolyl;

an aralkyl group such as benzyl and neophyl;

an alkoxy group such as methoxy, ethoxy and butoxy;

an aryloxy group such as phenoxy; and halogen such as fluorine, chlorine, bromine and iodine.

The ligand represented by SO₃R includes, for example, p-toluenesulfonate, methanesulfonate and trifluoromethanesulfonate.

Such a metallocene compound containing ligands each having a cyclopentadienyl skeleton (e.g. having a transition metal with a valence of 4) may be represented more concretely by the formula [VII']

$R^2_k R^3_l R^4_m R^5_n M$        [VII']

wherein M is a transition metal as mentioned above, $R^2$ is a group having a cyclopentadienyl skeleton (ligand), $R^3$, $R^4$ and $R^5$ are each a group having a cyclopentadienyl skeleton, an alkyl group, a cycloalkyl group, an aryl group, an aralkyl group, an alkoxy group, an aryloxy group, trialkylsilyl group, SO₃R group, halogen or hydrogen, k is an integer of not less than 1, and k+l+m+n=4.

As the component (a-4), preferred is the metallocene compound represented by the above formula [VII'] in which at least two of $R^2$, $R^3$, $R^4$ and $R^5$, that is, $R^2$ and $R^3$ are each a group having a cyclopentadienyl skeleton (ligand). Said groups having a cyclopentadienyl skeleton may be bonded together through a group such as an alkylene group (e.g., ethylene and propylene), a substituted alkylene group such as isopropylidene and diphenylmethylene, a silylene group, and a substituted silylene group such as dimethylsilylene, diphenylsilylene and methylphenylsilylene. Further, $R^4$ and $R^5$ are each a group having a cyclopentadienyl skeleton, an alkyl group, a cycloalkyl group, an aryl group, an aralkyl group, an alkoxy group, an aryloxy group, trialkylsilyl group, $SO_3R$ group, halogen or hydrogen.

Listed below are concrete examples of the transition metal compound having zirconium as M.

Bis(indenyl)zirconium dichloride,
Bis(indenyl)zirconium dibromide,
Bis(indenyl)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethylzirconium,
Ethylenebis(indenyl)diphenylzirconium,
Ethylenebis(indenyl)methylzirconium monochloride,
Ethylenebis(indenyl)zirconium bis(methanesulfonate),
Ethylenebis(indenyl)zirconium bis(p-toluenesulfonate),
Ethylenebis(indenyl)zirconium bis(trifluoromethanesulfonate),
Ethylenebis(4,5,6,7-tetrahydroindenyl)zirconium dichloride,
Isopropylidene(cyclopentadienylfluorenyl)zirconium dichloride,
Isopropylidene(cyclopentadienyl-methyl cyclopentadienyl)zirconium dichloride,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl)zirconium dichloride,
Dimethylsilylenebis(indenyl)zirconium dichloride,
Dimethylsilylenebis(indenyl)zirconium bis(trifluoromethanesulfonate),
Dimethylsilylenebis(4,5,6,7-tetrahydroindenyl)zirconium dichloride,
Dimethylsilylenebis(cyclopentadienyl-fluorenyl)zirconium dichloride,
Diphenylsilylenebis(indenyl)zirconium dichloride,
Methylphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohydride,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)dibenzylzirconium,
Bis(cyclopentadienyl)zirconium methoxychloride,
Bis(cyclopentadienyl)zirconium ethoxychloride,
Bis(cyclopentadienyl)zirconium bis(methanesulfonate),
Bis(cyclopentadienyl)zirconium bis(p-toluene-sulfonate),
Bis(cyclopentadienyl)zirconium bis(trifluoromethane-sulfonate),
Bis(methylcyclopentadienyl)zirconium dichloride,
Bis(dimethylcyclopentadienyl)zirconium dichloride,
Bis(dimethylcyclopentadienyl)zirconium ethoxychloride,
Bis(dimethylcyclopentadienyl)zirconium bis(trifluoromethanesulfonate),
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium dichloride,
Bis(methylbutylcyclopentadienyl)zirconium bis(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride, and
Bis(trimethylsilylcyclopentadienyl)zirconium dichloride.

In the above exemplified compounds, di-substituted cyclopentadienyl includes 1,2- and 1,3-substituted, and tri-substituted includes 1,2,3- and 1,2,4-substituted. Further, the alkyl group such as propyl or butyl includes n-, i-, sec- and tert- isomers.

There may also be used transition metal compounds obtained by substituting titanium or hafnium for zirconium in the above-exemplified zirconium compounds.

The above listed compounds and the transition metal compounds represented by the above formula [VI] are used as transition metal catalyst component (a-4). Preferred are the above mentioned transition metal compounds represented by the formula [VI]. Of these, particularly preferred is Bis(n-propylcyclopentadienyl)zirconium dichloride,
Bis(n-butylcyclopentadienyl)zirconium dichloride,
Bis(1-methyl-3-n-propylcyclopentadienyl)zirconium dichloride, or
Bis (1-methyl-3-n-butylcyclopentadienyl)zirconium dichloride.

Further, the transition metal catalyst component (a-3) used in the preparation of the ethylene/α-olefin copolymer [A-5] and the transition metal catalyst component (a-4) used in the preparation of the ethylene/α-olefin copolymer [A-6] are preferably the same compounds.

The organoaluminum oxy-compound catalyst component (b) [component (b)] which forms the olefin polymerization catalyst (4) is the same as the organoluminum oxy-compound which forms the above mentioned olefin polymerization catalyst (1).

The carrier (c) [component (c)] which forms the olefin polymerization catalyst (4) is the same as the carrier which forms the above mentioned olefin polymerization catalyst (1).

The optionally used organoaluminum compound catalyst component (d) [component (d)] is the same as the organoaluminum compound which forms the above mentioned olefin polymerization catalyst (1).

The ethylene/α-olefin copolymer [A-6] used in the present invention can be prepared by the olefin polymerization catalyst (4) formed by contacting the above-mentioned components (a-4), (b), (c) and if necessary, component (d). Though the mixing of these components (a-4), (b), (c) and (d) may be conducted in arbitrarily selected order, the mixing and contacting is preferably conducted in the order of:

mixing and contacting the components (b) and (c), followed by mixing and contacting the component (a-4), and if necessary, mixing and contacting the component (d).

The mixing of the above-mentioned components (a-4), (b), (c) and (d) can be carried out in an inert hydrocarbon.

As the inert hydrocarbon solvent, there may be mentioned an aliphatic hydrocarbon, such as propane, butane, pentane, hexane, heptane, octane, decane, dodecane and kerosene; an alicyclic hydrocarbon, such as cyclopentane, cyclohexane and methylcyclopentane; an aromatic hydrocarbon, such as benzene, toluene and xylene; a halogenated hydrocarbon, such as ethylene chloride, chlorobenzene and dichloromethane; and a mixture thereof.

In the contacting and mixing of the components (a-4), (b), (c) and if necessary (d), the component (a-4) is used usually in an amount of $5\times10^{-6}$ to $5\times10^{-4}$ mol, preferably $1\times10^{-5}$ to $2\times10^{-4}$ mol based on 1 g of the component (c), and the concentration thereof is $1\times10^{-4}$ to $2\times10^{-2}$ mol/l, preferably $2\times10^{-4}$ to $1\times10^{-2}$ mol/l. The atomic ratio (Al/transition metal) of the aluminum in the component (b) to the transition metal in the component (a-4) is usually 10 to 500, preferably 20 to 200. The atomic ratio (Al-d/Al-b) of the aluminum atoms (Al-d) in the component (d) optionally used to the aluminum atoms (Al-b) in the component (b) is usually 0.02 to 3, preferably 0.05 to 1.5.

The components (a-4), (b) and (c), and if necessary, the component (d) are mixed and contacted at a temperature of usually −50 to 150° C., preferably −20 to 120° C., with a contact time of 1 minute to 50 hours, preferably 10 minutes to 25 hours.

In the catalyst (4) for olefin polymerization obtained as described above, it is desirable that the transition metal derived from component (a-4) is supported in an amount of $5\times10^{-6}$ to $5\times10^{-4}$ g atom, preferably $1\times10^{-5}$ to $2\times10^{-4}$ g atom, and aluminum derived from components (b) and (d) is supported in an amount of $10^{-3}$ to $5\times10^{-2}$ g atom, preferably $2\times10^{-3}$ to $2\times10^{-2}$ g atom, all the amounts being based on 1 g of the component (c).

Further, the catalyst for preparing the ethylene/α-olefin copolymer [A-6] used in the present invention may be a prepolymerized catalyst (4) obtained by prepolymerization of olefin in the presence of the above-mentioned components (a-4), (b) and (c), and if necessary, (d).

The prepolymerized catalyst (4) can be prepared by mixing the component (a-4), the component (b), the component (c), and if necessary, the component (d), introducing olefin to the resulting mixture in the inert hydrocarbon solvent, and carrying out prepolymerization.

The olefins which can be prepolymerized include ethylene and α-olefins each having 3 to 20 carbon atoms, for example, propylene, 1-butene, 1-pentene, 4-methyl-1-pentene, 1-hexene, 1-octene, 1-decene, 1-dodecene and 1-tetradecene. Of these, particularly preferred is ethylene or the combination of ethylene and α-olefin used in the polymerization.

During the prepolymerization, the component (a-4) is used usually in a concentration of is $1\times10^{-6}$ to $2\times10^{-2}$ mol/l, preferably $5\times10^{-5}$ to $1\times10^{-2}$ mol/l and amount thereof is usually $5\times10^{-6}$ to $5\times10^{-4}$ mol, preferably $1\times10^{-5}$ to $2\times10^{-4}$ mol based on 1 g of the component (c) The atomic ratio (Al/transition metal) of the aluminum in the component (b) to the transition metal in the component (a-4) is usually 10 to 500, preferably 20 to 200. The atomic ratio, (Al-d/Al-b) of the aluminum atoms (Al-d) in the component (d) optionally used to the aluminum atoms (Al-b) in the component (b) is usually 0.02 to 3, preferably 0.05 to 1.5. The prepolymerization is carried out at a temperature of −20 to 80° C., preferably 0 to 60° C., with a time of 0.5 to 100 hours, preferably 1 to 50 hours.

The prepolymerized catalyst (4) can be prepared as described below. First, the carrier (component (c)) is suspended in the inert hydrocarbon. To the suspension, the organoaluminum oxy-compound catalyst component (component (b)) is introduced, and reacted for predetermined period. Successively, supernatant is removed, and the resulting solid component is re-suspended in the inert hydrocarbon. Into the system, the transition metal compound catalyst component (component (a-4)) is added and reacted for predetermined period. Then, supernatant is removed to obtain a solid catalyst component. Continuously, the solid catalyst component obtained above is added into inert hydrocarbon containing the organoaluminum compound catalyst component (component (d)), and olefin is introduced therein to obtain the prepolymerized catalyst (4).

An amount of prepolymerized polyolefin produced in the prepolymerization is, desirably based on 1 g of the carrier (c), of 0.1 to 500 g, preferably 0.2 to 300 g, more preferably 0.5 to 200 g. In the prepolymerized catalyst (4), component (a-4) is desirably supported in an amount in terms of transition metal atom, based on 1 g of the carrier (c), of about $5\times10^{-6}$ to $5\times10^{-4}$ g atom, preferably $1\times10^{-5}$ to $2\times10^{-4}$ g atom. Further, a molecular ratio (Al/M) of aluminum atom (Al) derived from components (b) and (d) to transition metal atom (M) derived from component (a-4) is usually 5 to 200, preferably 10 to 150.

The prepolymerization may be carried out either batchwise or continuously, and under reduced pressure, normal pressure or applied pressure. During the prepolymerization, hydrogen may be allowed to be present to obtain a prepolymer desirably having an intrinsic viscosity [η] of 0.2 to 7 dl/g, preferably 0.5 to 5 dl/g as measured in decalin at least 135° C.

The ethylene/α-olefin copolymers [A-6] used in the present invention are obtained by copolymerizing ethylene with an α-olefin having 3 to 20 carbon atoms such as propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene in the presence of the olefin polymerization catalyst (4) or the prepolymerized catalyst (4).

Copolymerization of ethylene and α-olefin is carried out in a gas phase or liquid phase, for example, in slurry. In the slurry polymerization, an inactive hydrocarbon or the olefin itself may be used as a solvent.

Concrete examples of the inactive hydrocarbon solvent include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosene and gas oil. Of these inactive hydrocarbons, preferred are aliphatic hydrocarbons, alicyclic hydrocarbons and petroleum fractions.

When the copolymerization is carried out by the slurry method or the gas phase method, the olefin polymerization catalyst (4) or the prepolymerized catalyst (4) is used at such amount that the concentration of the transition metal compound becomes usually $10^{-8}$ to $10^{-3}$ g atom/liter, preferably $10^{-7}$ to $10^{-4}$ g atom/liter in terms of the transition metal in the polymerization reaction system.

Furthermore, in the polymerization, an organoaluminum oxy-compound similar to the catalyst component (b) and/or an organoaluminum compound (d) may be added. In this case, the atomic ratio (Al/M) of the aluminum atom (Al) derived from the organoaluminum oxy-compound and the organoaluminum compound to the transition metal atom (M) derived from the transition-metal catalyst component (a-4) is 5 to 300, preferably 10 to 200, more preferably 15 to 150.

When the ethylene/α-olefin copolymer [A-6] is prepared by the slurry polymerization, the polymerization temperature is usually −30 to 100° C., preferably 20 to 90° C. When the ethylene/α-olefin copolymer [A-6] is prepared by the gas phase polymerization, the polymerization temperature is usually 20 to 120° C., preferably 40 to. 100° C.

The polymerization is carried out usually at a normal pressure to 100 kg/cm², preferably under a pressure condition of 2 to 50 kg/cm². The polymerization can be carried out either batchwise, semicontinuously or continuously.

[Ethylene/α-olefin Copolymer Composition [Ib]]

The ethylene/α-olefin copolymer composition [Ib] comprises the ethylene/α-olefin copolymer [A-5] and the ethylene/α-olefin copolymer [A-6]. In this composition [Ib], the ethylene/α-olefin copolymer [A-5] is contained in an amount of 5 to 95% by weight, preferably 10 to 95% by weight, and the ethylene/α-olefin copolymer [A-6] is contained in an amount of 5 to 95% by weight, preferably 10 to 90% by weight.

The ethylene/α-olefin copolymer [A-5] and the ethylene/α-olefin copolymer [A-6] are appropriately combined so that a density ratio ([A-5]/[A-6]) of the ethylene/α-olefin copolymer [A-5] to the ethylene/α-olefin copolymer [A-6] is less than 1, preferably in the range of 0.930 to 0.999. Further, they also are appropriately combined so that a ratio ($[\eta_{A-5}]/[\eta_{A-6}]$) of the intrinsic viscosity $[\eta_{A-5}]$ of the ethylene/α-olefin copolymer [A-5] to the intrinsic viscosity $[\eta_{A-6}]$ of the ethylene/α-olefin copolymer [A-6] is not less than 1, preferably in the range of 1.05 to 10, more preferably 1.1 to 5.

The ethylene/α-olefin copolymer composition has a density of usually 0.890 to 0.955 g/cm³, preferably 0.900 to 0.950 g/cm³, and has a melt flow rate (MFR), as determined in accordance with ASTM D1238-65T under the conditions of a temperature of 190° C. and a load of 2.16 kg, of 0.1 to 100 g/10 min, preferably 0.2 to 50 g/10 min.

The ethylene/α-olefin copolymer composition [Ib] can be prepared by known processes, for example, processes described below.

(1) A process of mechanically blending the ethylene/α-olefin copolymer [A-5], the ethylene/α-olefin copolymer [A-6], and if necessary, other optional components by the use of an extruder, a kneader or the like.

(2) A process comprising dissolving the ethylene/α-olefin copolymer [A-5], the ethylene/α-olefin copolymer [A-6], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer [A-5], the ethylene/α-olefin copolymer [A-6], and if necessary, other optional components in an appropriate good solvent to prepare solutions, then mixing the solutions, and removing the solvent from the resulting mixture.

(4) A process in any combination of the above processes (1) to (3).

Further, the ethylene/α-olefin copolymer composition [Ib] may be prepared by forming the ethylene/α-olefin copolymer [A-5] and the ethylene/α-olefin copolymer [A-6] in two or more copolymerization stages having reaction conditions different from each other, or may be prepared by separately forming the ethylene/α-olefin copolymer [A-5] and the ethylene/α-olefin copolymer. [A-6] by the use of plural polymerizers.

[High-pressure Radical Polymerization Low-density Polyethylene [IIb]]

The high-pressure radical polymerization low-density polyethylene [IIb] employable for the eighth ethylene copolymer composition is the same as the high-pressure radical polymerization low-density polyethylene [B-4] used for the fifth ethylene copolymer composition described before.

[Ethylene Copolymer Composition]

The eighth ethylene copolymer composition according to the invention comprises the ethylene/α-olefin copolymer composition [Ib] and the high-pressure radical polymerization low-density polyethylene [IIb]. It is desirable that a weight ratio ([Ib]:[IIb]) between the ethylene/α-olefin copolymer composition [Ib] and the high-pressure radical polymerization low-density polyethylene [IIb] is usually in the range of 99:1 to 60:40, preferably 98:2 to 70:30, more preferably 98:2 to 80:20.

When the amount of the high-pressure radical polymerization low-density polyethylene is less than the lower limit of the above range, the resulting composition may be improved insufficiently in the transparency and the melt tension. On the other hand, when the amount thereof is larger than the upper limit of the above range, the resulting composition may considerably be deteriorated in the tensile strength and the stress crack resistance.

The eighth ethylene copolymer composition according to the invention may contain various additives if desired, for example, weathering stabilizer, heat stabilizer, antistatic agent, anti-slip agent, anti-blocking agent, anti-fogging agent, lubricant, pigment, dye, nucleating agent, plasticizer, anti-aging agent, hydrochloric acid absorbent and antioxidant, provided that the object of the invention is not marred.

The eighth ethylene copolymer composition according to the invention can be prepared by known processes, for example, processes described below.

(1) A process of mechanically blending the ethylene/α-olefin copolymer composition [Ib], the high-pressure radical polymerization low-density polyethylene [IIb], and if necessary, other optional components by the use of an extruder, a kneader or the like.

(2) A process comprising dissolving the ethylene/α-olefin copolymer composition [Ib], the high-pressure radical polymerization low-density polyethylene [IIb], and if necessary, other optional components in an appropriate good solvent (e.g., hydrocarbon solvent such as hexane, heptane, decane, cyclohexane, benzene, toluene and xylene), and then removing the solvent from the resulting solution.

(3) A process comprising independently dissolving the ethylene/α-olefin copolymer composition [Ib], the high-pressure radical polymerization low-density polyethylene [IIb], and if necessary, other optional components in an appropriate good solvent to prepare solutions, then mixing the solutions, and removing the solvent from the resulting mixture.

(4) A process in any combination of the above processes (1) to (3).

The eighth ethylene copolymer composition according to the present invention may be processed by conventional molding method, for example, air-cooling inflation molding, two-stage air-cooling inflation molding, high-speed inflation molding, T-die film molding, water-cooling inflation molding or the like, to obtain a film. The film thus obtained has excellent mechanical strength, and retains properties inherent in general LLDPE, such as heat-sealing properties, hot-tack properties, heat resistance and blocking resistance. Further, the film is free from surface stickiness because each of the ethylene/α-olefin copolymer [A-5] and the ethylene/

α-olefin copolymer [A-6] has a prominently narrow composition distribution. Moreover, because of low stress within the high-shear region, the ethylene copolymer composition can be extruded at a high speed, and thus consumption of electric power is small, resulting in economical advantage.

Films obtained from the eighth ethylene copolymer composition of the invention are suitable for, for example, standard bags, heavy duty bags, wrapping films, materials for laminates, sugar bags, packaging bags for oily goods, packaging bags for moist goods, various packaging films such as those for foods, bags for liquid transportation and agricultural materials. The films may also be used as multi-layer films by laminating the films on various substrates such as a nylon substrate and a polyester substrate. Further, the films may be used for liquid transportation bags obtained by blow molding, bottles obtained by blow molding, tubes and pipes obtained by extrusion molding, pull-off caps, injection molded products such as daily use miscellaneous goods, fibers and large-sized molded articles obtained by rotational molding.

EFFECT OF THE INVENTION

The ethylene copolymer composition of the present invention is excellent in heat stability and melt tension, and from this ethylene copolymer composition, a film showing high transparency, high mechanical strength and high blocking resistance can be obtained.

EXAMPLE

The present invention is further described below with reference to examples, but it should be construed that the present invention is in no way limited to those examples.

In this specification, physical properties of films were evaluated in the following manner.

Haze

The haze was measured in accordance with ASTM-D-1003-61.

Gloss

The gloss was measured in accordance with JIS Z8741.

Film Impact

The film impact was measured by a pendulum type film impact tester produced by Toyo Seiki Seisakusho K. K.

Blocking Force

Inflation films each having a size of 10 cm (width)×20 cm were sandwiched between two sheets of typing paper, then further sandwiched between glass plates, and a load of 10 kg was applied to them in an air bath of 50° C. for 24 hours. Then, the films were fitted to an open tool to separate the films at a rate of 200 mm/min. A load at the time when the films are separated is A (g), the blocking force F (g/cm) is determined by the following formula.

$$F=A/\text{width of sample}$$

As the F value becomes smaller, blocking of the films come to hardly take place, that is, the film has a higher blocking resistance.

Tensile Test

A specimen was punched using a dumbbell (JIS No. 1) from the film in the machine direction (MD) or the transverse direction (TD) of the film molding direction, and a modulus in tension (YM) and an elongation at break (EL) of the specimen were measured under the conditions of a distance between chucks of 86 mm and a crosshead speed of 200 mm/min.

Preparation Example 1

Preparation of an Ethylene/α-olefin Copolymer

[Preparation of a Solid Catalyst]

7.9 kg of silica having been dried at 250° C. for 10 hours was suspended in 121 liters of toluene, and the resultant suspension was cooled to 0° C. Thereafter, to the suspension was dropwise added 41 liters of a toluene solution of methylaluminoxane (Al=1.47 mol/l) over 1 hour. During the addition, the temperature of the system was kept at 0° C. Successively, the reaction was carried out at 0° C. for 30 minutes. Then, the temperature of the system was elevated to 95° C. over 1.5 hours, and the reaction was carried out at the same temperature for 4 hours. Thereafter, the temperature of the system was lowered to 60° C., and the supernatant liquid was removed by decantation.

The solid component obtained above was washed twice with toluene, and then again suspended in 125 liters of toluene. To the reaction system was dropwise added 20 liters of a toluene solution of bis(1,3-dimethylcyclopentadienyl) zirconium dichloride (Zr=28.4 mmol/l) at 30° C. over 30 minutes, and the reaction was further carried out at 30° C. for 2 hours. Then, the supernatant liquid was removed, and the residue was washed twice with hexane to obtain a solid catalyst containing 4.6 mg of zirconium based on 1 g of the solid catalyst.

[Preparation of a Prepolymerized Catalyst]

To 160 liters of hexane containing 16 mol of triisobutylaluminum was added 4.3 kg of the solid catalyst obtained in the above, and the resultant mixture was subjected to prepolymerization with ethylene at 35° C. for 3.5 hours to obtain a prepolymerized catalyst in which polyethylene was present in an amount of 3 g based on 1 g of the solid catalyst. This ethylene polymer had an intrinsic viscosity [η] of 1.27 dl/g.

Polymerization

In a continuous fluidized bed gas phase reactor, ethylene was copolymerized with 1-hexene at a total pressure of 20 kg/cm²–G and a polymerization temperature of 80° C. To the reactor were continuously fed the prepolymerzied catalyst prepared in the above at a feed rate of 0.048 mmol/hour in terms of zirconium atom and triisobutylaluminum at a feed rate of 10 mmol/hour while continuously feeding ethylene, 1-hexene, hydrogen and nitrogen to maintain a constant gas composition in the reactor (gas composition: 1-hexene/ethylene=0.030, hydrogen/ethylene=0.0013, ethylene concentration=25%)

Thus, an ethylene/α-olefin copolymer [A-1-1) was obtained in an amount of 5.3 kg/hour. The copolymer had a density of 0.920 g/cm³ and a melt flow rate (MFR) of 2.0 g/10 min. The temperature at the maximum peak of the DSC endothermic curve (Tm) of the copolymer was 112.2° C. Further, the copolymer had a melt tension (MT) of 1.8 g at 190° C. and a flow index (FI) of 290 (1/sec). The amount of the decane-soluble portion in the copolymer was 0.47% by weight at 23° C. The number of unsaturated bond in the copolymer was 0.091 per 1,000 carbon atoms, and was 0.08 per one molecule of the polymer.

Physical properties of the ethylene/α-olefin copolymer (A-1-1) are set forth in Table 1.

Example 1

[Preparation of a Composition]

The ethylene/α-olefin copolymer (A-1-1) obtained in Preparation Example 1 and a high-pressure radical polymerization low-density polyethylene (B-1-1) shown in Table 2 were dry blended in a mixing ratio of 90/10 [(A-1-1)/(B-1-1)]. To the resultant blend were added 0.05 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat-resistant stabilizer and 0.05 part by weight of calcium stearate as a hydrochloric acid absorbent, each based on 100 parts by weight of the resin. Then, the resultant mixture was kneaded by a conical-tapered twin-screw extruder (produced by Haake Buchler Instrument Inc.) at a preset temperature of 180° C., to obtain an ethylene copolymer composition.

[Film Formation]

The ethylene copolymer composition obtained as above was subjected to inflation by the use of a single-screw extruder (20 mmφ·L/D=26) equipped with a die of 25 mmφ (lip width: 0.7-mm) and a single-slit air ring under the conditions of an air flow rate of 90 l/min, an extrusion rate of 9 g/min, a blow ratio of 1.8, a take-up rate of 2.4 m/min and a processing temperature of 200° C., to form a film having a thickness of 30 μm.

Melt properties of the ethylene copolymer composition and physical properties of the film formed from the composition are set forth in Table 3.

As is evident from Table 3, the film obtained from the composition was excellent in optical characteristics, moldability, blocking resistance and strength.

Reference Example 1

The procedure of film formation in Example 1 was repeated except for using the ethylene/α-olefin copolymer (A-1-1) obtained in Preparation Example 1, to form a film having a thickness of 30 μm. Melt properties of the ethylene/α-olefin copolymer and physical properties of the film formed from the copolymer are set forth in Table 3.

As is evident from Example 1 and Reference Example 1, the ethylene/α-olefin copolymer was improved in moldability and optical characteristics by blending it with a high-pressure radical polymerization low-density polyethylene. Further, the ethylene copolymer composition was hardly reduced in the film impact as compared with the ethylene/α-olefin copolymer (A-1-1), in spite that the composition contained a high-pressure radical polymerization low-density polyethylene having a low film impact.

Comparative Example 1

[Preparation of an Ethylene/α-olefin Copolymer (C-1)]

The procedure of copolymerization of ethylene with 1-hexene in Preparation Example 1 was repeated except for replacing the zirconium catalyst system with a titanium type catalyst system described in Japanese Patent Publication No. 63(1988)-54289, to obtain an ethylene/α-olefin copolymer (C-1). Physical properties of the ethylene/α-olefin copolymer (C-1) are set forth in Table 1.

[Preparation of an Ethylene Copolymer Composition]

The ethylene/α-olefin copolymer (C-1) obtained in the above and a high-pressure radical polymerization low-density polyethylene (B-1-1) shown in Table 2 were used to prepare an ethylene copolymer composition in a manner similar to that of Example 1.

[Film Formation]

From the ethylene copolymer composition obtained in the above, a film having a thickness of 30 μm was formed in a manner similar to that of Example 1. Melt properties of the ethylene copolymer composition and physical properties of the film formed from the composition are set forth in Table 3.

The film obtained above had a wide composition distribution and a large amount of sticky component, and hence the film was particularly low in the blocking resistance.

Further, as is clear from Comparative Example 1 and Example 1 wherein an ethylene/α-olefin copolymer containing the same comonomers as those of the copolymer in Comparative Example 1 and having MT and density almost equal to those of the copolymer in Comparative Example 1 was used, the film of Example 1 was very low in reduction of the film impact.

Comparative Example 2

From the ethylene/α-olefin copolymer (C-1) obtained in Comparative Example 1, a film having a thickness of 30 μm was formed in a manner similar to that of Example 1.

Melt properties of the ethylene/α-olefin copolymer (C-1) and physical properties of the film formed from the copolymer are set forth in Table 3.

Preparation Examples 2–4

The procedure of Preparation Example 1 was repeated except for varying the kinds of the comonomers and the amounts thereof to those set forth in Table 1, to obtain ethylene/α-olefin copolymers (A-1-2), (A-1-3) and (A-1-4)

Physical properties of the ethylene/α-olefin copolymers (A-1-2), (A-1-3) and (A-1-4) are set forth in Table 1.

Examples 2–4

The procedure for preparing the ethylene copolymer composition in Example 1 was repeated except for varying the ethylene/α-olefin copolymer to those set forth in Table 3, to prepare ethylene copolymer compositions. From the ethylene copolymer compositions thus prepared, films each having a thickness of 30 μm were formed in a manner similar to that of Example 1.

Melt properties of the ethylene copolymer compositions and physical properties of the films formed from the compositions are set forth in Table 3.

Reference Examples 2–4

From the ethylene/α-olefin copolymers (A-1-2), (A-1-3) and (A-1-4)-obtained in Preparation Examples 2 to 4, films each having a thickness of 30 μm were formed in a manner similar to that of Example 1.

Melt properties of the ethylene/α-olefin copolymers (A-1-2), (A-1-3) and (A-1-4) and physical properties of the films formed from the copolymers are set forth in Table 3.

Preparation Example 5

The procedure of copolymerization of ethylene with 1-hexene in Preparation Example 1 was repeated except for replacing bis(1,3-dimethylcyclopentadienyl)zirconium dichloride with ethylenebis(indenyl)zirconium dichloride and varying the comonomer amount to that set forth in Table 1, to prepare an ethylene/α-olefin copolymer (A-1-5).

Physical properties of the ethylene/α-olefin copolymer (A-1-5) are set forth in Table 1.

Example 5

The ethylene/α-olefin copolymer (A-1-5) obtained in Preparation Example 5 and a high-pressure radical polymerization low-density polyethylene (B-1-2) shown in Table 2 were used to prepare an ethylene copolymer composition in a manner similar to that of Example 1. From the ethylene copolymer composition thus prepared, a film having a thickness of 30 μm was formed in a manner similar to that of Example 1.

Melt properties of the ethylene copolymer composition and physical properties of the film formed from the composition are set forth in Table 3.

Reference Example 5

The procedure of film formation in Example 1 was repeated except for using the ethylene/α-olefin copolymer (A-1-5) obtained in Preparation Example 5, to form a film having a thickness of 30 μm.

Melt properties of the ethylene/α-olefin copolymer (A-1-5) and physical properties of the film formed from the copolymer are set forth in Table 3.

Example 6

The ethylene/α-olefin copolymer (A-1-1) obtained in Preparation Example 1 and a high-pressure radical polymerization low-density polyethylene (B-1-3) shown in Table 2 were used to prepare an ethylene copolymer composition in a manner similar to that of Example 1. From the ethylene copolymer composition thus prepared, a film having a thickness of 30 μm was formed in a manner similar to that of Example 1.

Melt properties of the ethylene copolymer composition and physical properties of the film formed from the composition are set forth in Table 3.

Comparative Example 3

The ethylene/α-olefin copolymer (A-1-1) obtained in Preparation Example 1 and a high-pressure radical polymerization low-density polyethylene (D-1) shown in Table 2 were used to prepare an ethylene copolymer composition in a manner similar to that of Example 1. From the ethylene copolymer composition thus prepared, a film having a thickness of 30 μm was formed in a manner similar to that of Example 1.

Melt properties of the ethylene copolymer composition and physical properties of the film formed from the composition are set forth in Table 3.

As is evident from Comparative Example 3 and Reference Example 1, even by blending the ethylene/α-olefin copolymer with such a high-pressure radical polymerization low-density polyethylene as used in Comparative Example 3, the resulting composition was not increased in the melt tension.

It has been confirmed from the examples, the comparative examples and the reference examples described above that when the ethylene/α-olefin copolymer is blended with a specific high-pressure radical polymerization low-density polyethylene, the resulting composition is improved in the moldability, and the film formed from the composition is improved in the optical characteristics. Further, the ethylene copolymer composition is hardly reduced in the film impact, as compared with the ethylene/α-olefin copolymer only, in spite that the composition contains a high-pressure radical polymerization low-density polyethylene having a low film impact. Moreover, it has been also confirmed that a film showing high blocking resistance can be obtained from the ethylene copolymer composition of the invention.

TABLE 1

| | Ethylene/α-olefin copolymer | | | | | | | | | | | | |
|---|---|---|---|---|---|---|---|---|---|---|---|---|---|
| Code No. | Comonomer | Amount of comonomer mol % | Density g/cm³ | MFR g/10 min | Tm °C. | Formula (1) | MT g | Formula (2) | FI s⁻¹ | Formula (3) | Decane-soluble portion weight % | Formula (4) | Unsaturated bond *1 |
| A-1-1 | 1-hexene | 3.0 | 0.920 | 2.0 | 112.2 | 118.0 | 1.8 | 1.2 | 290 | 150 | 0.47 | 1.57 | 0.091 |
| A-1-2 | 1-pentene | 2.6 | 0.920 | 2.1 | 111.9 | 118.0 | 1.7 | 1.2 | 270 | 158 | 0.08 | 1.57 | 0.093 |
| A-1-3 | 4-methyl-1-pentene | 2.3 | 0.921 | 2.0 | 112.0 | 118.4 | 1.9 | 1.2 | 280 | 150 | 0.25 | 1.43 | 0.022 |
| A-1-4 | 1-butene | 2.5 | 0.926 | 2.0 | 111.5 | 120.4 | 1.9 | 1.2 | 270 | 150 | 0.57 | 0.90 | 0.091 |
| A-1-5 | 1-hexene | 2.8 | 0.922 | 1.6 | 112.1 | 118.8 | 6.6 | 1.5 | 220 | 120 | 0.53 | 1.30 | 0.088 |
| C-1 | 1-hexene | 3.6 | 0.922 | 1.0 | 123.2 | 118.8 | 1.8 | 2.2 | 190 | 75 | 7.9 | 1.30 | 0.250 |

Remark:

Formula (1): $Tm < 400 \times d - 250$ wherein Tm means a melting point at the maximum peak of the DSC endothermic curve, and d means a density.

Formula (2): $MT > 2.2 \times MFR^{-0.84}$ wherein MT means a melt tension at 190° C., and MFR means a melt flow rate.

Formula (3): $FI > 75 \times MFR$ wherein FI means a flow index, and MFR means a melt flow rate.

Formula (4): $W < 80 \times \exp(-100(d - 0.88)) + 0.1$ [under the condition of MFR ≦ 10 g/10 min], wherein W means a weight of a decane-soluble portion at 23° C.

Formula (4): $W < 80 \times (MFR - 9)^{-0.26} \times \exp(-100(d - 0.88)) + 0.1$ [under the condition of MFR > 10 g/10 min], wherein W means a weight of a decane-soluble portion at 23° C.

*1: the number of unsaturated bond in the ethylene/α-olefin copolymer based on 1,000 carbon atoms.

A-1-1~A-1-5: Zr type catalyst, gas phase polymerization

C-1: Ti type catalyst, gas phase polymerization

TABLE 2

High-pressure radical polymerization low-density polyethylene

| Code No. | MFR (g/10 min.) | Mw/Mn | *1 | Density (g/cm³) | Haze % | Gloss % | Film impact kg · cm/cm |
|---|---|---|---|---|---|---|---|
| B-1-1 | 5.2 | 9.4 | 4.2 | 0.919 | 15.0 | 14 | 1,050 |
| B-1-2 | 0.50 | 4.4 | <0 | 0.924 | 7.4 | 51 | 1,750 |
| B-1-3 | 0.32 | 10.6 | <0 | 0.922 | — | — | — |
| D-1 | 66 | 8.9 | 12.4 | 0.915 | — | — | — |

Remark:
*1: value obtained by the formula 7.5 × log(MFR) − 1.2

TABLE 3

| | Component A Code No. | Component B Code No. | Mixing ratio A/B weight ratio | Melt property of ethylene copolymer composition | | | Physical property of film | | | | | |
|---|---|---|---|---|---|---|---|---|---|---|---|---|
| | | | | MFR g/10 min. | MT g | FI s⁻¹ | Haze % | Gloss % | Film impact kg · cm/cm | Impact retention rate *1 | Blocking force g/cm | Moldability *2 |
| Ex. 1 | A-1-1 | B-1-1 | 90/10 | 2.1 | 3.1 | 350 | 8.6 | 54 | 3,380 | 95 | 0.43 | AA |
| Ref. Ex. 1 | A-1-1 | | 100/0 | 2.0 | 1.8 | 290 | 9.5 | 49 | 3,540 | 100 | 0.21 | CC |
| Comp. Ex. 1 | C-1 | B-1-1 | 90/10 | 1.0 | 4.0 | 245 | 6.2 | 95 | 2,760 | 81 | 4.7 | AA |
| Comp. Ex. 2 | C-1 | | 100/0 | 1.0 | 1.8 | 190 | 11.5 | 44 | 3,400 | 100 | 4.0 | CC |
| Ex. 2 | A-1-2 | B-1-1 | 90/10 | 2.1 | 2.9 | 330 | 6.2 | 90 | 2,620 | 96 | 0.44 | BB |
| Ref. Ex. 2 | A-1-2 | | 100/0 | 2.1 | 1.7 | 270 | 7.4 | 68 | 2,730 | 100 | 0.27 | CC |
| Ex. 3 | A-1-3 | B-1-1 | 90/10 | 2.0 | 3.0 | 340 | 6.4 | 88 | 2,920 | 95 | 0.15 | AA |
| Ref. Ex. 3 | A-1-3 | | 100/0 | 2.0 | 1.9 | 280 | 7.9 | 62 | 3,070 | 100 | 0.13 | CC |
| Ex. 4 | A-1-4 | B-1-1 | 90/10 | 2.0 | 2.9 | 330 | 6.0 | 91 | 1,770 | 99 | 1.16 | BB |
| Ref. Ex. 4 | A-1-4 | | 100/0 | 2.0 | 1.9 | 270 | 6.8 | 68 | 1,790 | 100 | 0.78 | CC |
| Ex. 5 | A-1-5 | B-1-2 | 90/10 | 1.7 | 8.8 | 220 | 10.1 | 43 | 2,900 | 96 | 0.08 | AA |
| Ref. Ex. 5 | A-1-5 | | 100/0 | 1.6 | 6.9 | 220 | 12.0 | 36 | 3,010 | 100 | 0.06 | AA |
| Ex. 6 | A-1-1 | B-1-3 | 90/10 | 1.8 | 3.7 | 290 | 12.4 | 28 | 3,490 | 99 | 0.20 | AA |
| Ref. Ex. 1 | A-1-1 | | 100/0 | 2.0 | 1.8 | 290 | 9.5 | 49 | 3,540 | 100 | 0.21 | CC |
| Comp. Ex. 3 | A-1-1 | D-1 | 90/10 | 2.2 | 1.8 | 390 | 9.4 | 52 | 3,210 | 91 | 0.29 | CC |
| Ref. Ex. 1 | A-1-1 | | 100/0 | 2.0 | 1.8 | 290 | 9.5 | 49 | 3,540 | 100 | 0.21 | CC |

Remark:
Impact retention rate *1: film impact of a film formed from the ethylene copolymer composition based on the film impact of a film formed from the ethylene/α-olefin copolymer only being 100. As this value is larger, the impact retention becomes higher.
Moldability *2: AA: MT ≧ 3, BB: 3 > MT ≧ 2, CC: 2 > MT Preparation Example 6

Preparation of an Ethylene/α-olefin Copolymer
[Preparation of a Solid Catalyst]

7.9 kg of silica having been dried at 250° C. for 10 hours was suspended in 121 liters of toluene, and the resultant suspension was cooled to 0° C. Thereafter, to the suspension was dropwise added 41 liters of a toluene solution of methylaluminoxane (Al=1.47 mol/l) over 1 hour. During the addition, the temperature of the system was kept at 0° C. Successively, the reaction was carried out at 0° C. for 30 minutes. Then, the temperature of the system was elevated to 95° C. over 1.5 hours, and the reaction was carried out at the same temperature for 4 hours. Thereafter, the temperature of the system was lowered to 60° C., and the supernatant liquid was removed by decantation.

The solid component obtained above was washed twice with toluene, and then again suspended in 125 liters of toluene. To the reaction system was dropwise added 20 liters of a toluene solution of bis(1,3-dimethylcyclopentadienyl) zirconium dichloride (Zr=28.4 mmol/l) at 30° C. over 30 minutes, and the reaction was further carried out at 30° C. for 2 hours. Then, the supernatant liquid was removed, and the residue was washed twice with hexane to obtain a solid catalyst containing 4.6 mg of zirconium based on 1 g of the solid catalyst.

[Preparation of a Prepolymerized Catalyst]

To 160 liters of hexane containing 16 mol of triisobutylaluminum was added 4.3 kg of the solid catalyst obtained in the above, and the resultant mixture was subjected to prepolymerization with ethylene at 35° C. for 3.5 hours to obtain a prepolymerized catalyst in which polyethylene was present in an amount of 3 g based on 1 g of the solid catalyst. This ethylene polymer had an intrinsic viscosity [η] of 1.27 dl/g.

[Polymerization]

In a continuous fluidized bed gas phase reactor, ethylene was copolymerized with 1-hexene at a total pressure of 20 kg/cm²-G and a polymerization temperature of 80° C. To the reactor were continuously fed the prepolymerzied catalyst prepared in the above at a feed rate of 0.048 mmol/hour in terms of zirconium atom and triisobutylaluminum at a feed rate of 10 mmol/hour while continuously feeding ethylene, 1-hexene, hydrogen and nitrogen to maintain a constant gas composition in the reactor (gas composition: 1-hexene/ethylene=0.083, hydrogen/ethylene=0.0012, ethylene concentration=23%)

Thus, an ethylene/α-olefin copolymer (A-1-6) was obtained in an amount of 5.3 kg/hour. The copolymer had a density of 0.927 g/cm³ and a melt flow rate (MFR) of 1.0 g/10 min. The temperature at the maximum peak of the DSC endothermic curve (Tm) of the copolymer was 117.8° C. Further, the copolymer had a melt tension (MT) of 3.2 g at 190° C. and a flow index (FI) of 180 (l/sec). The amount of the decane-soluble portion in the copolymer was 0.22% by weight at 23° C. The number of unsaturated bond in the copolymer was 0.062 per 1,000 carbon atoms, and was 0.06 per one molecule of the polymer.

Physical properties of the ethylene/α-olefin copolymer (A-1-6) are set forth in Table 4.

Reference Example 6

[Film Formation]

The ethylene/α-olefin copolymer (A-1-6) obtained in Preparation Example 6 was subjected to inflation by the use of a single-screw extruder (20 mmφ·L/D=26) equipped with a die of 25 mmφ (lip width: 0.7 mm) and a single-slit air ring under the conditions of an air flow rate of 90 l/min., an extrusion rate of 9 g/min, a blow ratio of 1.8, a take-up rate of 2.4 m/min and-a processing temperature of 200° C., to form a film having a thickness of 30 μm.

Melt properties of the ethylene/c-olefin copolymer (A-1-6) and physical properties of the film formed from the copolymer are set forth in Table 6.

Example 7

[Preparation of a Composition]

The ethylene/α-olefin copolymer (A-1-6) obtained in Preparation Example 6 and a crystalline polyolefin (B-2-1) shown in Table 5 were dry blended in a weight ratio of 90/10 ((A-1-6)/(B-2-1)]. To the resultant blend were added 0.05 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat-resistant stabilizer and 0.05 part by weight of calcium stearate as a hydrochloric acid absorbent, each based on 100 parts by weight of the resin. Then, the resultant mixture was kneaded by a conical-tapered twin-screw extruder (produced by Haake Buchler Instrument Inc.) at a preset temperature of 180° C., to obtain an ethylene copolymer composition.

[Film Formation]

The ethylene copolymer composition obtained in the above was subjected to inflation in a manner similar to that of Reference Example 6, to prepare a film having a thickness of 30 μm.

Melt properties of the ethylene copolymer composition and physical properties of the film formed from the composition are set forth in Table 6.

As compared with Reference Example 6, the ethylene copolymer composition obtained above was not lowered in the melt tension and the flow index (FI) within the high-shear region, and the film formed from the composition was improved in the rigidity.

Example 8

[Preparation of a Composition]

The procedure for preparing the ethylene copolymer composition in Example 7 was repeated except for using the ethylene/α-olefin copolymer (A-1-6) obtained in Preparation Example 6 and a crystalline polyolefin (B-2-2) shown in Table 5 in a weight ratio of 90/10 [(A-1-6)/(B-2-2)], to prepare an ethylene copolymer composition.

[Film Formation]

From the ethylene copolymer composition obtained in the above, a film having a thickness of 30 μm was formed in a manner similar to that of Reference Example 6.

Melt properties of the ethylene copolymer composition and physical properties of the film formed from the composition are set forth in Table 6.

As compared with Reference Example 6, the ethylene copolymer composition obtained above was not lowered in the melt tension and the flow index (FI) within the high-shear region, and the film formed from the composition was improved in the rigidity.

Example 9

[Preparation of a Composition]

The procedure for preparing the ethylene copolymer composition in Example 7 was repeated except for using the ethylene/α-olefin copolymer (A-1-6) obtained in Preparation Example 6 and a crystalline polyolefin (B-2-3) shown in Table 5 in a weight ratio of 90/10 [(A-1-6)/(B-2-3)], to prepare an ethylene copolymer composition.

[Film Formation]

From the ethylene copolymer composition obtained in the above, a film having a thickness of 30 μm was formed in a manner similar to that of Reference Example 6.

Melt properties of the ethylene copolymer composition and physical properties of the film formed from the composition are set forth in Table 6.

As compared with Reference Example 6, the ethylene copolymer composition obtained above was increased in the flow index (FI) within the high-shear region, and the film formed from the composition was enhanced in the rigidity.

Example 10

[Preparation of a Composition]

The procedure for preparing the ethylene copolymer composition in Example 7 was repeated except for using the ethylene/α-olefin copolymer (A-1-6) obtained in Preparation Example 6 and a crystalline polyolefin (B-2-4) shown in Table 5 in a weight ratio of 90/10 [(A-1-6)/(B-2-4)], to prepare an ethylene copolymer composition.

[Film Formation]

From the ethylene copolymer composition obtained in the above, a film having a thickness of 30 μm was formed in a manner similar to that of Reference Example 6.

Melt properties of the ethylene copolymer composition and physical properties of the film formed from the composition are set forth in Table 6.

As compared with Reference Example 6, the ethylene copolymer composition obtained above was increased in the flow index (FI) within the high-shear region, and the film formed from the composition was enhanced in the rigidity.

Example 11

[Preparation of a Composition]

The procedure for preparing the ethylene copolymer composition in Example 7 was repeated except for using the ethylene/α-olefin copolymer (A-1-6) obtained in Preparation Example 6 and a crystalline polyolefin (B-2-5) shown in Table 5 in a weight ratio of 90/10 [(A-1-6)/(B-2-5)], to prepare an ethylene copolymer composition.

[Film Formation]

From the ethylene copolymer composition obtained in the above, a film having a thickness of 30 μm was formed in a manner similar to that of Reference Example 6.

Melt properties of the ethylene copolymer composition and physical properties of the film formed from the composition are set forth in Table 6.

As compared with Reference Example 6, the ethylene copolymer composition obtained above was increased in the flow index. (FI) within the high-shear region, and the film formed from the composition was enhanced in the rigidity.

TABLE 4

Ethylene/α-olefin copolymer

| Code No. | Comonomer | Amount of comonomer mol % | Density g/cm³ | MFR g/10 min | Tm °C. | Formula (1) | MT g | Formula (2) | FI s⁻¹ | Formula (3) | Decane-soluble portion weight % | Formula (4) | Unsaturated bond *1 |
|---|---|---|---|---|---|---|---|---|---|---|---|---|---|
| A-1-6 | 1-hexene | 1.9 | 0.927 | 1.0 | 117.8 | 120.8 | 3.2 | 2.2 | 180 | 75 | 0.22 | 0.83 | 0.062 |

Remark:
Formula (1): Tm < 400 × d − 250 wherein Tm means the maximum peak temperature of the DSC endothermic curve, and d means a density.
Formula (2): MT > 2.2 × MFR$^{-0.84}$ wherein MT means a melt tension at 190° C., and MFR means a melt flow rate.
Formula (3): FI > 75 × MFR wherein FI means a flow index, and MFR means a melt flow rate.
Formula (4): W < 80 × exp(−100(d − 0.88)) + 0.1 [under the condition of MFR ≦ 10 g/10 min], wherein W means a weight of a decane-soluble portion at 23° C.
Formula (4): W < 80 × (MFR − 9)$^{-0.26}$ × exp(−100(d − 0.88)) + 0.1 [under the condition of MFR > 10 g/10 min], wherein W means a weight of a decane-soluble portion at 23° C.
*1: the number of unsaturated bond in the ethylene/α-olefin copolymer based on 1,000 carbon atoms.
A-1-6: Zr type catalyst, gas phase polymerization

TABLE 5

| Code No. | Composition (mol %) | | | MFR (g/10 min) | Density (g/cm³) |
|---|---|---|---|---|---|
| | Ethylene | Propylene | Butene | | |
| B-2-1 | 100 | — | — | 5.0 | 0.968 |
| B-2-2 | 99.8 | — | 0.2 | 0.65 | 0.963 |
| B-2-3 | 3.4 | 95.0 | 1.6 | 6.8 | 0.910 |
| B-2-4 | — | 100 | — | 6.5 | 0.910 |
| B-2-5 | — | — | 100 | 2.0 | 0.908 |

Remark:
MFR measuring temperature
B-2-1, B-2-2: 190° C.
B-2-3~B-2-5: 230° C.

TABLE 6

| | Component A | Component B | Mixing ratio A/B | Melt property | | | Physical property of film | | | | |
|---|---|---|---|---|---|---|---|---|---|---|---|
| | | | | MFR | MT | FI | Haze | Tensile test (MD) | | Tensile test (TD) | |
| | Code No. | Code No. | weight ratio | g/10 min | g | s⁻¹ | % | YM kg/cm² | EL % | YM kg/cm² | EL % |
| Ref. Ex. 6 | A-1-6 | — | 100/0 | 1.0 | 3.2 | 180 | 10.0 | 4,100 | 570 | 4,400 | 620 |
| Ex. 7 | A-1-6 | B-2-1 | 90/10 | 1.2 | 3.1 | 210 | 10.0 | 4,800 | 600 | 5,900 | 650 |
| Ex. 8 | A-1-6 | B-2-2 | 90/10 | 1.0 | 3.4 | 220 | 12.7 | 4,600 | 600 | 5,600 | 700 |
| Ex. 9 | A-1-6 | B-2-3 | 90/10 | 1.1 | 3.2 | 370 | 9.9 | 5,300 | 610 | 5,600 | 650 |
| Ex. 10 | A-1-6 | B-2-4 | 90/10 | 1.1 | 3.2 | 240 | 10.3 | 5,900 | 600 | 6,300 | 650 |
| Ex. 11 | A-1-6 | B-2-5 | 90/10 | 1.1 | 3.2 | 310 | 13.6 | 4,200 | 560 | 4,900 | 630 |

Preparation Example 7

Preparation of an Ethylene/α-olefin Copolymer
[Preparation of a Solid Catalyst]

7.9 kg of silica having been dried at 250° C. for 10 hours was suspended in 121 liters of toluene, and the resultant suspension was cooled to 0° C. Thereafter, to the suspension was dropwise added 41 liters of a toluene solution of methylaluminoxane (Al=1.47 mol/l) over 1 hour. During the addition, the temperature of the system was kept at 0° C. Successively, the reaction was carried out at 0° C. for 30 minutes. Then, the temperature of the system was elevated to 95° C. over 1.5 hours, and the reaction was carried out at the same temperature for 4 hours. Thereafter, the temperature or the system was lowered to: 60° C., and the supernatant liquid was removed by decantation.

The solid component obtained above was washed twice with toluene, and then again suspended in 125 liters of toluene. To the reaction system was dropwise added 20 liters of a toluene solution of bis(1,3-dimethylcyclopentadienyl) zirconium dichloride (Zr=28.4 mmol/l) at 30° C. over 30 minutes, and the reaction was further carried out at 30° C. for 2 hours. Then, the supernatant liquid was removed, and the residue was washed twice with hexane to obtain a solid catalyst containing 4.6 mg of zirconium based on 1 g of the solid catalyst.

[Preparation of a Prepolymerized Catalyst]

To 160 liters of hexane containing 16 mol of triisobutylaluminum was added 4.3 kg of the solid catalyst obtained in the above, and the resultant mixture was subjected to prepolymerization with ethylene at 35° C. for 3.5 hours to obtain a prepolymerized catalyst in which polyethylene was present in an amount of 3 g based on 1 g of the solid catalyst. The ethylene polymer had an intrinsic viscosity [η] of 1.27 dl/g.

[Polymerization]

In a continuous fluidized bed gas phase reactor, ethylene was copolymerized with 1-hexene at a total pressure of 20 kg/cm²-G and a polymerization temperature of 80° C. To the reactor were continuously fed the prepolymerzied catalyst prepared in the above at a feed rate of 0.048 mmol/hour in terms of zirconium atom and triisobutylaluminum at a feed rate of 10 mmol/hour while continuously feeding ethylene, 1-hexene, hydrogen and nitrogen to maintain a constant gas composition in the polymerizer (gas composition: 1-hexene/ethylene=0.083, hydrogen/ethylene=0.0012, ethylene concentration=23%)

Thus, an ethylene/α-olefin copolymer (A-1-7) was obtained in an amount of 5.3 kg/hour. The copolymer had a density of 0.927 g/cm³ and a melt flow rate (MFR) of 1.0 g/10 min. The number of unsaturated bond in the copolymer was 0.062 per 1,000 carbon atoms, and was 0.06 per one molecule of the polymer. The temperature at the maximum peak of the DSC endothermic curve (Tm) of the copolymer was 117.8° C. The amount of the decane-soluble portion in the copolymer was 0.22% by weight at 23° C.

Physical properties of the ethylene/α-olefin copolymer (A-1-7) are set forth in Table 7.

Reference Example 7

[Film formation]

The ethylene/α-olefin copolymer (A-1-7) obtained in Preparation Example 7 was subjected to inflation by the use of a single-screw extruder (20 mmφ·L/D=26) equipped with a die of 25 mmφ (lip width: 0.7 mm) and a single-slit air ring under the conditions of an air flow rate of 90 l/min, an extrusion rate of 9 g/min, a blow ratio of 1.8, a take-up rate of 2.4 m/min and a processing temperature of 200° C., to form a film having a thickness of 30 μm.

Melt properties of the ethylene/α-olefin copolymer (A-1-7) and physical properties of the film formed from the copolymer are set forth in Table 9.

Example 12

[Preparation of a Composition]

The ethylene/α-olefin copolymer (A-1-7) obtained in Preparation Example 7 and an olefin type elastomer (B-3-1) (density: 0.88 g/cm³) shown in Table 8 were dry blended in a weight ratio of 90/10 [(A-1-7)/(B-3-1)). To the resultant blend were added 0.05% by weight of tri(2,4-di-t-butylphenyl)phosphate as a secondary antioxidant, 0.1% by weight of n-octadecyl-3-(4'-hydroxy-3',5'-di-t-butylphenyl)propionate as a heat-resistant stabilizer and 0.05% by weight of calcium stearate as a hydrochloric acid absorbent, each based on 100 parts by weight of the resin. Then, the resultant mixture was kneaded by a conical-tapered twin-screw extruder (produced by Haake Buchier Instrument Inc.) at a preset temperature of 180° C., to obtain an ethylene copolymer composition.

[Film Formation]

The ethylene copolymer composition obtained in the above was subjected to inflation in a manner similar to that of Reference Example 7, to prepare a film having a thickness of 30 μm.

Melt properties of the ethylene copolymer composition and physical properties of the film formed from the composition are set forth in Table 9.

As compared with Reference Example 7, the inflation film obtained above was improved in the film impact without deterioration of the transparency and the moldability (MT, FI).

Example 13

[Preparation of a Composition]

The procedure for preparing the ethylene copolymer composition in Example 12 was repeated except for using the ethylene/α-olefin copolymer (A-1-7) obtained in Preparation Example 7 and an olefin type elastomer (B-3-2) (density: 0.87 g/cm³) shown in Table 8 in a weight ratio of 90/10 [(A-1-7)/(B-3-2)], to prepare an ethylene copolymer composition.

[Film Formation]

From the ethylene copolymer composition prepared in the above, a film having a thickness of 30 μm was formed in a manner similar to that of Reference Example 7.

Melt properties of the ethylene copolymer composition and physical properties of the film formed from the composition are set forth in Table 9.

As compared with Reference Example 7, the inflation film obtained above was improved in the film impact without deterioration of the transparency and the moldability (MT, FI).

Example 14

[Preparation of a Composition]

The procedure for preparing the ethylene copolymer composition in Example 12 was repeated except for using the ethylene/α-olefin copolymer (A-1-7) obtained in Preparation Example 7 and an olefin type elastomer (B-3-3) (density: 0.87 g/cm³) shown in Table 8 in a weight ratio of 90/10 [(A-1-7)/(B-3-3)], to prepare an ethylene copolymer composition.

[Film Formation]

From the ethylene copolymer composition obtained in the above, a film having a thickness of 30 μm was formed in a manner similar to that of Reference Example 7.

Melt properties of the ethylene copolymer composition and physical properties of the film formed from the composition are set forth in Table 9.

As compared with Reference Example 7, the inflation film obtained above was improved in the film impact without deterioration of the transparency and the moldability (MT, FI).

TABLE 7

| | | Ethylene/α-olefin copolymer | | | | | | | | | | |
|---|---|---|---|---|---|---|---|---|---|---|---|---|
| Code No. | Comonomer | Amount of comonomer mol % | Density g/cm³ | MFR g/10 min | Tm ° C. | Formula (1) | MT g | Formula (2) | FI s⁻¹ | Formula (3) | Decane-soluble portion weight % | Formula (4) | Unsaturated bond *1 |
| A-1-7 | 1-hexene | 1.9 | 0.927 | 1.0 | 117.8 | 120.8 | 3.2 | 2.2 | 180 | 75 | 0.22 | 0.83 | 0.062 |

Remark:

Formula (1): Tm < 400 × d − 250 wherein Tm means the maximum peak temperature of the DSC endothermic curve, and d means a density.

Formula (2): MT > 2.2 × MFR$^{-0.84}$ wherein MT means a melt tension at 190° C., and MFR means a melt flow rate.

Formula (3): FI > 75 × MFR wherein FI means a flow index, and MFR means a melt flow rate.

Formula (4): W < 80 × exp(−100(d − 0.88)) + 0.1 [under the condition of MFR ≦ 10 g/10 min], wherein W means a weight of a decane-soluble portion at 23° C.

Formula (4): W < 80 × (MFR − 9)$^{-0.26}$ × exp(−100(d − 0.88)) + 0.1 [under the condition of MFR > 10 g/10 min], wherein W means a weight of a decane-soluble portion at 23° C.

*1: the number of unsaturated bond in the ethylene/α-olefin copolymer based on 1,000 carbon atoms.

A-1-7: Zr type catalyst, gas phase polymerization

TABLE 8

| Code No. | Composition (mol %) | | | | MFR (g/10 min) | Density (g/cm³) |
|---|---|---|---|---|---|---|
| | Ethylene | Propylene | Butene | ENB | | |
| B-3-1 | 89 | — | 11 | — | 3.6 | 0.88 |
| B-3-2 | 80 | 20 | — | — | 1.0 | 0.87 |
| B-3-3 | 74 | 24 | — | 2 | 0.2 | 0.87 |

Remark:
ENB: ethylidene norbornene

TABLE 9

| | Component A Code No. | Component B Code No. | Mixing ratio A/B weight ratio | Melt property | | | Physical property of film | |
|---|---|---|---|---|---|---|---|---|
| | | | | MFR g/10 min | MT g | FI s⁻¹ | Haze % | Film impact kg · cm/cm |
| Ref. Ex. 7 | A-1-7 | — | 100/0 | 1.0 | 3.2 | 180 | 10.0 | 2,210 |
| Ex. 12 | A-1-7 | B-3-1 | 90/10 | 1.2 | 3.3 | 210 | 9.5 | 2,620 |
| Ex. 13 | A-1-7 | B-3-2 | 90/10 | 1.0 | 3.6 | 180 | 9.0 | 2,910 |
| Ex. 14 | A-1-7 | B-3-3 | 90/10 | 0.8 | 4.3 | 150 | 9.9 | 2,910 |

Preparation Example 8

Preparation of an Ethylene/α-olefin Copolymer
[Preparation of a Solid Catalyst]

7.9 kg of silica having been dried at 250° C. for 10 hours was suspended in 121 liters of toluene, and the resultant suspension was cooled to 0° C. Thereafter, to the suspension was dropwise added 41 liters of a toluene solution of methylaluminoxane (Al=1.47 mol/l) over 1 hour. During the addition, the temperature of the system was kept at 0° C. Successively, the reaction was carried out at 0° C. for 30 minutes. Then, the temperature of the system was elevated to 95° C. over 1.5 hours, and the reaction was carried out at the same temperature for 4 hours. Thereafter, the temperature of the system was lowered to 60° C., and the supernatant liquid was removed by decantation. The solid component obtained above was washed twice with toluene, and then again suspended in 125 liters of toluene. To the reaction system was dropwise added 20 liters of a toluene solution of bis(1,3-dimethylcyclopentadienyl)zirconium dichloride (Zr=28.4 mmol/l) at 30° C. over 30 minutes, and the reaction was further carried out at 30° C. for 2 hours. Then, the supernatant liquid was removed, and the residue was washed twice with hexane to obtain a solid catalyst containing 4.6 mg of zirconium based on 1 g of the solid catalyst.
[Preparation of a Prepolymerized Catalyst]

To 160 liters of hexane containing 16 mol of triisobutylaluminum was added 4.3 kg of the solid catalyst obtained in the above, and the resultant mixture was subjected to prepolymerization with ethylene at 35° C. for 3.5 hours to obtain a prepolymerized catalyst in which polyethylene was present in an amount of 3 g based on 1 g of the solid catalyst. The ethylene polymer had an intrinsic viscosity [η] of 1.27 dl/g.
[Polymerization]

In a continuous fluidized bed gas phase reactor, ethylene was copolymerized with 1-hexene at a total pressure of 18 kg/cm²-G and a polymerization temperature of 75° C. To the reactor were continuously fed the prepolymerzied catalyst prepared in the above at a feed rate of 0.05 mmol/hour in terms of zirconium atom and triisobutylaluminum at a feed rate of 10 mmol/hour while continuously feeding ethylene, 1-hexene, hydrogen and nitrogen to maintain a constant gas composition in the reactor (gas composition: 1-hexene/ethylene=0.041, hydrogen/ethylene=0.0011, ethylene concentration=10%)

Thus, an ethylene/α-olefin copolymer (A-2-1) was obtained in an amount of 6.0 kg/hour. The copolymer had a density of 0.906 g/cm³ and a melt flow rate (MFR) of 0.32 g/10 min. The temperature at the maximum peak of the DSC endothermic curve (Tm) of the copolymer was 92.5° C. Further, the copolymer had a melt tension (MT) of 6.2 g at 190° C. and a flow index (FI) of 89 (l/sec). The amount of the decane-soluble portion in the copolymer was 0.52% by weight at room temperature. The number of unsaturated bond in the copolymer was 0.090 per 1,000 carbon atoms, and was 0.90 per one molecule of the polymer.

Physical properties of the ethylene/α-olefin copolymer (A-2-1) are set forth in Table 10.

Example 15
[Preparation of an Ethylene/α-olefin Copolymer Composition]

The ethylene/α-olefin copolymer (A-2-1) (density: 0.906 g/cm³) obtained in Preparation Example 8 and an ethylene/α-olefin copolymer (A-3-1) (density: 0.949 g/cm³) prepared in the same manner as described in Preparation Example 8 except for adjusting the comonomer amount to that set forth in Table 10 were melt kneaded in a weight ratio of 57/43 [(A-2-1)/(A-3-1)], to prepare an ethylene/α-olefin copolymer composition (L-1-1).

Physical properties of the ethylene/α-olefin copolymer (A-3-1) are set forth in Table 10, and physical properties of the ethylene/α-olefin copolymer composition (L-1-1) are set forth in Table 11.
[Preparation of an Ethylene Copolymer Composition]

The ethylene/α-olefin copolymer composition (L-1-1) and a high-pressure radical polymerization low-density polyethylene (B-1-4) shown in Table 12 were dry blended in a mixing ratio of 90/10 [(L-1-1)/(B-1-4)]. To the resultant blend were added 0.05 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat-resistant stabilizer and 0.05 part by weight of calcium stearate as a hydrochloric acid absorbent, each based on 100 parts by weight of the resin. Then, the resultant mixture was kneaded by a conical-tapered twin-screw extruder (produced by Haake Buchler Instrument Inc.) at a preset temperature of 180° C., to obtain an ethylene copolymer composition.
[Film Formation]

The ethylene copolymer composition obtained in the above was subjected to inflation by the use of a single-screw extruder (20 mmφ·L/D=26) equipped with a die of 25 mmφ

(lip width: 0.7 mm) and a single-slit air ring under the conditions of an air flow rate of 90 l/min, an extrusion rate of 9 g/min, a blow ratio of 1.8, a take-up rate of 2.4 m/min and a processing temperature of 200° C., to form a film having a thickness of 30 μm.

Melt properties of the ethylene copolymer composition and physical properties of the film formed from the composition are set forth in Table 13.

Reference Example 8
[Film Formation]

The procedure of film formation in Example 15 was repeated except for using the ethylene/α-olefin copolymer composition (L-1-1) prepared in Example 15, to form a film having a thickness of 30 μm.

Melt properties of the ethylene/α-olefin copolymer composition (L-1-1) and physical properties of the film formed from the composition are set forth in Table 13.

It was confirmed from Example 15 and Reference Example 8 that the ethylene/x-olefin copolymer composition was increased in the melt tension by blending it with a high-pressure radical polymerization low-density polyethylene, and the film formed from the composition containing the polyethylene was enhanced in the transparency.

Example 16
[Preparation of an Ethylene/α-olefin Copolymer Composition]

An ethylene/α-olefin copolymer (A-2-2) (density: 0.916 g/cm$^3$) and an ethylene/α-olefin copolymer (A-3-2) (density: 0.931 g/cm$^3$), each of said copolymers having been prepared in the same manner as described in Preparation Example 8 except for adjusting the comonomer amount to that set forth in Table 10, were melt kneaded in a weight ratio of 70/30 [(A-2-2)/(A-3-2)], to obtain an ethylene/α-olefin copolymer composition (L-1-2).

Physical properties of the ethylene/α-olefin copolymer (A-3-2) are set forth in Table 10, and physical properties of the ethylene/α-olefin copolymer composition (L-1-2) are set forth in Table 11.

[Preparation of an Ethylene Copolymer Composition]

The procedure for preparing the ethylene copolymer composition in Example 15 was repeated except for using the ethylene/α-olefin copolymer composition (L-1-2), to prepare an ethylene copolymer composition.

[Film Formation]

From the ethylene copolymer composition obtained in the above, a film having a thickness of 30 μm was formed in a manner similar to that of Example 15.

Melt properties of the ethylene copolymer composition and physical properties of the film formed from the composition are set forth in Table 13.

Reference Example 9
[Film Formation]

From the ethylene/α-olefin copolymer composition (L-1-2) prepared in Example 16, a film having a thickness of 30 μm was formed in a manner similar to that of Example 15.

Melt properties of the ethylene/α-olefin copolymer composition (L-1-2) and physical properties of the film formed from the composition are set forth in Table 13.

It was confirmed from Example 16 and Reference Example 9 that the ethylene/α-olefin copolymer composition was increased in the melt tension by blending it with a high-pressure radical polymerization low-density polyethylene, and the film formed from the composition containing the polyethylene was enhanced in the transparency.

Example 17
[Preparation of an Ethylene/α-olefin Copolymer Composition]

An ethylene/α-olefin copolymer (A-2-3) (density: 0.907 g/cm$^3$) and an ethylene/α-olefin copolymer (A-3-3) (density: 0.943 g/cm$^3$), each of said copolymers having been prepared in the same manner as described in Preparation Example 8 except for adjusting the comonomer amount to that set forth in Table 10, were melt kneaded in a weight ratio of 60/40 [(A-2-3)/(A-3-3)], to obtain an ethylene/α-olefin copolymer composition (L-1-3).

Physical properties of the ethylene-/α-olefin copolymers (A-2-3) and (A-3-3) are set forth in Table 10, and physical properties of the ethylene/α-olefin copolymer composition (L-1-3) are set forth in Table 11.

[Preparation of an Ethylene Copolymer Composition]

The procedure for preparing the ethylene copolymer composition in Example 15 was repeated except for using the ethylene/α-olefin copolymer composition (L-1-3), to prepare an ethylene copolymer composition.

[Film Formation]

From the ethylene copolymer composition obtained in the above, a film having a thickness of 30 μm was formed in a manner similar to that of Example 15.

Melt properties of the ethylene copolymer composition and physical properties of the film formed from the composition are set forth in Table 13.

Reference Example 10
[Film Formation]

From the ethylene/α-olefin copolymer composition (L-1-3) obtained in Example 17, a film having a thickness of 30 μm was formed in a manner similar to that of Example 15.

Melt properties of the ethylene/cc-olefin copolymer composition (L-1-3) and physical properties of the film formed from the composition are set forth in Table 13.

It was confirmed from Example 17 and Reference Example 10 that the ethylene/α-olefin copolymer composition was enhanced in the transparency and the melt tension by blending it with a high-pressure radical polymerization low-density polyethylene.

Comparative Example 4
[Preparation of an Ethylene/α-olefin Copolymer Composition]

An ethylene/α-olefin copolymer (C-2) (density: 0.915 g/cm$^3$) and an ethylene/α-olefin copolymer (C-3) (density: 0.933 g/cm$^3$), each of said copolymers having been prepared in the same manner as described in Preparation Example 8 except for replacing the zirconium catalyst system with a titanium type catalyst system described in Japanese Patent Publication No. 63(1988)-54289, and adjusting the comonomer amount to that set forth in Table 10, were melt kneaded in a weight ratio of 60/40 [(C-2)/(C-3)], to obtain an ethylene/α-olefin copolymer composition (L-1-5).

Physical properties of the ethylene/α-olefin copolymers (C-2) and (C-3) -are set forth in Table 10, and physical properties of the ethylene/α-olefin copolymer composition (L-1-5) are set forth in Table 11.

[Preparation of an Ethylene Copolymer Composition]

The procedure for preparing the ethylene copolymer composition in Example 15 was repeated except for using the ethylene/α-olefin copolymer composition (L-1-5), to prepare an ethylene copolymer composition.

[Film Formation]

From the ethylene copolymer composition obtained in the above, a film having a thickness of 30 μm was formed in a manner similar to that of Example 15.

Melt properties of the ethylene copolymer composition and physical properties of the film formed from the composition are set forth in Table 13.

The ethylene copolymer composition obtained above was lower in the melt tension than the ethylene/α-olefin copolymer composition (L-1-3) of Example 17 having almost the same MFR and density, and the film obtained above was inferior to the film formed from the ethylene/α-olefin copolymer composition (L-1-3) of Example 17 in the film impact and the blocking resistance.

Comparative Example 5

[Preparation of an Ethylene/α-olefin Copolymer Composition]

The procedure for preparing the ethylene copolymer composition in Example 15 was repeated except for using an ethylene/α-olefin copolymer (C-4) prepared in the same manner as described in Preparation Example 8 except for adjusting the comonomer amount to that set forth in Table 10, to prepare an ethylene copolymer composition.

Physical properties of the ethylene/α-olefin copolymer (C-4) are set forth in Table 10.

[Film Formation]

From the ethylene copolymer composition obtained in the above, a film having a thickness of 30 μm was formed in a manner similar to that of Example 15.

Melt properties of the ethylene copolymer composition and physical properties of the film formed from the composition are set forth in Table 13.

The ethylene copolymer composition obtained above was lower in the flow index within the high-shear region as compared with the ethylene/α-olefin copolymer composition (L-1-1) of Example 15 having almost the same MFR and density, and the film obtained above was inferior to the film formed from the ethylene/α-olefin copolymer composition (L-1-1) of Example 15 in the film impact and the blocking resistance.

Example 18

[Preparation of an Ethylene/α-olefin Copolymer Composition]

An ethylene/α-olefin copolymer (A-2-4) (density: 0.916 g/cm³) prepared in the same manner as described in Preparation Example 8 except for adjusting the comonomer amount to that set forth in Table 10 and an ethylene/α-olefin copolymer (A-3-4) (density: 0.924 g/cm³) prepared in the same manner as described in Preparation Example 8 except for replacing bis(1,3-dimethylcyclopentadienyl)zirconium dichloride with bis(1-methyl-3-n-butylcyclopentadienyl)zirconium dichloride and adjusting the comonomer amount to that set forth in Table 10 were melt kneaded in a weight ratio of 20/80 [(A-2-4)/(A-3-4)], to obtain an ethylene/α-olefin copolymer composition (L-1-4).

Physical properties of the ethylene/α-olefin copolymers (A-2-4) and (A-3-4) are set forth in Table 10, and physical properties of the ethylene/α-olefin copolymer composition (L-1-4) are set forth in Table 11.

[Preparation of an Ethylene Copolymer Composition]

The procedure for preparing the ethylene copolymer composition in Example 15 was repeated except for using the ethylene/α-olefin copolymer composition (L-1-4), to prepare an ethylene copolymer composition.

[Film Formation]

From the ethylene copolymer composition obtained in the above, a film having a thickness of 30 μm was formed in a manner similar to that of Example 15.

Melt properties of the ethylene copolymer composition and physical properties of the film formed from the composition are set forth in Table 13.

Reference Example 11

[Film Formation]

From the ethylene/α-olefin copolymer composition (L-1-4) prepared in Example 18, a film having a thickness of 30 μm was formed in a manner similar to that of Example 15.

Melt properties of the ethylene/α-olefin copolymer composition (L-1-4) and physical properties of the film formed from the composition are set forth in Table 13.

It was confirmed from Example 18 and Reference Example 11 that the ethylene/α-olefin copolymer composition was increased in the melt tension by blending it with a high-pressure radical polymerization low-density polyethylene.

TABLE 10

| Code No. | Comonomer | Amount of comonomer | Density g/cm3 | MFR g/10 min | [η] g/dl | Tm °C. | Formula (1) | MT g | Formula (2) | FI s⁻¹ | Formula (3) | Decane-soluble portion weight % | Formula (4) | Unsaturated bond *1 |
|---|---|---|---|---|---|---|---|---|---|---|---|---|---|---|
| A-2-1 | 1-hexene | 4.9 | 0.906 | 0.32 | 1.91 | 92.5 | 112.4 | 6.2 | 5.7 | 89 | 24 | 0.52 | 6.04 | 0.09 |
| A-2-2 | 1-hexene | 3.3 | 0.916 | 0.24 | 2.00 | 107.0 | 116.4 | 7.7 | 7.3 | 63 | 18 | 0.15 | 2.29 | 0.16 |
| A-2-3 | 1-hexene | 4.8 | 0.907 | 0.35 | 1.88 | 92.8 | 112.8 | 5.9 | 5.3 | 92 | 27 | 0.55 | 5.48 | 0.12 |
| A-2-4 | 1-hexene | 3.3 | 0.916 | 0.24 | 2.00 | 107.0 | 116.4 | 7.7 | 7.3 | 63 | 18 | 0.15 | 2.29 | 0.16 |
| C-2 | 1-hexene | 6.1 | 0.915 | 0.65 | 2.00 | 120.3 | 116.0 | 2.8 | 3.2 | 140 | 49 | 13.50 | 2.50 | 0.23 |
| A-3-1 | 1-hexene | 0.9 | 0.949 | 10.7 | 1.11 | 120.1 | 129.6 | 0.1> | — | 1390 | — | 0.08 | 0.19 | 0.06 |
| A-3-2 | 1-hexene | 1.7 | 0.931 | 123 | 0.72 | 116.8 | 122.4 | 0.1> | — | 11700 | — | 1.25 | 1.77 | 0.19 |

TABLE 10-continued

| Code No. | Comonomer | Amount of comonomer | Density g/cm3 | MFR g/10 min | [η] g/dl | Tm °C. | Formula (1) | MT g | Formula (2) | FI s⁻¹ | Formula (3) | Decane-soluble portion weight % | Formula (4) | Unsaturated bond *1 |
|---|---|---|---|---|---|---|---|---|---|---|---|---|---|---|
| A-3-3 | 1-hexene | 1.0 | 0.943 | 165 | 0.58 | 118.6 | 127.2 | 0.1> | — | 12400 | — | 0.45 | 0.65 | 0.08 |
| A-3-4 | 1-hexene | 2.8 | 0.924 | 2.1 | 0.59 | 115.0 | 119.6 | 0.9 | — | 130 | — | 0.08 | 1.08 | 0.10 |
| C-3 | 1-hexene | 2.8 | 0.933 | 19.2 | 1.04 | 128.0 | 123.2 | 0.1> | — | 1440 | — | 2.20 | 0.83 | 0.28 |
| C-4 | 1-hexene | 1.9 | 0.927 | 1.0 | 1.60 | 117.8 | 120.8 | 3.2 | 2.2 | 180 | 75 | 0.22 | 0.83 | 0.06 |

Remark:
Formula (1): Tm < 400 × d − 250 wherein Tm means the maximum peak temperature of the DSC endothermic curve, and d means a density.
Formula (2): MT > 2.2 × MFR$^{-0.84}$ wherein MT means a melt tension at 190° C., and MFR means a melt flow rate.
Formula (3): FI > 75 × MFR wherein FI means a flow index, and MFR means a melt flow rate.
Formula (4): W < 80 × exp(−100(d − 0.88)) + 0.1 [under the condition of MFR ≦ 10 g/10 min], wherein W means a weight of a decane-soluble portion at room temperature.
Formula (4): W < 80 × (MFR − 9)$^{-0.26}$ × exp(−100(d − 0.88)) + 0.1 [under the condition of MFR > 10 g/10 min], wherein W means a weight of a decane-soluble portion at room temperature.
*1: the number of unsaturated bond in the ethylene/α-olefin copolymer based on 1,000 carbon atoms.
A-2-1~A-2-4, A-3-1~A-3-4, C-4: Zr type catalyst, gas phase polymerization
C-2, C-3: Ti type catalyst, gas phase polymerization

TABLE 11

| | Component A Code No. | Component B Code No. | Mixing ratio A/B (weight ratio) | Density d g/cm³ | Melt property MFR g/10 min | MT g | FI s⁻¹ |
|---|---|---|---|---|---|---|---|
| L-1-1 | A-2-1 | A-3-1 | 57/43 | 0.926 | 1.1 | 3.3 | 290 |
| L-1-2 | A-2-2 | A-3-2 | 70/30 | 0.922 | 0.9 | 3.9 | 260 |
| L-1-3 | A-2-3 | A-3-3 | 60/40 | 0.921 | 2.0 | 2.4 | 520 |
| L-1-4 | A-2-4 | A-3-4 | 20/80 | 0.922 | 1.4 | 2.7 | 120 |
| L-1-5 | C-2 | C-3 | 60/40 | 0.922 | 2.0 | 1.0 | 360 |

TABLE 12

High-pressure radical polymerization low-density polyethylene

| Code No. | MFR (g/10 min) | Mw/Mn | *1 | Density (g/cm3) | Physical property of film Haze % | Gloss % | Film impact kg · cm/cm |
|---|---|---|---|---|---|---|---|
| B-1-4 | 0.50 | 4.4 | <0 | 0.924 | 7.4 | 51 | 1,750 |

Remark:
*1: value obtained by the formula 7.5 × log(MFR) − 1.2

Preparation Example 9

Preparation of an Ethylene/α-olefin Copolymer
[Preparation of a Catalyst]

6.3 kg of silica having been dried at 250° C. for 10 hours was suspended in 100 liters of toluene, and the resultant suspension was cooled to 0° C. Thereafter, to the suspension was dropwise added 41 liters of a toluene solution of methylaluminoxane (Al=0.96 mol/l) over 1 hour. During the addition, the temperature of the system was kept at 0° C. Successively, the reaction was carried out at 0° C. for 60 minutes. Then, the temperature of the system was elevated

TABLE 13

| | Component A I Code No. | Component B II Code No. | Mixing ratio A I/B II (weight ratio) | Melt property of ethylene copolymer composition MFR g/10 min | MT g | FI s⁻¹ | Physical property of film Haze % | Film impact kg · cm/cm | Blocking force g/cm | Moldability* |
|---|---|---|---|---|---|---|---|---|---|---|
| Ex. 15 | L-1-1 | B-1-4 | 90/10 | 1.0 | 4.6 | 290 | 8.8 | 3,320 | 0 | AA |
| Ref. Ex. 8 | L-1-1 | — | 100/0 | 1.1 | 3.3 | 290 | 10.5 | 5,250 | 0 | AA |
| Ex. 16 | L-1-2 | B-1-4 | 90/10 | 0.9 | 5.1 | 300 | 9.0 | 4,200 | 0 | AA |
| Ref. Ex. 9 | L-1-2 | — | 100/0 | 0.9 | 3.9 | 300 | 10.2 | 7,030 | 0 | AA |
| Ex. 17 | L-1-3 | B-1-4 | 90/10 | 1.8 | 3.2 | 520 | 8.9 | 3,450 | 0 | AA |
| Ref. Ex. 10 | L-1-3 | — | 100/0 | 2.0 | 1.8 | 520 | 10.5 | 5,770 | 0 | BB |
| Ex. 18 | L-1-4 | B-1-4 | 90/10 | 1.3 | 3.5 | 120 | 8.2 | 2,450 | 0.17 | AA |
| Ref. Ex. 11 | L-1-4 | — | 100/0 | 1.4 | 2.7 | 120 | 7.1 | 2,600 | 0.17 | BB |
| Comp. Ex. 4 | L-1-5 | B-1-4 | 90/10 | 1.8 | 2.3 | 370 | 11.5 | 2,820 | 6.7 | BB |
| Comp. Ex. 5 | C-4 | B-1-4 | 90/10 | 0.9 | 4.6 | 190 | 9.3 | 2,200 | 0.13 | AA |

Remark:
Moldability*: AA: MT ≧ 3, BB: 2 ≦ MT < 3, CC: MT < 2 to 95° C. over 1.5 hours, and the reaction was carried out at the same temperature for 4 hours. Thereafter, the temperature of the system was lowered to 60° C., and the supernatant liquid was removed by decantation.

The solid component obtained above was washed twice with toluene, and then again suspended in 125 liters of toluene. To the reaction system was dropwise added 15 liters of a toluene solution of bis(n-butylcyclopentadienyl) zirconium dichloride (Zr=42.7 mmol/l) at 30° C. over 30 minutes, and the reaction was further carried out at 30° C. for 2 hours. Then, the supernatant liquid was removed, and the residue was washed twice with hexane to obtain a solid catalyst containing 6.2 mg of zirconium based on 1 g of the solid catalyst.

[Preparation of a Prepolymerized Catalyst]

To 300 liters of hexane containing 14 mol of triisobutylaluminum was added 8.5 kg of the solid catalyst obtained in the above, and the resultant mixture was subjected to prepolymerization with ethylene at 35° C. for 7 hours to obtain a prepolymerized catalyst containing polyethylene in an amount of 10 g based on 1 g of the solid catalyst.

[Polymerization]

In a continuous fluidized bed gas phase reactor, ethylene was copolymerized with 1-hexene at a total pressure of 18 kg/cm$^2$–G and a polymerization temperature of 80° C. To the reactor were continuously fed the prepolymerzied catalyst prepared in the above at a feed rate of 0.15 mmol/hour in terms of zirconium atom and triisobutylaluminum at a feed rate of 10 mmol/hour while continuously feeding ethylene, 1-hexene, hydrogen and nitrogen to maintain a constant gas composition in the reactor (gas composition: 1-hexene/ethylene=0.020, hydrogen/ethylene=6.6×10$^{-4}$, ethylene concentration=16%).

Thus, an ethylene/α-olefin copolymer (A-4-1) was obtained in an amount of 5.0 kg/hour. The copolymer had a density of 0.923 g/cm$^3$ and a melt flow rate (MFR) of 1.1 g/10 min. The temperature at the maximum peak of the DSC endothermic curve (Tm) of the copolymer was 116.8° C. Further, the copolymer had a melt tension (MT) of 1.5 g. The amount of the decane-soluble portion in the copolymer was 0.02% by weight at 23° C. The number of unsaturated bond in the copolymer was 0.09 per 1,000 carbon atoms, and was 0.16 per one molecule of the polymer. The B value indicating the α-olefin distribution in the copolymer chain was 1.02.

Physical properties of the ethylene/α-olefin-copolymer (A-4-1) are set forth in Table 14.

Example 19

[Preparation of a Composition]

The ethylene/α-olefin copolymer (A-4-1) obtained in Preparation Example 9 and a high-pressure radical polymerization low-density polyethylene (B-4-2) shown in Table 15 were dry blended in a mixing ratio of 90/10 [(A-4-1)/(B-4-2)]. To the resultant blend were added 0.05 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat-resistant stabilizer and 0.05 part by weight of calcium stearate as a hydrochloric acid absorbent, each based on 100 parts by weight of the resin. Then, the resultant mixture was kneaded by a conical-tapered twin-screw extruder (produced by Haake Buchler Instrument Inc.) at a preset temperature of 180° C., to obtain an ethylene copolymer composition.

[Film Formation]

The ethylene copolymer composition obtained in the above was subjected to inflation by the use of a single-screw extruder (20 mmφ·L/D=26) equipped with a die of 25 mmφ (lip width: 0.7 mm) and a single-slit air ring under the conditions of an air flow rate of 90 l/min, an extrusion rate of 9 g/min, a blow ratio of 1.8, a take-up rate of 2.4 m/min and a processing temperature of 200° C., to form a film having a thickness of 30 μm. Melt properties of the ethylene copolymer composition and physical properties of the film formed from the composition are set forth in Table 16.

Example 20

The procedure for preparing the ethylene copolymer composition in Example 19 was repeated except for varying the mixing ratio of the ethylene/α-olefin copolymer (A-4-1) to the high-pressure radical polymerization low-density polyethylene (B-4-2) to 75/25 [(A-4-1)/(B-4-2)], to prepare an ethylene copolymer composition. From the ethylene copolymer composition, a film having a thickness of 30 μm was formed in a manner similar to that of Example 19.

Melt properties of the ethylene copolymer composition and physical properties of the film formed from the composition are set forth in Table 16.

Example 21

The procedure for preparing the ethylene copolymer composition in Example 19 was repeated except for replacing the high-pressure radical polymerization low-density polyethylene (B-4-2) with a high-pressure radical polymerization low-density polyethylene (B-4-1) shown in Table 15, to prepare an ethylene copolymer composition. From the ethylene copolymer composition, a film having a thickness of 30 μm was formed in a manner similar to that of Example 19.

Melt properties of the ethylene copolymer composition and physical properties of the film formed from the composition are set forth in Table 16.

Reference Example 12

From the ethylene/α-olefin copolymer (A-4-1) obtained in Preparation Example 9, a film having a thickness of 30 μm was formed in a manner similar to that of Example 19.

Melt properties of the ethylene/α-olefin copolymer (A-4-1) and physical properties of the film formed from the copolymer are set forth in Table 16.

Comparative Example 6

[Preparation of an Ethylene/α-olefin copolymer (C-5)]

The procedure of Preparation Example 9 was repeated except for replacing the zirconium catalyst system with a titanium type catalyst system described in Japanese Patent Publication No. 63(1988)-54289, and adjusting the comonomer amount to that set forth in Table 14, to prepare an ethylene/α-olefin copolymer (C-5). Physical properties of the ethylene/α-olefin copolymer (C-5) thus obtained are set forth in Table 14.

[Preparation of a Composition]

The ethylene/α-olefin copolymer (C-5) obtained in the above and a high-pressure radical polymerization low-density polyethylene (B-4-1) shown in Table 15 were used to prepare an ethylene copolymer composition in a manner similar to that of Example 19.

[Film Formation]

From the ethylene copolymer composition prepared in the above, a film having a thickness of 30 μm was formed in a manner similar to that of Example 19.

Melt properties of the ethylene copolymer composition and physical properties of the film formed from the composition are set forth in Table 16.

As shown in Table 16, the film obtained above was poor in the film impact and had a wide composition distribution and a large amount of sticky component, so that the film was deteriorated in the blocking resistance. Further, when Comparative Example 6 was compared with Example 21 wherein an ethylene/α-olefin copolymer having the same comonomers and almost the same MFR and density as those of the ethylene/α-olefin copolymer of Comparative Example 6 was used, the film of Example 21 was prominently improved in the haze.

Comparative Example 7

From the ethylene/α-olefin copolymer (C-5) obtained in Comparative Example 6, a film having a thickness of 30 μm was formed in a manner similar to that of Example 19.

Melt properties of the ethylene/α-olefin copolymer (C-5) and physical properties of the film formed from the copolymer are set forth in Table 16.

Preparation Examples 10–12

The procedure of Preparation Example 9 was repeated except for varying the kinds of the comonomers and the amounts thereof to those set forth in Table 14, to prepare ethylene/α-olefin copolymers (A-4-2), (A-4-3) and (A-4-4). Physical properties of the ethylene/α-olefin copolymers (A-4-2), (A-4-3) and (A-4-4) thus obtained are set forth in Table 14.

Examples 22–24

The procedure for preparing the ethylene copolymer composition in Example 19 was repeated except for using the ethylene/α-olefin copolymers (A-4-2), (A-4-3) and (A-4-4) obtained in Preparation Examples 10 to 12, respectively, and using a high-pressure radical polymerization low-density polyethylene (B-4-1) shown in Table 15, to prepare ethylene copolymer compositions. From each of the ethylene copolymer compositions, a film having a thickness of 30 μm was formed in a manner similar to that of Example 19.

Melt properties of the ethylene copolymer compositions and physical properties of the films formed from the compositions are set forth in Table 16.

Reference Examples 13–15

From each of the ethylene/α-olefin copolymers (A-4-2), (A-4-3) and (A-4-4) obtained in Preparation Examples 10 to 12, a film having a thickness of 30 μm was formed in a manner similar to that of Example 19.

Melt properties of the ethylene/α-olefin copolymers (A-4-2), (A-4-3) and (A-4-4) and physical properties of the films formed from the copolymers are set forth in Table 16.

Preparation Examples 13 & 14

The procedure of Preparation Example 9 was repeated except for replacing bis(n-butylcyclopentadienyl)zirconium dichloride with bis(1-methyl-3-n-butylcyclopentadienyl)zirconium dichloride and varying the comonomer composition to that set forth in Table 14, to prepare ethylene/α-olefin copolymers (A-4-5) and (A-4-6). Physical properties of the ethylene/α-olefin copolymers (A-4-5) and (A-4-6) thus obtained are set forth in Table 14.

Examples 25 & 26

The procedure for preparing the ethylene copolymer composition in Example 19 was repeated except for using the ethylene/α-olefin copolymers (A-4-5) and (A-4-6) obtained in Preparation Example 13 and 14, respectively, and using a high-pressure radical polymerization low-density polyethylene (B-4-1) shown in Table 15, to prepare ethylene copolymer compositions. From each of the ethylene copolymer compositions, a film having a thickness of 30 μm was formed in a manner similar to that of Example 19.

Melt properties of the ethylene copolymer compositions and physical properties of the films formed from the compositions are set forth in Table 16.

Reference Examples 16 & 17

From each of the ethylene/α-olefin copolymers (A-4-5) and (A-4-6) obtained in Preparation Examples 13 and 14, a film having a thickness of 30 μm was formed in the similar manner to that of Example 19.

Melt properties of the ethylene/α-olefin copolymers (A-4-5) and (A-4-6) and physical properties of the films formed from the copolymers are set forth in Table 16.

Comparative Example 8

The ethylene/α-olefin copolymer (A-4-1) obtained in Preparation Example 9 and a high-pressure radical polymerization low-density polyethylene (D-2) shown in Table 15 were used to prepare an ethylene copolymer composition in a manner similar to that of Example 19. From the ethylene copolymer composition, a film having a thickness of 30 μm was formed in a manner similar to that of Example 19.

Melt properties of the ethylene copolymer composition and physical properties of the film formed from the composition are set forth in Table 15.

As is evident from Comparative Example 8 and Reference Example 12, even by blending the ethylene/α-olefin copolymer with such a high-pressure radical polymerization low-density polyethylene as used in Comparative Example 8, the film formed from the resulting composition was not increased so much in the transparency.

Comparative Example 9

The ethylene/α-olefin copolymer (A-4-1) obtained in Preparation Example 9 and a high-pressure radical polymerization low-density polyethylene (D-3) shown in Table 15 were used to prepare an ethylene copolymer composition in a manner similar to that of Example 19. From the ethylene copolymer composition, a film having a thickness of 30 μm was formed in a manner similar to that of Example 19.

Melt properties of the ethylene copolymer composition and physical properties of the film formed from the composition are set forth in Table 15.

As is evident from Comparative Example 9 and Reference Example 12, even by blending the ethylene/α-olefin copolymer with such a high-pressure radical polymerization low-density polyethylene as used in Comparative Example 9, the resulting composition was not hardly improved in the melt tension, and the film formed from the composition was not increased so much in the transparency.

It has been confirmed from the examples and the reference examples described above that when the ethylene/α-olefin copolymer is blended with a specific high-pressure radical polymerization low-density polyethylene, the resulting composition is improved in the melt tension and in the haze (transparency). Further, it has been also confirmed that the ethylene copolymer composition of the invention is excellent in the blocking resistance.

TABLE 14

Ethylene/α-olefin copolymer

| Code No. | Comonomer | Amount of comonomer | Density g/cm³ | MFR g/10 min | Tm °C. | Formula (1) | MT g | Formula (2) | Decane-soluble portion weight % | Formula (3) | Unsaturated bond *1 | FI s⁻¹ |
|---|---|---|---|---|---|---|---|---|---|---|---|---|
| A-4-1 | 1-hexene | 2.8 | 0.923 | 1.1 | 116.8 | 119.2 | 1.5 | 2.0 | 0.02 | 1.19 | 0.09 | 67 |
| A-4-2 | 1-hexene | 3.0 | 0.920 | 2.4 | 114.8 | 118.0 | 0.7 | 1.1 | 0.25 | 1.57 | 0.07 | 150 |
| A-4-3 | 1-hexene | 2.6 | 0.920 | 2.3 | 115.0 | 118.0 | 0.7 | 1.1 | 0.08 | 1.57 | 0.08 | 110 |
| A-4-4 | 4-methyl-1-pentene | 2.4 | 0.920 | 2.0 | 114.7 | 118.0 | 0.8 | 1.2 | 0.19 | 1.57 | 0.12 | 100 |
| A-4-5 | 1-hexene | 2.8 | 0.922 | 2.0 | 115.0 | 118.8 | 0.8 | 1.2 | 0.20 | 1.30 | 0.07 | 100 |
| A-4-6 | 1-hexene | 1.9 | 0.927 | 0.9 | 115.0 | 120.8 | 1.8 | 2.4 | 0.14 | 1.01 | 0.06 | 58 |
| C-5 | 1-hexene | 3.6 | 0.922 | 1.0 | 123.2 | 118.8 | 1.8 | 2.2 | 7.9 | 1.30 | 0.25 | 190 |

Remark:
Formula (1): Tm < 400 × d − 250 wherein Tm means a melting point at the maximum peak of the DSC endothermic curve, and d means a density.
Formula (2): MT ≤ 2.2 × MFR⁻⁰·⁸⁴ wherein MT means a melt tension at 190° C., and MFR means a melt flow rate.
Formula (3): W < 80 × exp(−100(d − 0.88)) + 0.1 [under the condition of MFR ≤ 10 g/10 min], wherein W means a weight of a decane-soluble portion at 23° C.
Formula (3): W < 80 × (MFR − 9)⁻⁰·²⁶ × exp(−100(d − 0.88)) + 0.1 [under the condition of MFR > 10 g/10 min], wherein W means a weight of a decane-soluble portion at 23° C.
*1: the number of unsaturated bond in the ethylene/α-olefin copolymer based on 1,000 carbon atoms.
A-4-1~A-4-6: Zr type catalyst, gas phase polymerization
C-5: Ti type catalyst, gas phase polymerization

TABLE 15

High-pressure radical polymerization low-density polyethylene

| | MFR | | | | | Physical property of film | | |
|---|---|---|---|---|---|---|---|---|
| Code No. | (g/10 min) | Mw/Mn | *1 | *2 | Density (g/cm³) | Haze % | Gloss % | Film impact kg · cm/cm |
| B-4-1 | 5.2 | 9.4 | 17.8 | 4.3 | 0.919 | 15.0 | 14 | 1,050 |
| B-4-2 | 0.50 | 4.4 | 10.2 | <0 | 0.924 | 7.4 | 51 | 1,750 |
| D-2 | 0.32 | 10.6 | 8.8 | <0 | 0.922 | — | — | — |
| D-3 | 66 | 8.9 | 26.1 | 12.4 | 0.915 | — | — | — |

Remark:
*1: value obtained by the formula 7.5 × log(MFR) + 12.5
*2: value obtained by the formula 7.5 × log(MFR) − 1.2

TABLE 16

| | | | Melt property of ethylene copolymer composition | | | Physical property of film | | | | |
|---|---|---|---|---|---|---|---|---|---|---|
| | Component A Code No. | Component B Code No. | Mixing ratio A/B weight ratio | MFR g/10 min. | MT g | FI s⁻¹ | Haze % | Haze Enhancing rate | Gloss % | Film impact kg · cm/cm | Blocking force g/cm | Moldability *2 |
| Ex. 19 | A-4-1 | B-4-2 | 90/10 | 0.9 | 4.3 | 90 | 2.8 | 30 | 180 | 4,210 | 0.19 | AA |
| Ex. 20 | A-4-1 | B-4-2 | 75/25 | 0.8 | 6.8 | 120 | 2.4 | 27 | 112 | 4,050 | 0.30 | AA |
| Ex. 21 | A-4-1 | B-4-1 | 90/10 | 1.1 | 3.6 | 100 | 3.2 | 36 | 96 | 3,910 | 0.24 | AA |
| Ref. Ex. 12 | A-4-1 | | 100/0 | 1.1 | 1.5 | 67 | 8.8 | 100 | 62 | 7,750 | 0.11 | CC |

TABLE 16-continued

| | Component A Code No. | Component B Code No. | Mixing ratio A/B weight ratio | Melt property of ethylene copolymer composition | | | Physical property of film | | | | | |
|---|---|---|---|---|---|---|---|---|---|---|---|---|
| | | | | MFR g/10 min. | MT g | FI $s^{-1}$ | Haze Haze % | Enhancing rate | Gloss % | Film impact kg·cm/cm | Blocking force g/cm | Moldability *2 |
| Comp. Ex. 6 | C-5 | B-4-1 | 90/10 | 1.0 | 4.0 | 245 | 6.2 | 54 | 95 | 2,760 | 4.7 | AA |
| Comp. Ex. 7 | C-5 | | 100/0 | 1.0 | 1.8 | 190 | 11.5 | 100 | 44 | 3,400 | 4.0 | CC |
| Ex. 22 | A-4-2 | B-4-1 | 90/10 | 2.4 | 1.8 | 200 | 2.8 | 31 | 99 | 3,960 | 0.26 | CC |
| Ref. Ex. 13 | A-4-2 | | 100/0 | 2.4 | 0.7 | 150 | 9.0 | 100 | 58 | 7,600 | 0.18 | CC |
| Ex. 23 | A-4-3 | B-4-1 | 90/10 | 2.4 | 1.8 | 150 | 3.0 | 34 | 102 | 2,920 | 0.42 | CC |
| Ref. Ex. 14 | A-4-3 | | 100/0 | 2.3 | 0.7 | 110 | 8.8 | 100 | 60 | 5,600 | 0.25 | CC |
| Ex. 24 | A-4-4 | B-4-1 | 90/10 | 2.0 | 2.1 | 135 | 3.0 | 34 | 100 | 3,100 | 0.11 | BB |
| Ref. Ex. 15 | A-4-4 | | 100/0 | 2.0 | 0.8 | 100 | 8.9 | 100 | 60 | 6,700 | 0.09 | CC |
| Ex. 25 | A-4-5 | B-4-1 | 90/10 | 2.0 | 2.2 | 130 | 3.2 | 35 | 96 | 3,900 | 0.20 | BB |
| Ref. Ex. 16 | A-4-5 | | 100/0 | 2.0 | 0.8 | 100 | 9.2 | 100 | 56 | 7,700 | 0.15 | CC |
| Ex. 26 | A-4-6 | B-4-1 | 90/10 | 0.9 | 4.5 | 85 | 3.4 | 43 | 94 | 4,230 | 0 | AA |
| Ref. Ex. 17 | A-4-6 | | 100/0 | 0.9 | 1.8 | 58 | 8.0 | 100 | 73 | 8,100 | 0 | CC |
| Comp. Ex. 8 | A-4-1 | D-2 | 90/10 | 0.9 | 6.6 | 70 | 7.8 | 89 | 63 | 4,260 | 0.15 | AA |
| Ref. Ex. 12 | A-4-1 | | 100/0 | 1.1 | 1.5 | 67 | 8.8 | 100 | 62 | 7,750 | 0.11 | CC |
| Comp. Ex. 9 | A-4-1 | D-3 | 90/10 | 1.3 | 1.6 | 130 | 8.0 | 91 | 87 | 3,350 | 0.12 | CC |
| Ref. Ex. 12 | A-4-1 | | 100/0 | 1.1 | 1.5 | 67 | 8.8 | 100 | 62 | 7,750 | 0.11 | CC |

Remark:
Haze enhancing rate *1: haze of a film formed from the ethylene copolymer composition based on the haze of a film formed from only the ethylene/α-olefin copolymer (i.e., copolymer of each reference example, copolymer of each comparative example) being 100. As this value is smaller, the haze is more improved.
Moldability *2: AA: MT ≧ 3, BB: 3 > MT ≧ 2, CC: 2 > MT Preparation Example 15

Preparation of an Ethylene/α-olefin Copolymer
[Preparation of a Solid Catalyst]

6.3 kg of silica having been dried at 250° C. for 10 hours was suspended in 100 liters of toluene, and the resultant suspension was cooled to 0° C. Thereafter, to the suspension was dropwise added 41 liters of a toluene solution of methylaluminoxane (Al=0.96 mol/l) over 1 hour. During the addition, the temperature of the system was kept at 0° C. Successively, the reaction was carried out at 0° C. for 60 minutes. Then, the temperature of the system was elevated to 95° C. over 1.5 hours, and the reaction was carried out at the same temperature for 4 hours. Thereafter, the temperature of the system was lowered to 60° C., and the supernatant liquid was removed by decantation.

The solid component obtained above was washed twice with toluene, and then again suspended in 125 liters of toluene. To the reaction system was dropwise added 15 liters of a toluene solution of bis(n-butylcyclopentadienyl)zirconium dichloride (Zr=42.7 mmol/l) at 30° C. over 30 minutes, and the reaction was further carried out at 30° C. for 2 hours. Then, the supernatant liquid was removed, and the residue was washed twice with hexane to obtain a solid catalyst containing 6.2 mg of zirconium based on 1 g of the solid catalyst.

[Preparation of a Prepolymerized Catalyst]

To 300 liters of hexane containing 14 mol of triisobutylaluminum was added 8.5 kg of the solid catalyst obtained in the above, and the resultant mixture was subjected to prepolymerization with ethylene at 35° C. for 7 hours to obtain a prepolymerized catalyst in which polyethylene was present in an amount of 10 g based on 1 g of the solid catalyst.

[Polymerization]

In a continuous fluidized bed gas phase reactor, ethylene was copolymerized with 1-hexene at a total pressure of 18 kg/cm²–G and a polymerization temperature of 80° C. To the reactor were continuously fed the prepolymerzied catalyst prepared in the above at a feed rate of 0.15 mmol/hour in terms of zirconium atom and triisobutylaluminum at a feed rate of 10 mmol/hour while continuously feeding ethylene, 1-hexene, hydrogen and nitrogen to maintain a constant gas composition in the polymerizer (gas composition: 1-hexene/ethylene=0.020, hydrogen/ethylene=6.6×10⁻⁴, ethylene concentration=16%).

Thus, an ethylene/α-olefin copolymer (A-4-7) was obtained in an amount of 5.0 kg/hour. The copolymer had a density of 0.923 g/cm³ and a melt flow rate (MFR) of 1.1 g/10 min. The temperature at the maximum peak of the DSC endothermic curve (Tm) of the copolymer was 116.8° C. Further, the copolymer had a melt tension (MT) of 1.5 g. The amount of the decane-soluble portion in the copolymer was 0.02 part by weight at 23° C. The number of unsaturated bond in the copolymer was 0.09 per 1,000 carbon atoms, and was 0.16 per one molecule of the polymer. The B value indicating the α-olefin distribution in the copolymer chain was 1.02.

Physical properties of the ethylene/α-olefin copolymer (A-4-7) are set forth in Table 17.

Reference Example 18

[Film Formation]

The ethylene/α-olefin copolymer (A-4-7) obtained in Preparation Example 15 was subjected to inflation by the use of a single-screw extruder (20 mmφ·L/D=26) equipped with a die of 25 mmφ (lip width: 0.7 mm) and a single-slit air ring under the conditions of an air flow rate of 90 1/min, an extrusion rate of 9 g/min, a blow ratio of 1.8, a take-up rate of 2.4 m/min and a processing temperature of 200° C., to form a film having a thickness of 30 μm.

Melt properties of the ethylene/α-olefin copolymer (A-4-7) and physical properties of the film formed from the copolymer are set forth in Table 19.

Example 27

[Preparation of a Composition]

The ethylene/α-olefin copolymer (A-4-7) obtained in Preparation Example 15 and a crystalline polyolefin (B-2-6) shown in Table 18 were dry blended in a weight ratio of 90/10 ((A-4-7)/(B-2-6)]. To the resultant blend were added 0.05 part by weight of tri(2,4-di-t-butylphenyl)phosphate as a secondary antioxidant, 0.1 part by weight of n-octadecyl-3-t(4-hydroxy-3',5'-di-t-butylphenyl)propionate as a heat-resistant stabilizer and 0.05 part by weight of calcium stearate as a hydrochloric acid absorbent, each based on 100 parts by weight of the resin. Then, the resultant mixture was kneaded by a conical-tapered twin-screw extruder (produced by Haake Buchler Instrument Inc.) at a preset temperature of 180° C., to obtain an ethylene copolymer composition.

[Film Formation]

From the ethylene copolymer composition obtained in the above, a film having a thickness of 30 μm was formed in a manner similar to that of Reference Example 18.

Melt properties of the ethylene copolymer composition and physical properties of the film formed from the composition are set forth in Table 19.

As compared with Reference Example 18, the ethylene copolymer composition obtained above was improved in the flow index (FI) within the high-shear region, and the film formed from the composition was increased in the transparency and the rigidity.

Example 28

[Preparation of a Composition]

The procedure for preparing the ethylene copolymer composition in Example 27 was repeated except for using the ethylene/α-olefin copolymer (A-4-7) obtained in Preparation Example 15 and a crystalline polyolefin (B-2-7) shown in Table 18 in a mixing ratio of 90/10 [(A-4-7)/(B-2-7)], to prepare an ethylene copolymer composition.

[Film Formation]

From the ethylene copolymer composition obtained in the above, a film having a thickness of 30 μm was formed in a manner similar to that of Reference Example 18.

Melt properties of the ethylene copolymer composition and physical properties of the film formed from the composition are set forth in Table 19.

As compared with Reference Example 18, the ethylene copolymer composition obtained above was improved in the flow index (FI) within the high-shear region, and the film formed from the composition was increased in the rigidity.

Example 29

[Preparation of a Composition]

The procedure for preparing the ethylene copolymer composition in Example 27 was repeated except for using the ethylene/α-olefin copolymer (A-4-7) obtained in Preparation Example 15 and a crystalline polyolefin (B-2-8) shown in Table 18 in a mixing ratio of 90/10 [(A-4-7)/(B-2-8)], to prepare an ethylene copolymer composition.

[Film Formation]

From the ethylene copolymer composition obtained in the above, a film having a thickness of 30 μm was formed in a manner similar to that of Reference Example 18.

Melt properties of the ethylene copolymer composition and physical properties of the film formed from the composition are set forth in Table 19.

As compared Reference Example 18, the ethylene copolymer composition obtained above was improved in the flow index (FI) within the high-shear region, and the film formed from the composition was increased in the rigidity.

Example 30

[Preparation of a Composition]

The procedure for preparing the ethylene copolymer composition in Example 27 was repeated except for using the ethylene/α-olefin copolymer (A-4-7) obtained in Preparation Example 15 and a crystalline polyolefin (B-2-9) shown in Table 18 in a mixing ratio of 90/10 [(A-4-7)/(B-2-9)], to prepare an ethylene copolymer composition.

[Film Formation]

From the ethylene copolymer composition obtained in the above, a film having a-thickness of 30 μm was formed in a manner similar to that of Reference Example 18.

Melt properties of the ethylene copolymer composition and physical properties of the film formed from the composition are set forth in Table 19.

As compared with Reference Example 18, the ethylene copolymer composition obtained above was improved in the flow index (FI) within the high-shear region, and the film formed from the composition was increased in the-rigidity.

Example 31

[Preparation of a Composition]

The procedure for preparing the ethylene copolymer composition in Example 27 was repeated except for using, the ethylene/α-olefin copolymer (A-4-7) obtained in Preparation Example 15 and a crystalline polyolefin (B-2-10) shown in Table 18 in a mixing ratio of 90/10 [(A-4-7)/(B-2-10)], to prepare an ethylene copolymer composition.

[Film Formation]

From the ethylene copolymer composition obtained in the above, a film having a thickness of 30 μm was formed in a manner similar to that of Reference Example 18.

Melt properties of the ethylene copolymer composition and physical properties of the film formed from the composition are set forth in Table 19.

As compared with Reference Example 18, the ethylene copolymer composition obtained above was improved in the flow index (FI) within the high-shear region, and the film formed from the composition was increased in the rigidity.

TABLE 17

| Code No. | Comonomer | Amount of comonomer | Density g/cm³ | MFR g/10 min | Tm °C. | Formula (1) | MT g | Formula (2) | Decane-soluble portion weight % | Formula (3) | Unsaturated bond *1 | FI s⁻¹ |
|---|---|---|---|---|---|---|---|---|---|---|---|---|
| A-4-7 | 1-hexene | 2.8 | 0.923 | 1.1 | 116.8 | 119.2 | 1.5 | 2.0 | 0.02 | 1.19 | 0.09 | 67 |

Remark:
Formula (1): Tm < 400 × d − 250 wherein Tm means the maximum peak temperature of the DSC endothermic curve, and d means a density.
Formula (2): MT ≦ 2.2 × MFR$^{-0.84}$ wherein MT means a melt tension at 190° C., and MFR means a melt flow rate.
Formula (3): W < 80 × exp(−100(d − 0.88)) + 0.1 [under the condition of MFR ≦ 10 g/10 min], wherein W means a weight of a decane-soluble portion at 23° C.
Formula (3): W < 80 × (MFR − 9)$^{-0.26}$ × exp (−100(d − 0.88)) + 0.1 [under the condition of MFR > 10 g/10 min], wherein W means a weight of a decane-soluble portion at 23° C.
*1: the number of unsaturated bond in the ethylene/α-olefin copolymer based on 1,000 carbon atoms.
A-4-7: Zr type catalyst, gas phase polymerization

TABLE 18

| Code No. | Composition (mol %) | | | MFR (g/10 min) | Density (g/cm³) |
|---|---|---|---|---|---|
| | Ethylene | Propylene | Butene | | |
| B-2-6 | 100 | — | — | 5.0 | 0.968 |
| B-2-7 | 99.8 | — | 0.2 | 0.65 | 0.963 |
| B-2-8 | 3.4 | 95.0 | 1.6 | 6.8 | 0.910 |
| B-2-9 | — | 100 | — | 6.5 | 0.910 |
| B-2-10 | — | — | 100 | 2.0 | 0.908 |

Remark:
MFR measuring temperature
B-2-6, B-2-7: 190° C.
B-2-8~B-2-10: 230° C.

TABLE 19

| | Component A Code No. | Component B Code No. | Mixing ratio A/B weight ratio | Melt property | | | Physical property of film | | | | |
|---|---|---|---|---|---|---|---|---|---|---|---|
| | | | | MFR g/10 min | MT g | FI s⁻¹ | Haze % | Tensile test (MD) | | Tensile test (TD) | |
| | | | | | | | | YM kg/cm² | EL % | YM kg/cm² | EL % |
| Ref. Ex. 18 | A-4-7 | — | 100/0 | 1.1 | 1.5 | 67 | 8.8 | 2,900 | 550 | 3,100 | 640 |
| Ex. 27 | A-4-7 | B-2-6 | 90/10 | 1.3 | 1.5 | 86 | 6.7 | 3,700 | 580 | 4,900 | 620 |
| Ex. 28 | A-4-7 | B-2-7 | 90/10 | 1.0 | 1.9 | 90 | 9.3 | 3,600 | 590 | 4,700 | 680 |
| Ex. 29 | A-4-7 | B-2-8 | 90/10 | 1.1 | 1.5 | 152 | 8.8 | 4,800 | 560 | 6,300 | 600 |
| Ex. 30 | A-4-7 | B-2-9 | 90/10 | 1.1 | 1.6 | 99 | 9.0 | 5,100 | 560 | 6,900 | 580 |
| Ex. 31 | A-4-7 | B-2-10 | 90/10 | 1.1 | 1.5 | 127 | 12.0 | 3,100 | 550 | 3,500 | 640 |

Preparation Example 16

Preparation of an Ethylene/α-olefin Copolymer
[Preparation of a Solid Catalyst]

6.3 kg of silica having been dried at 250° C. for 10 hours was suspended in 100 liters of toluene, and the resultant suspension was cooled to 0° C. Thereafter, to the suspension was dropwise added 41 liters of a toluene solution of methylaluminoxane (Al=0.96 mol/l) over 1 hour. During the addition, the temperature of the system was kept at 0° C. Successively, the reaction was carried out at 0° C. for 60 minutes. Then, the temperature of the system was elevated to 95° C. over 1.5 hours, and the reaction was carried out at the same temperature for 4 hours. Thereafter, the temperature of the system was lowered to 60° C., and the supernatant liquid was removed by decantation.

The solid component obtained above was washed twice with toluene, and then again suspended in 125 liters of toluene. To the reaction system was dropwise added 15 liters of a toluene solution of bis(n-butylcyclopentadienyl) zirconium dichloride (Zr=42.7 mmol/l) at 30° C. over 30 minutes, and the reaction was further carried out at 30° C. for 2 hours. Then, the supernatant liquid was removed, and the residue was washed twice with hexane to obtain a solid catalyst containing 6.2 mg of zirconium based on 1 g of the solid catalyst.

[Preparation of a Prepolymerized Catalyst]

To 300 liters of hexane containing 14 mol of triisobutylaluminum was added 8.5 kg of the solid catalyst obtained in the above, and the resultant mixture was subjected to prepolymerization with ethylene at 35° C. for 7 hours to obtain a prepolymerized catalyst in which polyethylene was present in an amount of 10 g based on 1 g of the solid catalyst.

[Polymerization]

In a continuous fluidized bed gas phase reactor, ethylene was copolymerized with 1-hexene at a total pressure of 18 kg/cm²-G and a polymerization temperature of 80° C. To the reactor were continuously fed the prepolymerzied catalyst prepared in the above at a feed rate of 0.15 mmol/hour in terms of zirconium atom and triisobutylaluminum at a feed rate of 10 mmol/hour while continuously feeding ethylene, 1-hexene, hydrogen and nitrogen to maintain a constant gas composition in the polymerizer (gas composition: 1-hexene/ethylene=0.020, hydrogen/ethylene=6.6×10⁻⁴, ethylene concentration=16%).

Thus, an ethylene/α-olefin copolymer (A-4-8) was obtained in an amount of 5.0 kg/hour. The copolymer had a density of 0.923 g/cm³ and a melt flow rate (MFR) of 1.1 g/10 min. The temperature at the maximum peak of the DSC endothermic curve (Tm) of the copolymer was 116.8° C. Further, the copolymer had a melt tension (MT) of 1.5 g. The amount of the decane-soluble portion in the copolymer was 0.02 part by weight at 23° C. The number of unsaturated bond in the copolymer was 0.09 per 1,000 carbon atoms, and was 0.16 per one molecule of the polymer. The B value indicating the α-olefin distribution in the copolymer chain was 1.02.

Physical properties of the ethylene/α-olefin copolymer (A-4-8) are set forth in Table 20.

Reference Example 19

[Film Formation]

The ethylene/α-olefin copolymer (A-4-8) prepared in Preparation Example 16 was subjected to inflation by the use of a single-screw extruder (20 mmφ·L/D=26) equipped with a die of 25 mmφ (lip width: 0.7 mm) and a single-slit air ring under the conditions of an air flow rate of 90 l/min, an extrusion rate of 9 g/min, a blow-ratio of 1.8, a take-up rate of 2.4 m/min and a processing temperature of 200° C., to form a film having a thickness of 30 μm.

Melt properties of the ethylene/α-olefin copolymer (A-4-8) and physical properties of the film formed from the copolymer are set forth in Table 22.

Example 32

[Preparation of a Composition]

The ethylene/α-olefin copolymer (A-4-8) obtained in Preparation Example 16 and an olefin type elastomer (B-3-4) (density: 0.89 g/cm³) shown in Table 21 were dry blended in a weight ratio of 90/10 [(A-4-8)/(B-3-4)]. To the resultant blend were added 0.05% by weight of tri(2,4-di-t-butylphenyl)phosphate as a secondary antioxidant, 0.1% by weight of n-octadecyl-3-(4'-hydroxy-3',5'-di-t-butylphenyl) propionate as a heat-resistant stabilizer and 0.05% by weight of calcium stearate as a hydrochloric acid absorbent, each based on 100 parts by weight of the resin. Then, the resultant mixture was kneaded by a conical-tapered twin-screw extruder (produced by Haake Buchler Instrument Inc.) at a preset temperature of 180° C., to obtain an ethylene copolymer composition.

[Film Formation]

The ethylene copolymer composition obtained in the above was subjected to inflation in a manner similar to that of Reference Example 19, to form a film having a thickness of 30 μm.

Melt properties of the ethylene copolymer composition and physical properties of the film formed from the composition are set forth in Table 22.

As compared with Reference Example 19, the ethylene copolymer composition obtained above was improved in the moldability (MT, FI), and the film formed from the composition was increased in the transparency and the film impact.

Example 33

[Preparation of a Composition]

The procedure for preparing the ethylene copolymer composition in Example 32 was repeated except for using the ethylene/α-olefin copolymer (A-4-8) obtained in Preparation Example 16 and an olefin type elastomer (B-3-5) shown in Table 21 in a weight ratio of 90/10 [(A-4-8)/(B-3-5)], to prepare an ethylene copolymer composition.

[Film Formation]

From the ethylene copolymer composition obtained in the above, a film having a thickness of 30 μm was formed in a manner similar to that of Reference Example 19.

Melt properties of the ethylene copolymer composition and physical properties of the film formed from the composition are set forth in Table 22.

As compared with Reference Example 19, the ethylene copolymer composition obtained above was improved in the moldability (MT, FI), and the film formed from the composition was increased in the transparency and the film impact.

TABLE 20

| Code No. | Comonomer | Amount of comonomer | Density g/cm³ | MFR g/10 min | Tm °C. | Formula (1) | MT g | Formula (2) | Decane-soluble portion weight % | Formula (3) | Unsaturated bond *1 | FI s⁻¹ |
|---|---|---|---|---|---|---|---|---|---|---|---|---|
| A-4-8 | 1-hexene | 2.8 | 0.923 | 1.1 | 116.8 | 119.2 | 1.5 | 2.0 | 0.02 | 1.19 | 0.09 | 67 |

Remark:

Formula (1): $Tm < 400 \times d - 250$ wherein Tm means the maximum peak temperature of the DSC endothermic curve, and d means a density.

Formula (2): $MT \leq 2.2 \times MFR^{-0.84}$ wherein MT means a melt tension at 190° C., and MFR means a melt flow rate.

Formula (3): $W < 80 \times \exp(-100(d - 0.88)) + 0.1$ [under the condition of MFR ≤ 10 g/10 min], wherein W means a weight of a decane-soluble portion at 23° C.

Formula (3): $W < 80 \times (MFR - 9)^{-0.26} \times \exp(-100(d - 0.88)) + 0.1$ [under the condition of MFR > 10 g/10 min], wherein W means a weight of a decane-soluble portion at 23° C.

*1: the number of unsaturated bond in the ethylene/α-olefin copolymer based on 1,000 carbon atoms.

A-4-8: Zr type catalyst, gas phase polymerization

TABLE 21

| Code No. | Composition (mol %) | | | | MFR (g/10 min) | Density (g/cm$^3$) |
|---|---|---|---|---|---|---|
| | Ethylene | Propylene | Butene | ENB | | |
| B-3-4 | 88 | — | 10 | 2 | 1.5 | 0.89 |
| B-3-5 | 74 | 24 | — | 2 | 0.2 | 0.87 |

Remark:
ENB: ethylidene norbornene

TABLE 22

| | Mixing ratio | | Melt property | | | Physical property | |
|---|---|---|---|---|---|---|---|
| | | | | | | | of film |
| | Code No. | Code No. | A/B weight ratio | MFR g/10 min | MT g | FI s$^{-1}$ | Haze % | Film impact kg · cm/cm |
| Ref. Ex. 19 | A-4-8 | — | 100/0 | 1.1 | 1.5 | 67 | 8.8 | 7,750 |
| Ex. 32 | A-4-8 | B-3-4 | 90/10 | 1.1 | 4.0 | 78 | 3.5 | NB (>8500) |
| Ex. 33 | A-4-8 | B-3-5 | 90/10 | 1.0 | 3.6 | 73 | 4.0 | NB (>8500) |

Remark:
NB means that the film is not broken. (8,500 kg · cm/cm = measurable maximum film impact)

Preparation Example 17

Preparation of an Ethylene/α-olefin Copolymer
[Preparation of a Solid Catalyst]

10.0 kg of silica having been dried at 250° C. for 10 hours was suspended in 154 liters of toluene, and the resultant suspension was cooled to 0° C. Thereafter, to the suspension was dropwise added 57.5 liters of a toluene solution of methylaluminoxane (Al=1.33 mol/l) over 1 hour. During the addition, the temperature of the system was kept at 0° C. Successively, the reaction was carried out at 0° C. for 30 minutes. Then, the temperature of the system was elevated to 95° C. over 1.5 hours, and the reaction was carried out at the same temperature for 20 hours. Thereafter, the temperature of the system was lowered to 60° C., and the supernatant liquid was removed by decantation.

The solid component obtained-above was washed twice with toluene, and then again suspended in 100 liters of toluene. To the reaction system was dropwise added 16.8 liters of a toluene solution of bis(1-methyl-3-n-butylcyclopentadienyl)zirconium dichloride (Zr=27.0 mmol/l) at 80° C. over 30 minutes, and the reaction was further carried out at 80° C. for 2 hours. Then, the supernatant liquid was removed, and the residue was washed twice with hexane to obtain a solid catalyst containing 3.5 mg of zirconium based on 1 g of the solid catalyst.
[Preparation of a Prepolymerized Catalyst]

To 87 liters of hexane containing 2.5 mol of triisobutylaluminum were added 870 g of the solid catalyst obtained in the above and 260 g of 1-hexene, and the resultant mixture was subjected to prepolymerization with ethylene at 35° C. for 5 hours to obtain a prepolymerized catalyst in which polyethylene was present in an amount of 10 g based on 1 g of the solid catalyst.
[Polymerization]

In a continuous fluidized bed gas phase reactor, ethylene was copolymerized with 1-hexene at a total pressure of 18 kg/cm$^2$–G and a polymerization temperature of 75° C. To the reactor were continuously fed the prepolymerzied catalyst prepared in the above at a feed rate of 0.15 mmol/hour in terms of zirconium atom and triisobutylaluminum at a feed rate of 10 mmol/hour while continuously feeding ethylene, 1-hexene, hydrogen and nitrogen to maintain a constant gas composition in the polymerizer (gas composition: 1-hexene/ethylene=0.034, hydrogen/ethylene=1.7×10$^{-4}$, ethylene concentration=20%).

Thus, an ethylene/α-olefin copolymer (A-5-1) was obtained in an amount of 5.8 kg/hour. The copolymer had a density of 0.908 g/cm$^3$ and a melt flow rate (MFR) of 0.77 g/10 min. The temperature at the maximum peak of the DSC endothermic curve (Tm) of the copolymer was 93.6° C. The amount of the decane-soluble portion in the copolymer was 0.51% by weight at 23° C. The number of unsaturated bond in the copolymer was 0.08 per 1,000 carbon atoms, and was 0.70 per one molecule of the polymer.

Physical properties of the ethylene/α-olefin copolymer (A-5-1) are set forth in Table 23.

Example 34
[Preparation of an Ethylene/α-olefin Copolymer Composition]

The ethylene/α-olefin copolymer (A-5-1) (density: 0.908 g/cm$^3$) obtained in Preparation Example 17 and an ethylene/α-olefin copolymer (A-6-1) (density: 0.938 g/cm$^3$) prepared in the same manner as described in Preparation Example 17 except for adjusting the comonomer amount to that set forth in Table 23 were melt kneaded in a weight ratio of 60/40 [(A-5-1)/(A-6-1)], to obtain an ethylene/α-olefin copolymer composition (L-2-1).

Physical properties of the ethylene/α-olefin copolymer (A-6-1) are set forth in Table 23, and physical properties of the ethylene/α-olefin copolymer composition (L-2-1) are set forth in Table 24.

[Preparation of an Ethylene Copolymer Composition]

The ethylene/α-olefin copolymer composition (L-2-1) and a high-pressure radical polymerization low-density polyethylene (B-4-3) shown in Table 25 were dry blended in a mixing ratio of 90/10 [(L-2-1)/(B-4-3)]. To the resultant blend were added 0.05 part by weight of tri(2,4-di-t-butylphenyl)phosphate as a secondary antioxidant, 0.1 part by weight of n-octadecyl-3-(4'-hydroxy-3',5'-di-t-butylphenyl)propionate as a heat-resistant stabilizer and 0.05 part by weight of calcium stearate as a hydrochloric acid absorbent, each based on 100 parts by weight of the resin. Then, the resultant mixture was kneaded by a conical-tapered twin-screw extruder (produced by Haake Buchler Instrument Inc.) at a preset temperature of 180° C., to obtain an ethylene copolymer composition.

[Film Formation]

The ethylene copolymer composition obtained in the above was subjected to inflation by the use of a single-screw extruder (20 mmφ·L/D=26) equipped with a die of 25 mmφ (lip width: 0.7 mm) and a single-slit air ring under the conditions of an air flow rate of 90 l/min, an extrusion rate of 9 g/min, a blow ratio of 1.8, a take-up rate of 2.4 m/min and a processing temperature of 200° C., to form a film having a thickness of 30 µm.

Melt properties of the ethylene copolymer composition and physical properties of the film formed from the composition are set forth in Table 26.

Reference Example 20

From the ethylene/α-olefin copolymer composition (L-2-1) prepared in Preparation Example 17, a film having a thickness of 30 µm was formed in a manner similar to that of Example 34.

Melt properties of the ethylene/α-olefin copolymer composition (L-2-1) and physical properties of the film formed from the composition are set forth in Table 26.

As is evident from Example 34 and Reference Example 20, the ethylene/α-olefin copolymer composition was increased in the melt tension and the flow index within the high-shear region by blending it with a high-pressure radical polymerization low-density polyethylene, and the film formed from the composition containing the polyethylene was enhanced in the transparency.

Example 35

[Preparation of an Ethylene/α-olefin Copolymer Composition]

An ethylene/α-olefin copolymer (A-5-2) (density: 0.909 g/cm$^3$) and an ethylene/α-olefin copolymer (A-6-2) (density: 0.943 g/cm$^3$), each of said copolymers having been prepared in the same manner as described in Preparation Example 17 except for adjusting the comonomer amount to that set forth in Table 23, were melt kneaded in a weight ratio of 70/30 [(A-5-2)/(A-6-2)], to obtain an ethylene/α-olefin copolymer composition (L-2-2).

Physical properties of the ethylene/α-olefin copolymers (A-5-2) and (A-6-2) are set forth in Table 23, and physical properties of the ethylene/α-olefin copolymer composition (L-2-2) are set forth in Table 24.

[Preparation of an Ethylene Copolymer Composition]

The procedure for preparing the ethylene copolymer composition in Example 34 was-repeated except for using the ethylene/α-olefin copolymer composition (L-2-2), to prepare an ethylene copolymer composition.

[Film Formation]

From the ethylene copolymer composition obtained in the above, a film having a thickness of 30 µm was formed in a manner similar to that of Example 34.

Melt-properties of the ethylene copolymer composition and physical properties of the film formed from the composition are set forth in Table 26.

Reference Example 21

[Film Formation]

From the ethylene/α-olefin copolymer composition (L-2-2) prepared in Example 35, a film having a thickness of 30 µm was formed in a manner similar to that of Example 34.

Melt properties of the ethylene/α-olefin copolymer composition (L-2-2) and physical properties of the film formed from the composition are set forth in Table 26.

As is evident from Example 35 and Reference Example 21, the ethylene/α-olefin copolymer composition was increased in the melt tension and the flow index within the high-shear region by blending it with a high-pressure radical polymerization low-density polyethylene, and the film formed from the composition containing the polyethylene was enhanced in the transparency.

Example 36

[Preparation of an Ethylene/α-olefin Copolymer Composition]

An ethylene/α-olefin copolymer (A-5-3) (density: 0.910 g/cm$^3$) and an ethylene/α-olefin copolymer (A-6-3) (density: 0.946 g/cm$^3$), each of said copolymers having been prepared in the same manner as described in Preparation Example 17 except for adjusting the comonomer amount to that set forth in Table 23, were melt kneaded in a weight ratio of 60/40 [(A-5-3)/(A-6-3)], to obtain an ethylene/α-olefin copolymer composition (L-2-3).

Physical properties of the ethylene/α-olefin copolymers (A-5-3) and (A-6-3) are set forth in Table 23, and physical properties of the ethylene/α-olefin copolymer composition (L-2-3) are set forth in Table 24.

[Preparation of an Ethylene Copolymer Composition]

The procedure for preparing the ethylene copolymer composition in Example 34 was repeated except for using the ethylene/α-olefin copolymer composition (L-2-3), to prepare an ethylene copolymer composition.

[Film Formation]

From the ethylene copolymer composition obtained in the above, a film having a thickness of 30 µm was formed in a manner similar to that of Example 34.

Melt properties of the ethylene copolymer composition and physical properties of the film formed from the composition are set forth in Table 26.

Reference Example 22

[Film Formation]

From the ethylene/α-olefin copolymer composition (L-2-3) prepared in Example 36, a film having a thickness of 30 µm was formed in a manner similar to that of Example 34.

Melt properties of the ethylene/α-olefin copolymer composition (L-2-3) and physical properties of the film formed from the composition are set forth in Table 26.

As is evident from Example 36 and Reference Example 22, the ethylene/α-olefin copolymer composition was increased in the melt tension and the flow index within the high-shear region by blending it with a high-pressure radical polymerization low-density polyethylene, and the film formed from the composition containing the polyethylene was enhanced in the transparency.

Comparative Example 10
[Preparation of an Ethylene/α-olefin Copolymer Composition]

An ethylene/α-olefin copolymer (C-6) (density: 0.915 g/cm³) and an ethylene/α-olefin copolymer (C-7) (density: 0.933 g/cm³), each of said copolymers having been prepared in the same manner as described in Preparation Example 17 except for replacing the zirconium catalyst system with a titanium type catalyst system described in Japanese Patent Publication No. 63(1988)-54289, and varying the gas composition to that shown in Table 23, were melt kneaded in a weight ratio of 60/40 [(C-6)/(C-7)], to obtain an ethylene/α-olefin copolymer composition (L-2-4). Physical properties of the ethylene/α-olefin copolymer composition (L-2-4) are set forth in Table 24.

[Preparation of an Ethylene Copolymer Composition]

The procedure for preparing the ethylene copolymer composition in Example 34 was repeated except for using the ethylene/α-olefin copolymer composition (L-2-4), to prepare an ethylene copolymer composition.

[Film Formation]

From the ethylene copolymer composition obtained in the above, a film having a thickness of 30 μm was formed in a manner similar to that of Example 34.

Melt properties of the ethylene copolymer composition and physical properties of the film formed from the composition are set forth in Table 26.

The film obtained above was inferior in the transparency and the film impact to the film of Example 34 formed from the ethylene/α-olefin copolymer composition (L-2-1) having almost the same density and MFR.

Comparative Example 11

From the ethylene/α-olefin copolymer composition (L-2-4) obtained in Comparative Example 10, a film having a thickness of 30 μm was formed in a manner similar to that of Example 34.

Melt properties of the ethylene/α-olefin copolymer composition (L-2-4) and physical properties of the film formed from the composition are set forth in Table 26.

It was confirmed from Comparative Example 10 and Comparative Example 11 that the film of Comparative Example 10 was less increased in the transparency as compared with the film of Example 34.

Comparative Example 12
[Preparation of an Ethylene Copolymer Composition]

The procedure for preparing the ethylene copolymer composition in Example 34 was repeated except for using an ethylene/α-olefin copolymer (C-8) prepared in the same manner as described in Preparation Example 17 except for adjusting the comonomer amount to that set forth in Table 23, to prepare an ethylene copolymer composition.

[Film Formation]

From the ethylene copolymer composition, a film having a thickness of 30 μm was formed in a manner similar to that of Example 34.

Melt properties of the ethylene copolymer composition and physical properties of the film formed from the composition are set forth in Table 26.

The ethylene copolymer composition obtained in Comparative Example 12 was inferior in the flow index within the high-shear region to the ethylene copolymer composition of Example 36 having almost the same MFR. Further, the film obtained in Comparative Example 12 was inferior in the film impact to the film formed from the ethylene copolymer composition of Example 34 using the ethylene/α-olefin copolymer composition (L-2-1) having almost the same density and MFR as those of the ethylene/α-olefin copolymer (C-8).

TABLE 23

| Code No. | Comonomer | Amount of comonomer | Density g/cm3 | MFR g/10 min | [η] g/dl | Tm °C. | Formula (1) |
|---|---|---|---|---|---|---|---|
| A-5-1 | 1-hexene | 4.8 | 0.908 | 0.77 | 1.94 | 93.6 | 113.2 |
| A-5-2 | 1-hexene | 4.7 | 0.909 | 0.46 | 2.14 | 97.4 | 113.6 |
| A-5-3 | 1-hexene | 4.8 | 0.910 | 0.60 | 2.03 | 96.8 | 114.0 |
| C-6 | 1-hexene | 6.1 | 0.915 | 0.65 | 2.00 | 120.3 | 116.0 |
| A-6-1 | 1-hexene | 1.4 | 0.938 | 13.0 | 1.12 | 118.2 | 125.2 |
| A-6-2 | 1-hexene | 1.0 | 0.943 | 229 | 0.64 | 118.9 | 127.2 |
| A-6-3 | 1-hexene | 1.0 | 0.946 | 240 | 0.64 | 119.5 | 128.4 |
| C-7 | 1-hexene | 2.8 | 0.933 | 19.2 | 1.04 | 128.0 | 123.2 |
| C-8 | 1-hexene | 2.8 | 0.922 | 2.0 | 1.61 | 115.0 | 118.8 |

| Code No. | MT g | Formula (2) | Decane-soluble portion weight % | Formula (3) | Unsaturated bond *1 | FI $s^{-1}$ |
|---|---|---|---|---|---|---|
| A-5-1 | 2.4 | 2.7 | 0.51 | 5.0 | 0.08 | 50 |
| A-5-2 | 3.8 | 4.2 | 0.48 | 4.5 | 0.05 | 30 |
| A-5-3 | 2.7 | 3.4 | 0.49 | 4.1 | 0.09 | 33 |
| C-6 | 2.8 | 3.2 | 13.50 | 2.5 | 0.23 | 140 |
| A-6-1 | 0.1> | — | 0.32 | 0.45 | 0.15 | 980 |
| A-6-2 | 0.1> | — | 0.45 | 0.70 | 0.09 | 17760 |
| A-6-3 | 0.1> | — | 0.40 | 0.55 | 0.10 | 22300 |
| C-7 | 0.1> | — | 2.20 | 0.83 | 0.28 | 1480 |
| C-8 | 0.8 | 1.2 | 0.20 | 1.30 | 0.07 | 100 |

Remark:

TABLE 23-continued

Formula (1): Tm < 400 × d − 250 wherein Tm means the maximum peak temperature of the DSC endothermic curve, and d means a density.
Formula (2): MT ≤ 2.2 × MFR$^{-0.84}$ wherein MT means a melt tension at 190° C., and MFR means a melt flow rate.
Formula (3): W < 80 × exp (−100 (d − 0.88)) + 0.1 [under the condition of MFR ≤ 10 g/10 min], wherein W means a weight of a decane-soluble portion at room temperature.
Formula (3): W < 80 × (MFR − 9)$^{-0.26}$ × exp(−100 (d − 0.88)) + 0.1 [under the condition of MFR > 10 g/10 min], wherein W means a weight of a decane-soluble portion at room temperature.
*1: the number of unsaturated bond in the ethylene/α-olefin copolymer based on 1,000 carbon atoms.
A-5-1~A-5-3, A-6-1~A-6-3, C-8: Zr type catalyst, gas phase polymerization
C-6, C-7: Ti type catalyst, gas phase polymerization

TABLE 24

| | | | Mixing ratio | | Melt property | | |
|---|---|---|---|---|---|---|---|
| | Component A Code No. | Component B Code No. | A/B (weight ratio) | Density g/cm$^3$ | MFR g/10 min | MT g | FI s$^{-1}$ |
| L-2-1 | A-5-1 | A-6-1 | 60/40 | 0.921 | 2.0 | 1.0 | 170 |
| L-2-2 | A-5-2 | A-6-2 | 70/30 | 0.920 | 1.3 | 1.6 | 150 |
| L-2-3 | A-5-3 | A-6-3 | 60/40 | 0.924 | 2.3 | 0.8 | 360 |
| L-2-4 | C-6 | C-7 | 60/40 | 0.922 | 2.0 | 1.0 | 360 |

TABLE 25

High-pressure radical polymerization low-density polyethylene (Component B)

| | | | | | | | | Physical property of film | | |
|---|---|---|---|---|---|---|---|---|---|---|
| Code No. | MFR (g/10 min) | Mw/Mn | *1 | *2 | Density (g/cm$^3$) | Haze % | Gloss % | | | Film impact kg · cm/cm |
| B-4-3 | 0.50 | 4.4 | 10.2 | <0 | 0.924 | 7.4 | 51 | | | 1,750 |

Remark:
*1: value obtained by the formula 7.5 × log (MFR) + 12.5
*2: value obtained by the formula 7.5 × log (MFR) − 1.2

TABLE 26

| | Component I Code No. | Component II Code No. | Mixing ratio I/II weight ratio | Melt property | | |
|---|---|---|---|---|---|---|
| | | | | MFR g/10 min | MT g | FI s$^{-1}$ |
| Ex. 34 | L-2-1 | B-4-3 | 90/10 | 1.8 | 2.5 | 190 |
| Ref. Ex. 20 | L-2-1 | — | 100/0 | 2.0 | 1.0 | 170 |
| Ex. 35 | L-2-2 | B-4-3 | 90/10 | 1.2 | 3.2 | 170 |
| Ref. Ex. 21 | L-2-2 | — | 100/0 | 1.3 | 1.6 | 150 |
| Ex. 36 | L-2-3 | B-4-3 | 90/10 | 2.0 | 2.1 | 380 |
| Ref. Ex. 22 | L-2-3 | — | 100/0 | 2.3 | 0.8 | 360 |
| Comp. Ex. 10 | L-2-4 | B-4-3 | 90/10 | 1.8 | 2.3 | 370 |
| Comp. Ex. 11 | L-2-4 | — | 100/0 | 2.0 | 1.0 | 360 |
| Comp. Ex. 12 | C-8 | B-4-3 | 90/10 | 2.0 | 2.2 | 130 |

| | Physical property of film | | |
|---|---|---|---|
| | Haze % | Film impact kg · cm/cm | Blocking force g/cm | Moldability *2 |
| Ex. 34 | 5.2 | 6,200 | 0 | BB |
| Ref. Ex. 20 | 25.9 | NB (>8,500) | 0 | CC |
| Ex. 35 | 6.3 | NB (>8,500) | 0 | AA |
| Ref. Ex. 21 | 18.7 | NB (>8,500) | 0 | CC |
| Ex. 36 | 6.1 | 4,600 | 0 | BB |
| Ref. Ex. 22 | 30.8 | 6,730 | 0 | CC |
| Comp. Ex. 10 | 11.5 | 2,820 | 6.7 | BB |
| Comp. Ex. 11 | 26.8 | 3,500 | 5.6 | CC |
| Comp. Ex. 12 | 3.2 | 3,900 | 0.2 | BB |

Remark:
*1: NB means that the film is not broken. (8,500 kg · cm/cm = measurable maximum film impact)
Moldability *2: AA: MT ≧ 3, BB: 2 ≦ MT < 3, CC: MT < 2

What is claimed is:

1. A film formed from an ethylene copolymer composition comprising: (A-4) an ethylene-α-olefin copolymer of ethylene with an α-olefin of 3 to 20 carbon atoms in an amount of 80 to 98% by weight, said copolymer having such properties that (i) the density (d) is in the range of 0.880 to 0.960 g/cm$^3$,
   (ii) the melt flow rate (MFR) at 190° C. under a load of 2.16 kg determined in accordance with ASTM D1238-65T is in the range of 0.01 to 200 g/10 mm,
   (iii) the temperature (Tm (° C.)) at which the endothermic curve of said copolymer measured by a differential scanning calorimeter (DSC) shows the maximum peak and the density (d) satisfy the relation wherein the Tm is measured by heating a 5 g sample in an aluminum pan to 200° C. at a rate of 10° C./min, holding the sample at 200° C. for 5 minutes, lowering the temperature to room temperature at a rate of 20° C./min, and then heating at a rate of 10° C./min $$Tm < 400 \times d - 250,$$

(iv) the melt tension (MT (g)) at 190° C. and the melt flow rate (MFR) satisfy the relation wherein MT is measured at an extrusion rate of 15 mm/min and a take-up rate of 10 to 20 m/min using a MT measuring apparatus having a nozzle diameter of 2.09 mmφ and a nozzle length of 8 mm $$MT 2.2 \times MFR^{-0.84},$$

and (v) the amount (W (% by weight)) of a decane-soluble portion at 23° C. and the density (d) satisfy the relation, in the case of MFR≦10 g/10 min, $$W \leq 80 \times \exp(-100(d-0.88))+0.1$$

in the case of MFR>10 g/10 min, $$W < 80 \times (MFR-9)^{0.26} \times \exp(-100(d-0.88))+0.1;$$

and (B-2) at least one crystalline polyolefin in an amount of 2 to 20% by weight, said crystalline polyolefin being selected from the group consisting of:

(B-I) an ethylene homopolymer or a copolymer o ethylene with an α-olefin of 3 to 20 carbon atoms, prepared by using non-metallocene type catalyst, having a melt flow rate (MFR) of 0.01 to 100 g/10 min at 190° C. under a load of 2.16 kg and a density of not less than 0.950 g/cm³, (B-II) a propylene homopolymer or a copolymer of propylene with at least one olefin selected from an α-olefin of 4 to 20 carbon atoms, having a melt flow rate (MFR) of 0.1 to 100 g/10 min at 230° C. under a load of 2.16 kg and a density of not less than 0.900 g/cm³, and (B-III) a homopolymer of an α-olefin of 4 to 2 carbon atoms or a copolymer of α-olefins of 4 to 20 carbon toms, having a melt flow rate (MFR) of 0.1 to 100 g/10 min at 230° C. under a load of 2.16 kg and a density of not less than 0.900 g/cm³.

2. The film according to claim 1 which is obtained by inflation molding or T-die molding said ethylene copolymer composition.

3. A wrapping film obtained from an ethylene copolymer composition as set forth in claim 1.

4. An ethylene copolymer composition comprising: (A-4) an ethylene/α-olefin copolymer of ethylene in an amount of 70–96% by wt. and an α-olefin of 3 to 10 carbon atom in an amount of 4 to 30% by weight, said copolymer having such properties that (i) the density is in the range of 0.905 to 0. 30 g/cm³, (ii) the melt flow rate (MFR) at 190° C. under a load of 2.16 kg determined in accordance with ASTM D1238-65T is in the range of 0.1 to 10 g/10 mm, (iii) the temperature (Tm (° C.)) at which the endothermic curve of said copolymer measured by a differential scanning calorimeter (DSC) shows the maximum peak and the density (d) satisfy the relation wherein the Tm is measured by heating a 5 g sample in an aluminum pan to 200° C. at a rate of 10° C./min, holding the sample at 200° C. for 5 minutes, lowering the temperature to room temperature at a rate of 20° C./min, and then heating at a rate of 10° C./min $$Tm < 550 \times d - 391,$$

(iv) the melt tension (MT (g)) at 190° C. and the melt flow rate (MFR) satisfy the relation wherein MT is measured at an extrusion rate of 15 mm/min and a take-up rate of 10 to 20 m/min using a MT measuring apparatus having a nozzle diameter of 2.09 mmφ and a nozzle length of 8 mm $$MT \leq 2.2 \times MFR^{-0.84},$$

and (v) the amount (W (% by weight)) of a decane-soluble portion at 23° C. and the density (d) satisfy the relation, in the case of MFR≦10 g/10 min, $$W < 40 \times \exp(-100(d-0.88))+0.1$$

in the case of MFR>10 g/10 min, $$W > 80 \times (MFR-9)^{0.26} \times \exp(-100(d-0.88))+0.1;$$

and (B-2) at least one crystalline polyolefin in an amount of 1 to 40% by weight, said crystalline polyolefin being selected from the group consisting of:

(B-I) an ethylene homopolymer or a copolymer of ethylene with an αolefin of 3 to 10 carbon atoms, prepared b using non-metallocene type catalyst, having a melt flow rate (MFR) of 0.05 to 50 g/10 min at 190° C. under a load of 2.16 kg and density of 0.960 to 0.970 g/cm³, (B-II) a propylene homopolymer or a copolymer of propylene with at least one olefin selected from ethylene and an α-olefin of 4 to 10 carbon atoms, having a melt flow rate (MFR) of 0.5 to 50 g/10 min at 230° C. under a load of 2.16 kg and an density of 0.900 to 0.920 g/cm³, and (B-III) a homopolymer of an α-olefin of 4 to 10 carbon atoms or a copolymer of α-olefins of 4 to 10 carbon toms, having a melt flow rate (MFR) of 0.5 to 50 g/10 min at 230° C. under a load of 2.16 kg and a density of 0.900 to 0.920 g/cm³.

* * * * *